United States Patent
Yamamoto et al.

(10) Patent No.: US 10,284,357 B2
(45) Date of Patent: May 7, 2019

(54) INTERCOM SYSTEM AND COMMUNICATION METHOD THEREOF

(71) Applicant: Panasonic Intellectual Property Management Co., Ltd., Osaka (JP)

(72) Inventors: Takashi Yamamoto, Fukuoka (JP); Katsumi Nakagawa, Fukui (JP); Naotaka Kusui, Fukuoka (JP); Toshio Hayashi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 260 days.

(21) Appl. No.: 15/332,930

(22) Filed: Oct. 24, 2016

(65) Prior Publication Data

US 2017/0134152 A1    May 11, 2017

(30) Foreign Application Priority Data

Nov. 10, 2015  (JP) ................................ 2015-220179
Jun. 24, 2016  (JP) ................................ 2016-125974
(Continued)

(51) Int. Cl.
*H04L 7/00* (2006.01)
*H04L 5/14* (2006.01)
(Continued)

(52) U.S. Cl.
CPC ............ *H04L 7/0008* (2013.01); *H04B 3/46* (2013.01); *H04J 3/0608* (2013.01); *H04L 5/14* (2013.01);
(Continued)

(58) Field of Classification Search
CPC ....... H04N 7/186; H04L 25/0264; H04L 5/14; H04L 7/0008; H04M 11/025; H04J 3/0608
See application file for complete search history.

(56) References Cited

U.S. PATENT DOCUMENTS 4,754,476 A * 6/1988 Rasmussen ........... H04M 1/723
                                                    379/159
5,101,401 A   3/1992  Suzuki et al.
(Continued)

FOREIGN PATENT DOCUMENTS

JP    63-178644 A    7/1988
JP    4-248748 A     9/1992
(Continued)

OTHER PUBLICATIONS

Extended European Search Report dated Feb. 24, 2017, for corresponding EP Application No. 1619446.7-1905, 10 pages.
(Continued)

*Primary Examiner* — Min Jung
(74) *Attorney, Agent, or Firm* — Seed IP Law Group LLP

(57) ABSTRACT

A connection status detector of a controller determines that a two-wire cable is forward connected, in a case where a synchronization pattern of reception data completely coincides with a synchronization pattern for forward connection check. The connection status detector determines that the two-wire cable is reversely connected, in a case where the synchronization pattern of reception data completely coincides with a synchronization pattern for reverse connection check. A transmission data inverter reverses an uplink signal output from a transmission data processor, in a case where it is determined that the two-wire cable is reversely connected. A reception data inverter reverses a downlink signal
(Continued)

output from a reception driver, in a case where it is determined that the two-wire cable is reversely connected.

4 Claims, 41 Drawing Sheets

(30) Foreign Application Priority Data

Jun. 30, 2016 (JP) ................................ 2016-130480
Jul. 11, 2016 (JP) ................................ 2016-136800

(51) Int. Cl.
*H04B 3/46* (2015.01)
*H04J 3/06* (2006.01)
*H04L 25/02* (2006.01)
*H04M 11/02* (2006.01)
*H04N 7/18* (2006.01)

(52) U.S. Cl.
CPC ....... *H04L 25/0264* (2013.01); *H04M 11/025* (2013.01); *H04N 7/186* (2013.01); *H04L 5/1469* (2013.01)

(56) References Cited

U.S. PATENT DOCUMENTS

| | | | |
|---|---|---|---|
| 5,903,613 | A | 5/1999 | Ishida |
| 7,286,616 | B2 | 10/2007 | Takahira et al. |
| 2005/0030934 | A1 | 2/2005 | Takahira et al. |
| 2005/0132240 | A1 | 6/2005 | Stineman et al. |
| 2010/0316237 | A1* | 12/2010 | Elberbaum .......... H04M 11/025 381/300 |
| 2014/0372258 | A1* | 12/2014 | Elberbaum ........ G06Q 30/0641 705/26.81 |
| 2017/0134152 | A1 | 5/2017 | Yamamoto et al. |

FOREIGN PATENT DOCUMENTS

| | | |
|---|---|---|
| JP | 5-018181 U | 3/1993 |
| JP | 07-273807 A | 10/1995 |
| JP | 07-280328 A | 10/1995 |
| JP | 07-336347 A | 12/1995 |
| JP | 8-163155 A | 6/1996 |
| JP | 8-163282 A | 6/1996 |
| JP | 2001-069216 A | 3/2001 |
| JP | 2001-309361 A | 11/2001 |
| JP | 2005-184821 A | 7/2005 |
| JP | 2007-124227 A | 5/2007 |
| JP | 2007-202116 A | 8/2007 |
| JP | 2009-302855 A | 12/2009 |
| JP | 2010-081121 A | 4/2010 |
| JP | 2010-098463 A | 4/2010 |
| JP | 2013-005374 A | 1/2013 |
| JP | 2013-120152 A | 6/2013 |
| WO | 03/103244 A1 | 12/2003 |
| WO | 2012/176821 A1 | 12/2012 |

OTHER PUBLICATIONS

Communication pursuant to Article 94(3) EPC dated Nov. 28, 2018 for the related European Patent Application No. 16194446.7.
Wikipedia: "Duplex (Telecommunications)", Internet Citation, Jan. 12, 2015 (Jan. 12, 2015), pp. 1-5, XP002758806, Retrieved from the Internet: URL:https://en.wikipedia.org/w/index.php?title=Duplex_%28telecommunications%29&oldid=642120925 [retrieved on Jun. 14, 2016].

* cited by examiner

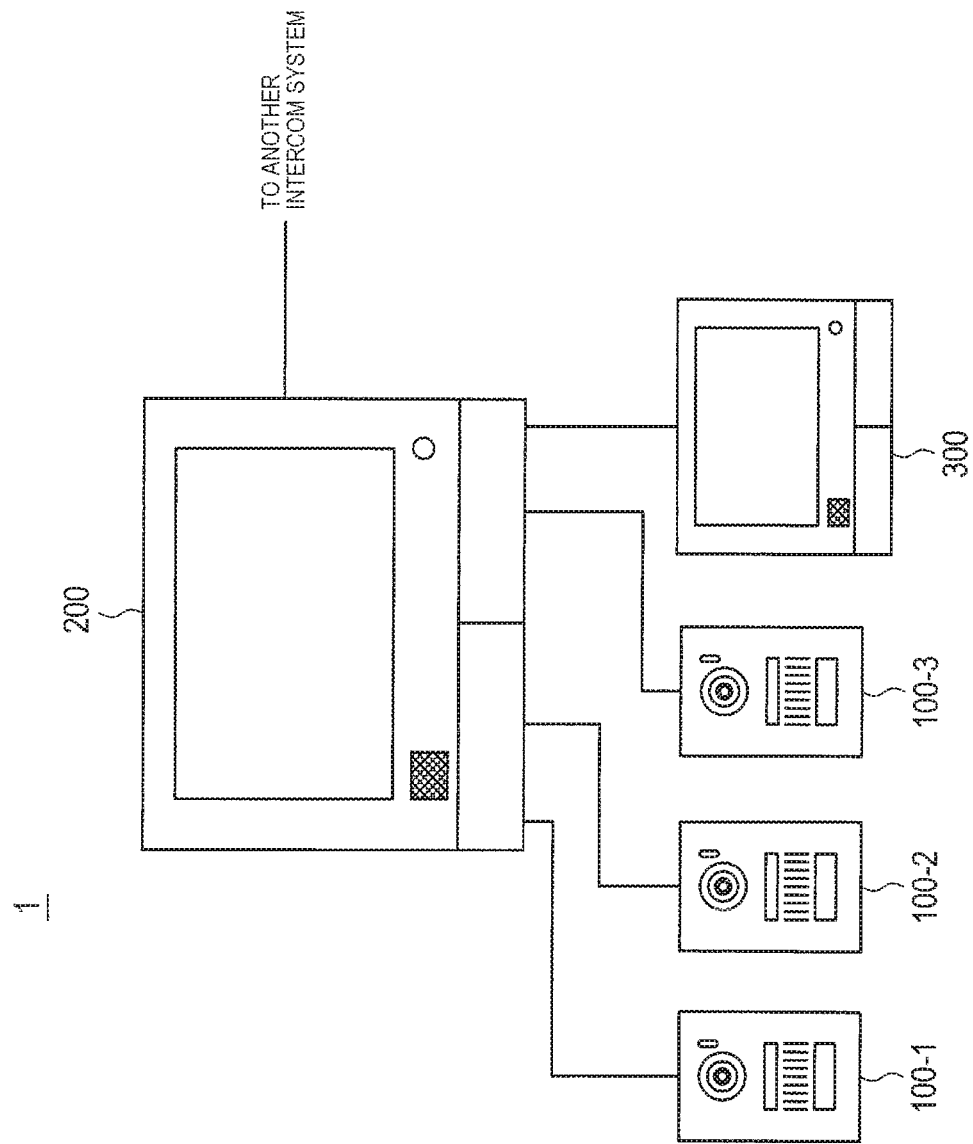

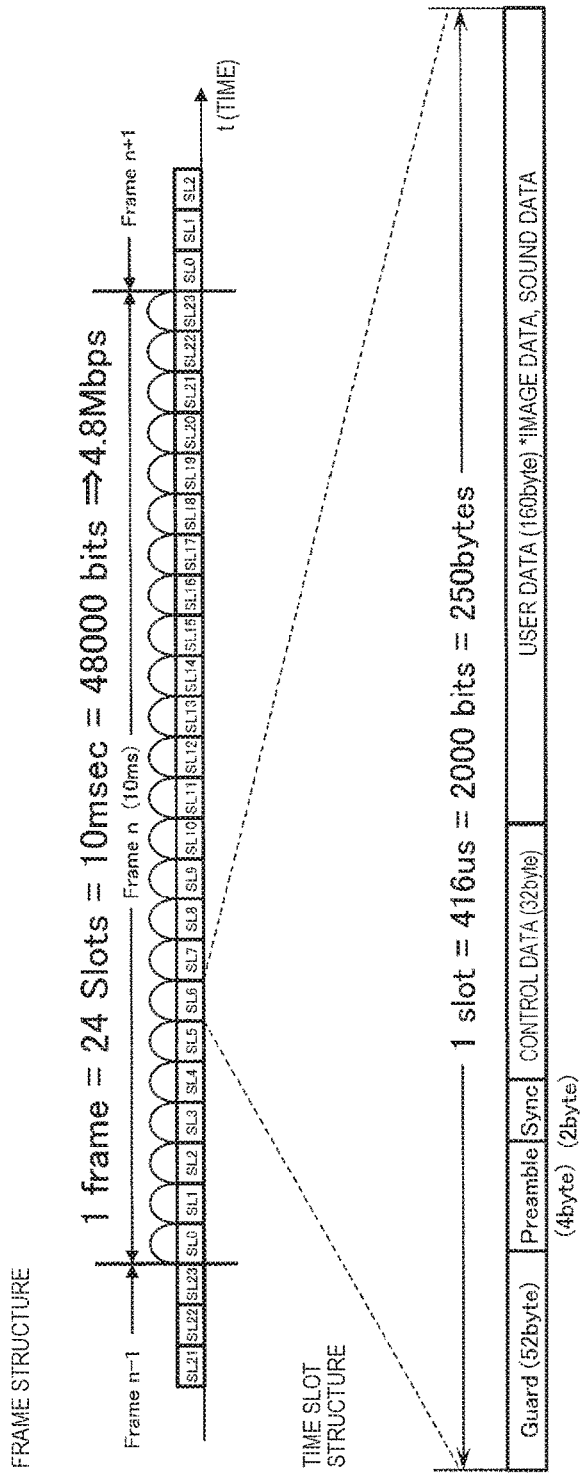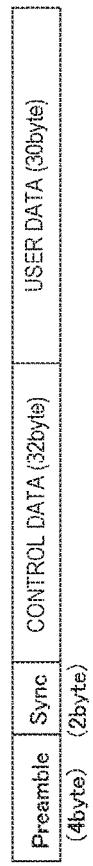

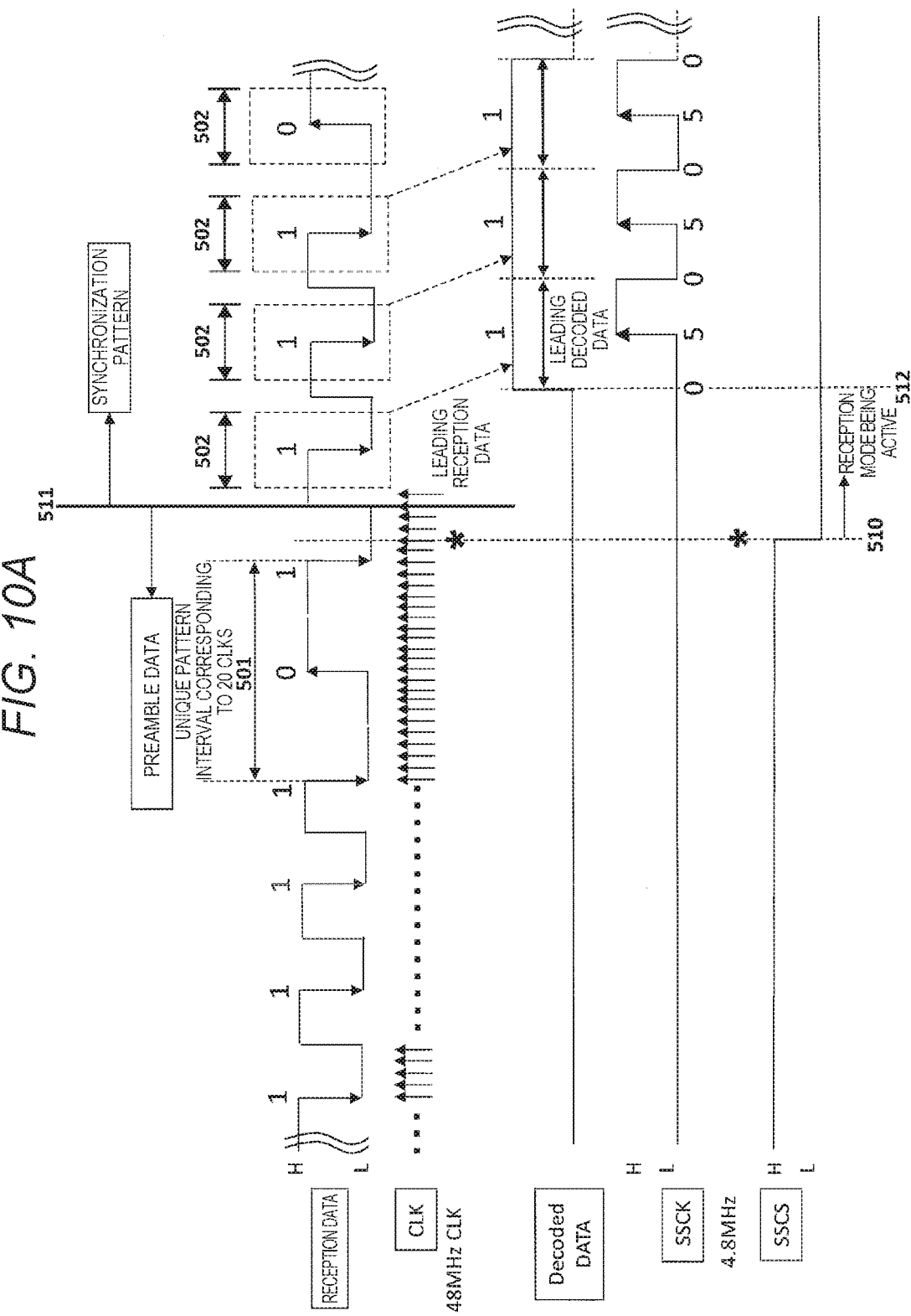

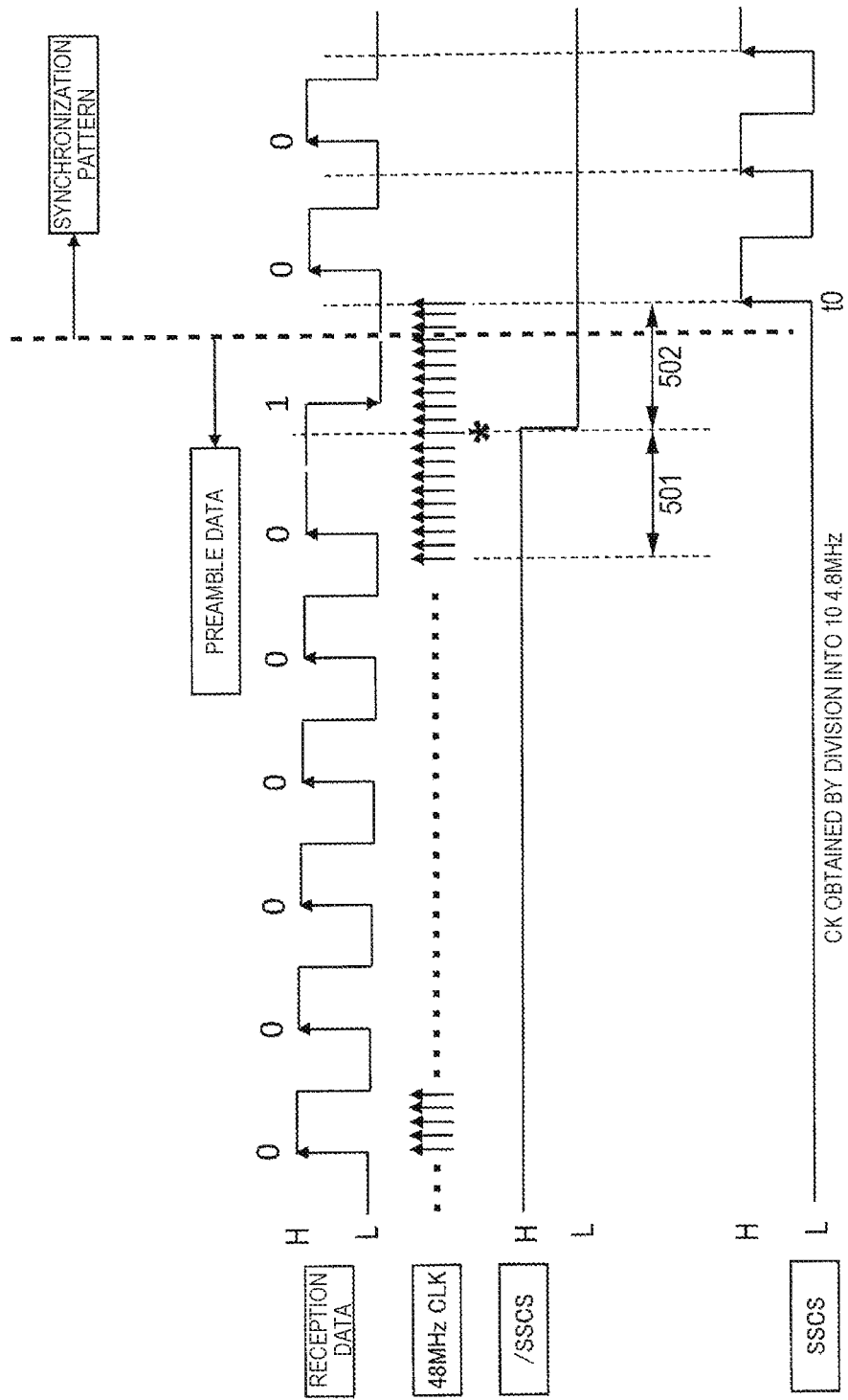

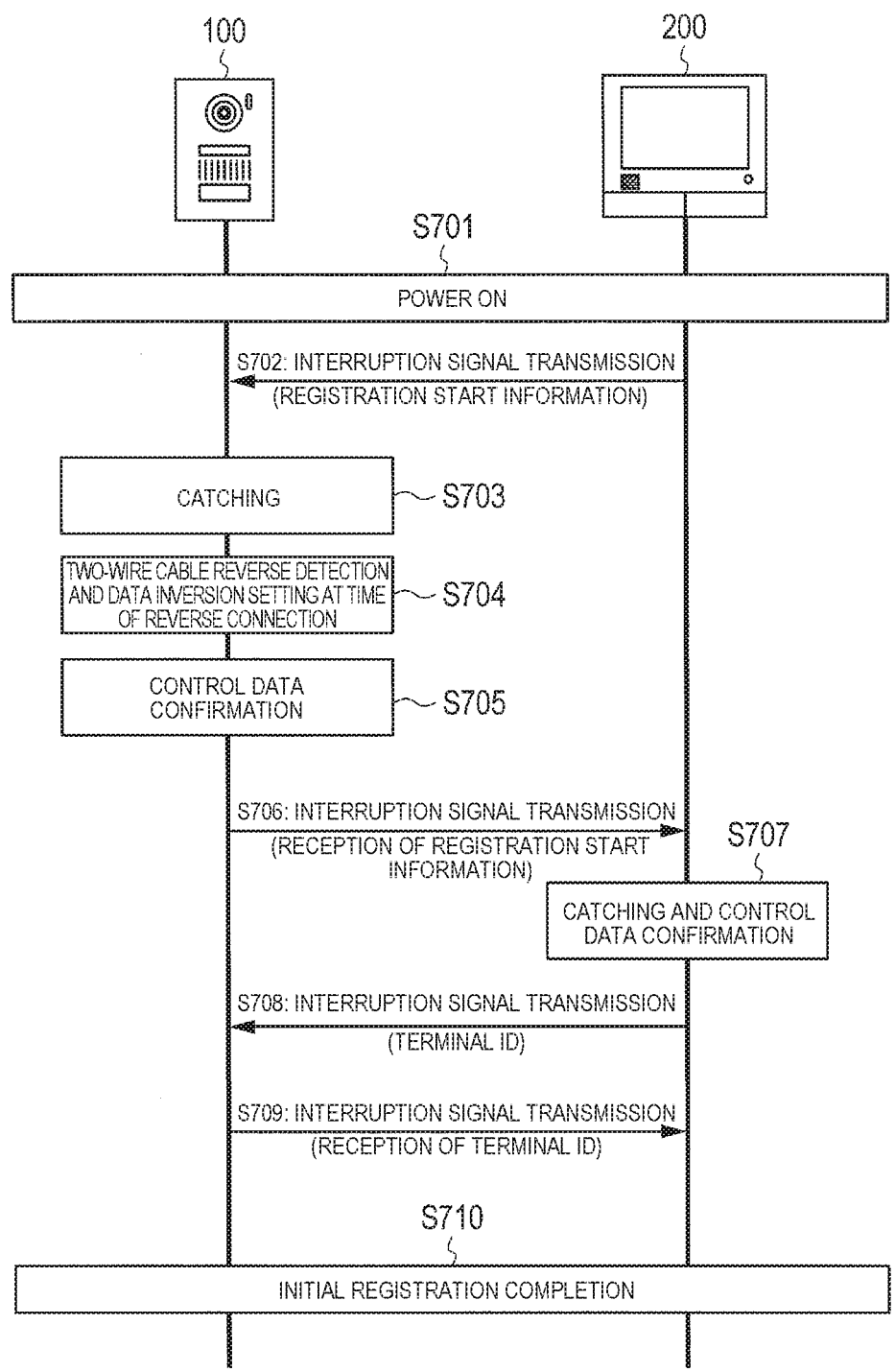

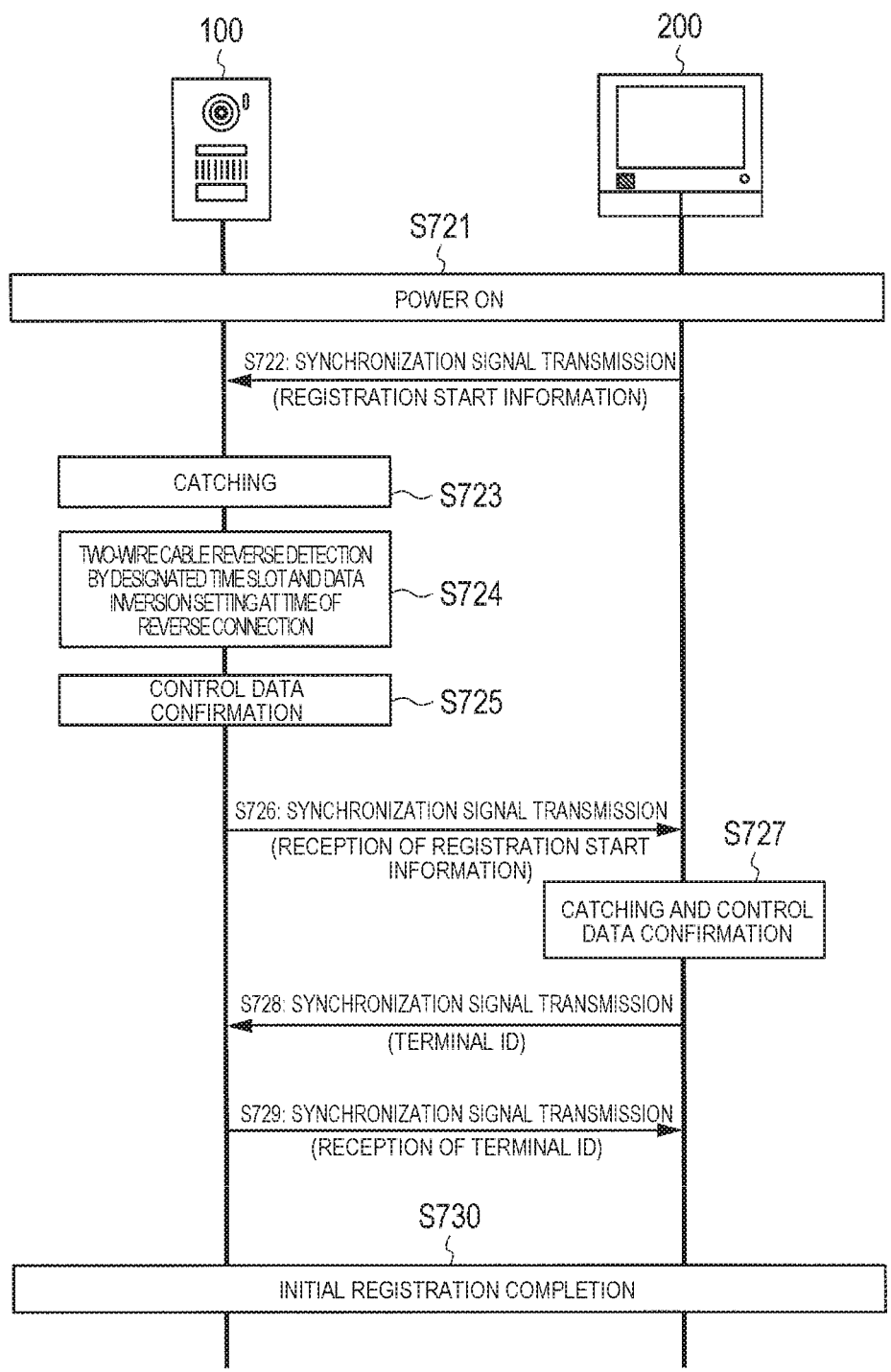

FIG. 22

| DEVICE | P1 | P2 | P3 | P4 | P5 | P6 | P7 |
|---|---|---|---|---|---|---|---|
| MASTER-DEVICE CONTROLLER | RECEPTION | TRANSMISSION | RECEPTION | RECEPTION | RECEPTION | RECEPTION | RECEPTION |
| DRV1 | Rx | Tx | Rx | Tx | Tx | Tx | Tx |
| DRV2 | Rx | Tx | Tx | Rx | Tx | Tx | Tx |
| DRV3 | Rx | Tx | Tx | Tx | Rx | Tx | Tx |
| DRV4 | Rx | Tx | Tx | Tx | Tx | Rx | Tx |
| DRV5 | Rx | Tx | Tx | Tx | Tx | Tx | Rx |

FIG. 24

| DEVICE | EP1 | EP2 | EP3 | EP4 | EP5 |
|---|---|---|---|---|---|
| MASTER-DEVICE CONTROLLER | TRANSMISSION | TRANSMISSION | TRANSMISSION | TRANSMISSION | TRANSMISSION |
| DRV1 | Tx | Rx | Rx | Rx | Rx |
| DRV2 | Rx | Tx | Rx | Rx | Rx |
| DRV3 | Rx | Rx | Tx | Rx | Rx |
| DRV4 | Rx | Rx | Rx | Tx | Rx |
| DRV5 | Rx | Rx | Rx | Rx | Tx |

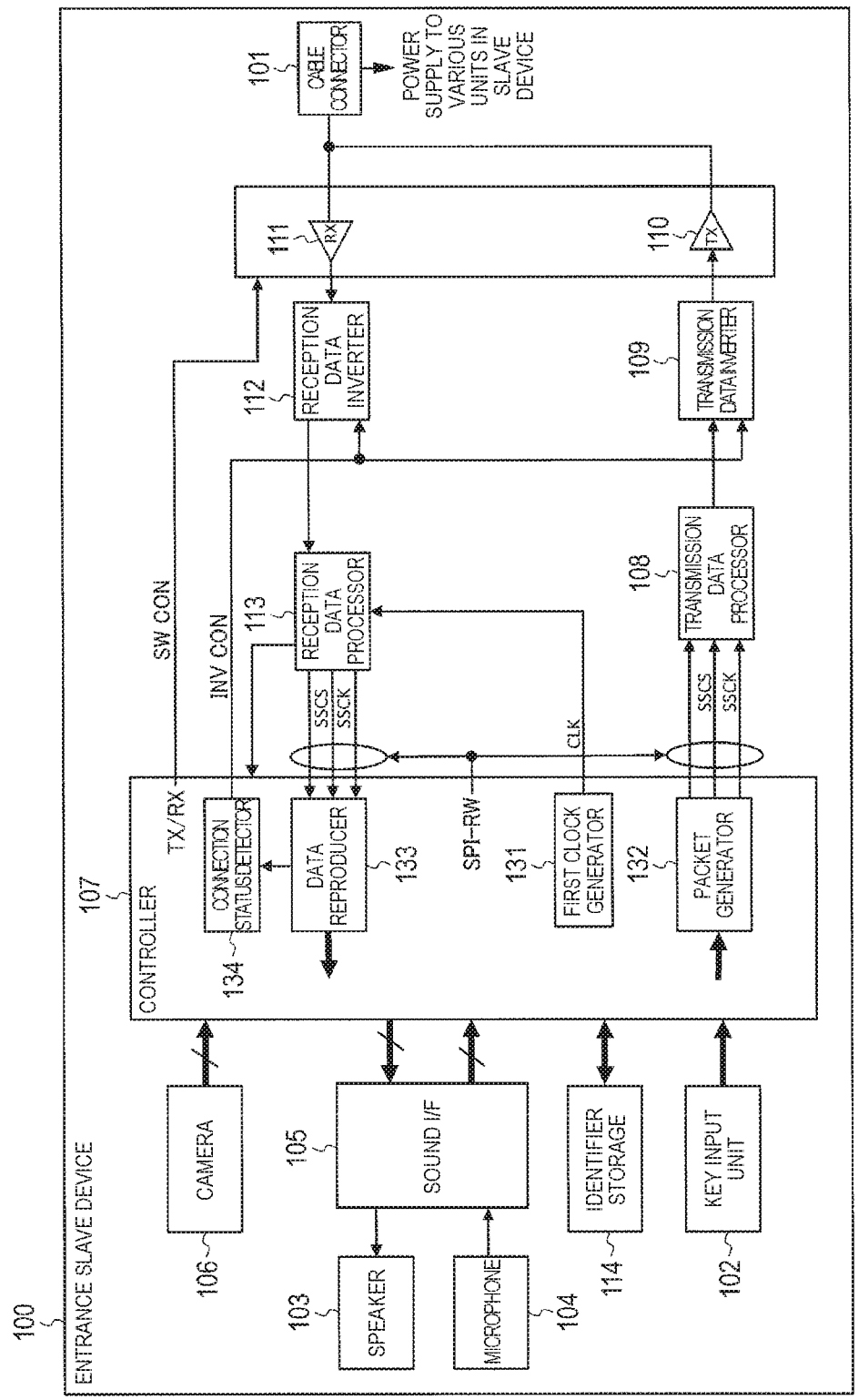

INTERCOM SYSTEM AND COMMUNICATION METHOD THEREOF

BACKGROUND

1. Technical Field

The present disclosure relates to an intercom system and a communication method thereof.

2. Description of the Related Art

Recently, an intercom system has been widely used in a house and the like. The intercom system is configured by, for example, a slave device (referred to as "an entrance slave device" below) and a master device (referred to as "an intercom master device" below). The slave device is installed at an entrance on the outside of a house, and has a camera attached thereto. The master device is installed in the house, and displays an image captured by the camera of the entrance slave device, on a monitor. A monitor (referred to as "an additional monitor" below) may be additionally installed in the intercom system.

Generally, in the intercom system, the entrance slave device and the intercom master device are connected to each other by using a two-wire cable. The intercom master device and the additional monitor are connected to each other by using a two-wire cable. The publication of Japanese Patent Unexamined Publication No. 2007-124227 discloses an intercom system in which packets are transmitted and received between an entrance slave device and an intercom master device which are connected to each other by using a two-wire cable.

SUMMARY

However, in the related art, in a case where a construction worker reversely connects the two-wire cable to the entrance slave device or the intercom master device when the intercom system is initially set, when being operated, or when being additionally installed, demodulation of data in a device on the reception side is not possible. Thus, many efforts are required for preventing the reverse connection, and thus a problem that work efficiency in wiring of the two-wire cable is degraded occurs.

An object of the present disclosure is to provide an intercom system and a communication method thereof which can achieve improvement of work efficiency when a construction worker wires a two-wire cable.

According to the present disclosure, there is provided an intercom system in which a master device is connected with a slave device through a two-wire cable, and a packet signal is transmitted and received between the master device and the slave device by time division duplex. The slave device includes a camera, a microphone, and a speaker. The slave device transmits an uplink packet signal which includes image data obtained by the camera and sound data obtained by the microphone, to the master device. The slave device receives a downlink packet signal from the master device so as to reproduce data, and outputs sound data included in the downlink packet signal from the speaker. The master device includes a display, a microphone, and a speaker. The master device receives the uplink packet signal from the slave device so as to reproduce data, displays image data included in the uplink packet signal in the display, and outputs sound data included in the uplink packet signal from the speaker. The master device transmits the downlink packet signal which includes sound data obtained by the microphone, to the slave device. The slave device determines whether the two-wire cable is forward connected or reversely connected. In a case where the two-wire cable is reversely connected, the slave device reproduces data after reversing the received downlink packet signal, and transmits the uplink packet signal after reversing the uplink packet signal. Even when the two-wire cable is reversely connected, the master device reproduces data without reversing the uplink packet signal, and transmits the downlink packet signal without reversing the downlink packet signal.

According to the present disclosure, there is provided a communication method which is a communication method of an intercom system in which a master device including a display, a microphone, and a speaker is connected with a slave device including a camera, a microphone, and a speaker, through a two-wire cable, and a packet signal is transmitted and received between the master device and the slave device by time division duplex. The method includes causing the slave device to determine whether the two-wire cable is forward connected or reversely connected, causing the slave device to transmit an uplink packet signal which includes image data obtained by the camera and sound data obtained by the microphone, to the master device without reversing the uplink packet signal, in a case where the two-wire cable is forward connected, and causing the slave device to transmit the uplink packet signal to the master device after reversing the uplink packet signal, in a case where the two-wire cable is reversely connected, causing the master device to receive the uplink packet signal from the slave device so as to reproduce data, to display image data included in the uplink packet signal in the display, to output sound data included in the uplink packet signal from the speaker, and to transmit the downlink packet signal which includes sound data obtained by the microphone, to the slave device, and causing the slave device to receive the downlink packet signal from the master device, to reproduce data without reversing the downlink packet signal, in a case where the two-wire cable is forward connected, and reproduce data after reversing the downlink packet signal, in a case where the two-wire cable is reversely connected, and to output sound data included in the downlink packet signal from the speaker.

According to the present disclosure, in a case where a two-wire cable is reversely connected, data is reversed and then transmitted or received in any one of a transmission-side device or a reception-side device. Thus, the reception-side device can demodulate data regardless of a connection status of the two-wire cable. Accordingly, since a construction worker can wire a two-wire cable without paying attention to the connection status (forward connection or reverse connection), it is possible to improve work efficiency in wiring of the two-wire cable.

BRIEF DESCRIPTION OF THE DRAWINGS

FIG. 1A is a system configuration diagram illustrating a configuration of an intercom system according to an exemplary embodiment of the present disclosure;

FIG. 2A is a frame structure diagram illustrating a frame structure and a time-slot structure according to the exemplary embodiment of the present disclosure;

FIG. 2B is a configuration diagram of an interruption signal according to the exemplary embodiment of the present disclosure;

FIG. 10A is a diagram illustrating an example of synchronization detection processing of the entrance slave device according to the exemplary embodiment of the present disclosure;

FIG. 10B is a diagram illustrating an example of the synchronization detection processing of the entrance slave device according to the exemplary embodiment of the present disclosure;

FIG. 13 is a sequence diagram illustrating initial registration (registration of a slave device, use of an interruption signal) after resetting is released, according to the exemplary embodiment of the present disclosure;

FIG. 14 is a sequence diagram illustrating the initial registration (registration of the slave device, use of a synchronization signal) after resetting is released, according to the exemplary embodiment of the present disclosure;

FIG. 22 is a diagram illustrating a specific example of routing control when the intercom master device according to the exemplary embodiment of the present disclosure is normally operated;

FIG. 24 is a diagram illustrating a specific example of routing control when the intercom master device according to the exemplary embodiment of the present disclosure is initially registered;

FIG. 33 is a block diagram illustrating a configuration of an entrance slave device in the other Exemplary Embodiment 2.

DETAILED DESCRIPTIONS

Hereinafter, exemplary embodiments of the present disclosure will be described in detail with reference to the drawings.

Outline of System

Firstly, an outline of an intercom system according to an exemplary embodiment of the present disclosure will be described with reference to FIG. 1A. As illustrated in FIG.

1A, intercom system 1 includes entrance slave device 100 and intercom master device 200. In FIG. 1, a case where three entrance slave devices 100-1, 100-2, and 100-3 are connected to intercom master device 200 is exemplified. Additional monitor 300 may be added to intercom system 1. Intercom system 1 can be also connected with other intercom systems.

Entrance slave device 100 is provided at an entrance of a house and the like, for example. Intercom master device 200 and additional monitor 300 are provided in a house and the like, for example. Intercom master device 200 and additional monitor 300 are fixed to a wall, or are placed on a table, a stand, or the like. Entrance slave device 100 and intercom master device 200 are connected to each other by using a two-wire cable which is formed from a pair of copper wires. Additional monitor 300 is connected with intercom master device 200 by using the two-wire cable.

Intercom master device 200 communicates with entrance slave device 100. Intercom master device 200 receives image data, sound data, and control data from entrance slave device 100, and transmits sound data and control data. Intercom master device 200 communicates with the additional monitor 300. Intercom master device 200 transmits the image data, the sound data, and the control data which have been received from entrance slave device 100, to additional monitor 300. Intercom master device 200 transmits sound data and control data which have been received from additional monitor 300, to entrance slave device 100.

In the following descriptions, a direction from entrance slave device 100 or additional monitor 300 to intercom master device 200 is referred to as "an uplink direction". A packet and a signal which are transmitted from entrance slave device 100 or additional monitor 300 in the uplink direction are respectively referred to as "an uplink packet" and "an uplink signal". A direction from intercom master device 200 to entrance slave device 100 or additional monitor 300 is referred to as "a downlink direction". A packet and a signal which are transmitted from intercom master device 200 in the downlink direction are respectively referred to as "a downlink packet" and "a downlink signal".

Figure 1B:
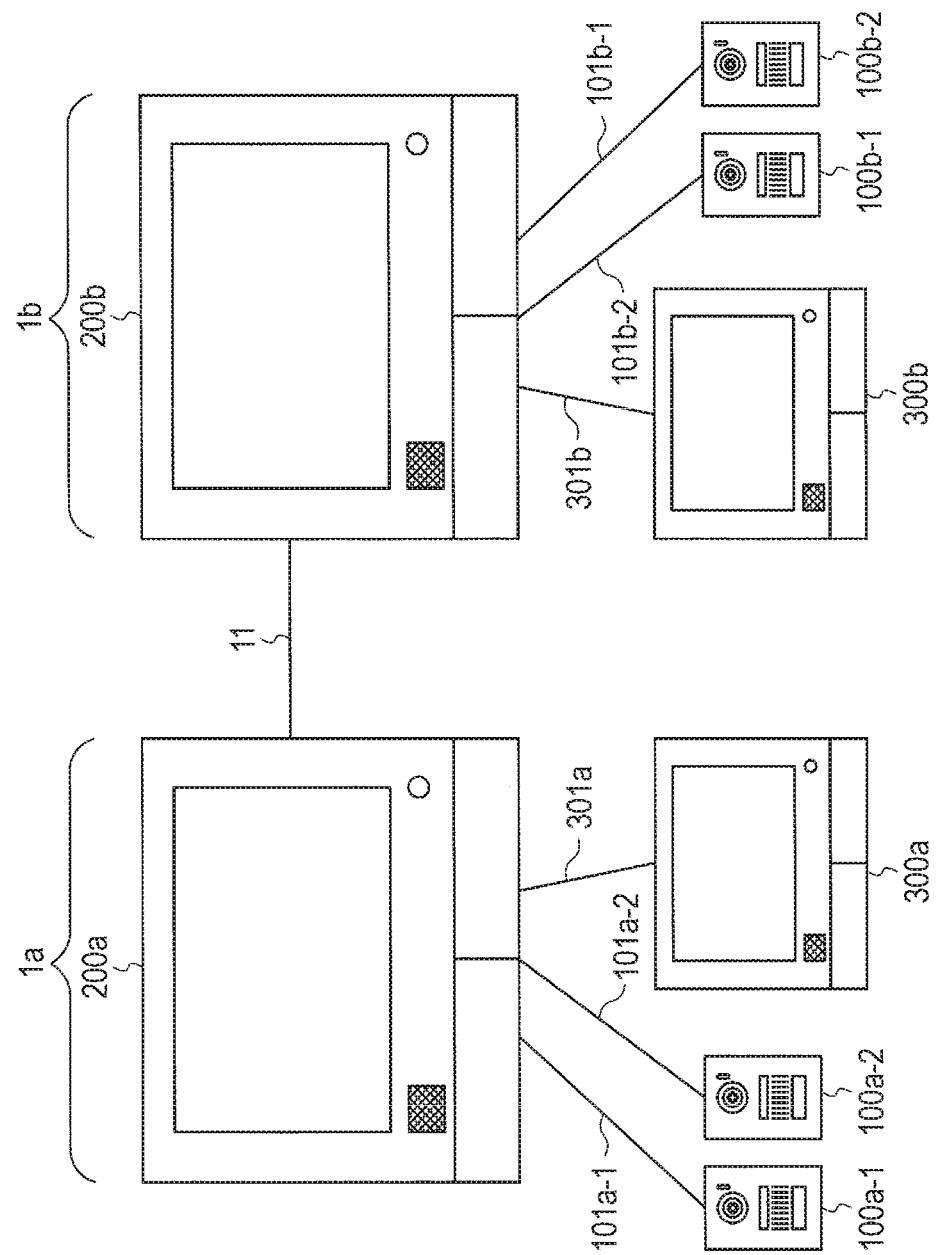
FIG. 1B is a system configuration diagram illustrating a configuration of the intercom system according to the exemplary embodiment of the present disclosure.

FIG. 1B is a system configuration diagram illustrating another example of a configuration of the intercom system according to the exemplary embodiment. The intercom system according to FIG. 1B is a system installed in, for example, a two-household house in which a residential space is divided into a space for a parent household and a space for a child household.

As illustrated in FIG. 1B, intercom system 1 includes first intercom system 1a, second intercom system 1b, and communication cable 11. First intercom system 1a is disposed in the residential space for the parent household, for example. Second intercom system 1b is disposed in the residential space for the child household, for example. Communication cable 11 is used for connecting first intercom system 1a and second intercom system 1b.

First intercom system 1a includes two first entrance slave devices 100a-1 and 100a-2, first intercom master device 200a, and first additional monitor 300a. Each of first entrance slave devices 100a-1 and 100a-2, and First additional monitor 300a is connected to First intercom master device 200a through communication cables 101a-1, 101a-2, and 301a. A data transmission function is performed by First intercom master device 200a, and thus first intercom system 1a forms a star-type communication network in which First intercom master device 200a is set as the center.

Second intercom system 1b includes two second entrance slave devices 100b-1 and 100b-2, second intercom master device 200b, and second additional monitor 300b. Each of the second entrance slave devices 100b-1 and 100b-2, and second additional monitor 300b is connected to second intercom master device 200b through communication cables 101b-1, 101b-2, and 301b. A data transmission function is performed by second intercom master device 200b, and thus second intercom system 1b forms a star-type communication network in which second intercom master device 200b is set as the center.

Communication cable 11 connects first intercom master device 200a and second intercom master device 200b with each other. Each of communication cables 11, 101a-1, 101a-2, 301a, 101b-1, 101b-2, and 301b is a two-wire cable which is formed from a pair of copper wires.

In the following descriptions, since first intercom master device 200a and second intercom master device 200b have the same configuration, first intercom master device 200a and second intercom master device 200b will be described appropriately collectively as "intercom master device 200". Since first entrance slave devices 100a-1 and 100a-2, and second entrance slave devices 100b-1 and 100b-2 have the same configuration, first entrance slave devices 100a-1 and 100a-2, and second entrance slave devices 100b-1 and 100b-2 will be described appropriately collectively as "entrance slave device 100". Since first additional monitor 300a and second additional monitor 300b have the same configuration, first additional monitor 300a and second additional monitor 300b will be described appropriately collectively as "additional monitor 300".

Entrance slave device 100 is provided at an entrance of each of the residential space for the parent household and the residential space for the child household. Intercom master device 200 and additional monitor 300 are provided in a house of each of the residential space for the parent household and the residential space for the child household. Intercom master device 200 and additional monitor 300 are fixed to a wall, or are placed on a table, a stand, or the like.

When a predetermined operation such as an operation of a call button is performed, entrance slave device 100 generates a control signal which includes a call signal. Entrance slave device 100 captures an image of the vicinity of the entrance so as to generate image data, and acquires sound of the vicinity of the entrance so as to generate sound data. Entrance slave device 100 performs, for example, output of sound, in accordance with sound data received from intercom master device 200, and control information.

Intercom master device 200 communicates with entrance slave device 100. Intercom master device 200 receives a control signal, image data, and sound data from entrance slave device 100, and transmits the sound data and the control information. Intercom master device 200 communicates with additional monitor 300. Intercom master device 200 transmits the control signal, the image data, and the sound data (appropriately referred to as "various types of slave device data" below) which have been received from entrance slave device 100, to additional monitor 300. Intercom master device 200 transmits the sound data and the control information which have been received from additional monitor 300, to entrance slave device 100.

When the call signal is received from entrance slave device 100, intercom master device 200 outputs a ringing tone, and outputs an image and sound of the vicinity of the entrance. If a predetermined operation such as an operation of a response button is performed, intercom master device 200 acquires sound of the vicinity of intercom master device 200 so as to generate sound data, and transmits the generated sound data to entrance slave device 100 along with control information.

Intercom master device 200 communicates with the other intercom master device 200 of intercom system 1. Intercom master device 200 transmits various types of slave device data received from entrance slave device 100, to the other intercom master device 200. Intercom master device 200 performs predetermined processing (for example, an output or transmission of sound or an image) on the various types of slave device data received from the other intercom master device 200.

Additional monitor 300 outputs a ringing tone and outputs an image and sound of the vicinity of the entrance, when receiving the call signal from intercom master device 200. If a predetermined operation such as an operation of a response button is performed, additional monitor 300 acquires sound of the vicinity of additional monitor 300 so as to generate sound data, and transmits the generated sound data to intercom master device 200 along with control information.

In the following descriptions, intercom master device 200 which manages slots is referred to as "a main master device", and intercom master device 200 which does not manage the slots is referred to as "a sub-master device". A direction from entrance slave device 100 or additional monitor 300 to intercom master device 200, and a direction from the sub-master device to the main master device are referred to as "an uplink direction". A direction from intercom master device 200 to entrance slave device 100 or additional monitor 300, and a direction from the main master device to the sub-master device is referred to as "a downlink direction". A packet and a signal which are transmitted in the uplink direction are respectively referred to as "an uplink packet" and "an uplink signal". A packet and a signal which are transmitted in the downlink direction are respectively referred to as "a downlink packet" and "a downlink signal". The main master device sets IDs for all devices.

Frame Structure and Time-Slot Structure

Next, a frame structure and a time-slot structure during synchronous communication according to the exemplary embodiment will be described with reference to FIG. 2A. As illustrated in FIG. 2A, each frame has an area of 48000 bits. Each frame corresponds to a period of 10 ms and a bit rate of 4.8 Mbps. Each frame is split into 24 time slots. Accordingly, each time slot has an area of 2000 bits=250 bytes, and corresponds to a period of 0.416 ms and a bit rate of 4.8 Mbps.

Each time slot is separated into a guard space (Guard) of 52 bytes, a preamble field of 4 bytes, a synchronization field (Sync) of 2 bytes, a control data field of 32 bytes, and a user data field of 160 bytes.

The guard space is a period for avoiding collision between time slots due to a propagation delay time difference, a clock jitter, and the like. Preamble data (which will be described later) having a predetermined unique pattern is added to the preamble field. A predetermined synchronization pattern is added to the synchronization field. Control data is added to the control data field. Image data and sound data are added to the user data field. Here, the synchronization pattern is known data or a data sequence allocated to the synchronization field. The synchronization pattern is used for establishing synchronization when reception data is received, and the synchronization pattern is a known data pattern which has been predefined in order to confirm that the reception data has been received at a precise timing.

Configuration of Interruption Signal

Next, a configuration of an interruption signal during asynchronous communication according to the exemplary embodiment will be described with reference to FIG. 2B.

As illustrated in FIG. 2B, the interruption signal is separated into a preamble field of 4 bytes, a synchronization field (Sync) of 2 bytes, and a control data field of 32 bytes. Further, a user data field of 30 bytes is provided in the interruption signal illustrated in FIG. 2B, in order to being used for the future extension.

Preamble data and a synchronization pattern of the interruption signal are the same as those of the time slot during synchronous communication, which is illustrated in FIG. 2A. Thus, since a receptor and the like can be commonly used during the synchronous communication and during the asynchronous communication, it is possible to reduce cost.

Control information such as a message type (synchronization request and the like) and a transmission source device number (ID) is written in the control data field of the interruption signal. The user data field of the interruption signal may be used as a filed for a notification of device abnormality information (information indicating that abnormality of a device is detected), for example, for a notification of details information in accordance with a message type.

The interruption signal illustrated in FIG. 2B is also used when a connection device is initially registered.

Configuration of Entrance Slave Device

Figure 3A:
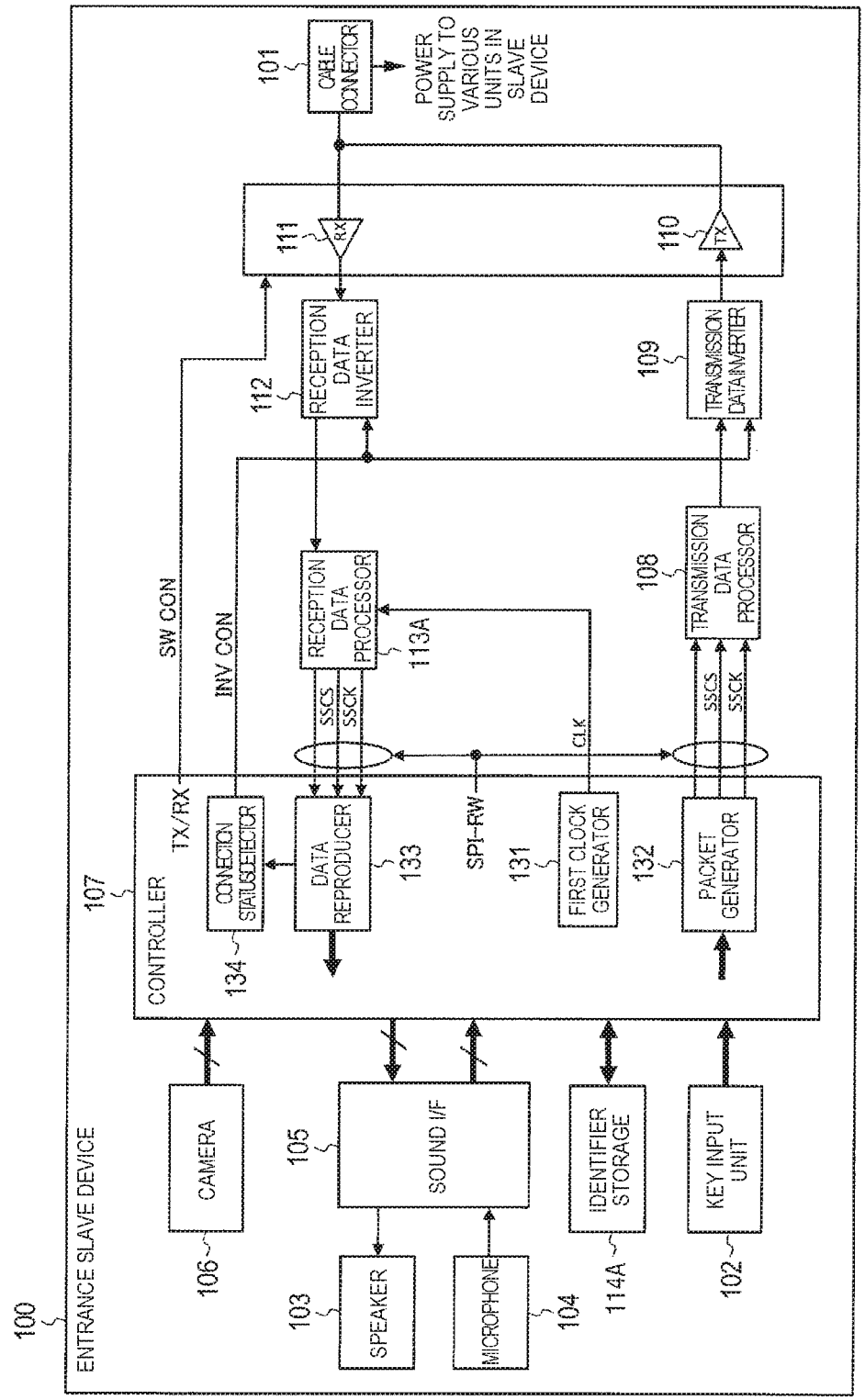
FIG. 3A is a block diagram illustrating a configuration of an entrance slave device according to the exemplary embodiment of the present disclosure.

Next, a configuration of entrance slave device 100 will be described with reference to the block diagram of FIG. 3A. As illustrated in FIG. 3A, entrance slave device 100 includes cable connector 101, key input unit 102, speaker 103, microphone 104, sound I/F (interface) 105, camera 106, and controller 107. Controller 107 includes first clock generator 131, packet generator 132, data reproducer 133, and connection status detector 134 in the inside thereof. Entrance slave device 100 includes transmission data processor 108, transmission data inverter 109, transmission driver 110, reception driver 111, reception data inverter 112, reception data processor 113A, and identifier storage 114A.

Cable connector 101 includes a connection terminal for a two-wire cable, and connects one end of the two-wire cable on the entrance side, with reception driver 111 and transmission driver 110 in a state where a signal can be transmitted between the one end of the two-wire cable on the entrance side, and reception driver 111 and transmission driver 110. Another end of the two-wire cable is connected to intercom master device 200. Cable connector 101 receives power supplied from intercom master device 200 through the two-wire cable, and supplies power to each of the units of entrance slave device 100. A configuration of cable connector 101 will be described later in detail.

Key input unit 102 includes a call button. When the call button is operated, key input unit 102 outputs a signal indicating that the call button is operated, to controller 107.

Speaker 103 converts analog sound data output from sound I/F 105 into sound, and outputs the sound.

Microphone 104 collects sound of the vicinity thereof, converts the resultant of the collection into analog sound data, and outputs the analog sound data to sound I/F 105.

Sound I/F 105 converts digital sound data output from controller 107, into analog sound data. Sound I/F 105 adjusts a signal level, and outputs a signal having an adjusted signal level, to speaker 103. Sound I/F 105 adjusts a signal level of analog sound data output from microphone 104. Sound I/F 105 converts the analog sound data into digital sound data, and outputs the digital sound data to controller 107. The analog-digital conversion is performed by an A/D converter and a D/A converter (not illustrated).

Predetermined sound compression processing is performed on data which is obtained by performing digital conversion of the analog sound data output from microphone 104. Sound I/F 105 may output data obtained by performing the sound compression processing, to controller 107 as digital sound data. In a case where digital sound data output from controller 107 is the data obtained by performing the predetermined sound compression processing, sound I/F 105 performs predetermined sound decompression processing on this digital sound data, and then performs digital-to-analog conversion.

Camera 106 includes a digital camera. Camera 106 captures an image of the entrance so as to generate digital image data, and outputs the generated digital image data to controller 107. Camera 106 may have an encoder module mounted therein. That is, camera 106 may output data obtained by performing predetermined video compression processing such as H.264 on image data output from the digital camera, to controller 107 as digital image data.

Controller 107 controls the units of entrance slave device 100. Controller 107 outputs a switching control signal (SW CON) to transmission driver 110 and reception driver 111. The switching control signal (SW CON) is used for an instruction of a transmission section in which transmission is permitted, and a reception section in which reception is permitted.

First clock generator 131 of controller 107 generates a clock (CLK) of a first frequency (for example, 48 MHz (n=10)), which is a clock for sampling reception data. The first frequency corresponds to n times (n is equal to or more than 1) a bit rate of the reception data based on a crystal oscillation frequency. First clock generator 131 outputs the generated clock (CLK) to reception data processor 113A.

Packet generator 132 of controller 107 generates an uplink packet for realizing a call with an image. Specifically, packet generator 132 appropriately splits digital sound data output from sound I/F 105, and digital image data output from camera 106. Packet generator 132 writes pieces of data obtained by the split, in user data field of time slots, respectively. Packet generator 132 writes control data which includes an identifier (referred to as "the own-device IDslave" below) specific to the own device (entrance slave device 100) and an identifier (referred to as "an IDmaster" below) of intercom master device 200 as the communication counterpart, in the control data field of each of the time slots. Packet generator 132 writes preamble data and a synchronization pattern in each of the time slots, and generates an uplink packet (transmission data). Packet generator 132 generates an enable signal (SSCS) for transmission, and a clock (SSCK) of a second frequency (for example, 4.8 MHz) for transmission. Packet generator 132 synchronizes the uplink packet with the enable signal (SSCS) and the clock (SSCK) for the transmission, and outputs the uplink packet to transmission data processor 108. The clock (SSCK) is generated based on the crystal oscillation frequency.

Packet generator 132 does not generate the uplink packet, in a standby state where data is not transmitted and received between entrance slave device 100 and intercom master device 200. If a predetermined event (for example, an operation of a call button) occurs in the standby state (during asynchronous communication), packet generator 132 generates an uplink packet (interruption signal) in which preamble data, a synchronization pattern, and control data are written. The preamble and the synchronization pattern used in the interruption signal during the asynchronous communication are the same as those used during the synchronous communication.

If the enable signal (SSCS) is input from reception data processor 113, data reproducer 133 of controller 107 reproduces a downlink packet output from reception data processor 113A, by using the clock (SSCK) of the second frequency which has been output from reception data processor 113A. Data reproducer 133 outputs digital sound data included in the reproduced downlink packet (decoded data), to sound I/F 105, and outputs a synchronization pattern to connection status detector 134. Data reproducer 133 stores an own-device IDslave and an IDmaster which are included in the downlink packet, in identifier storage 114A when the device is initially registered.

In a case where a predetermined event occurs in the standby state (during the asynchronous communication) and a downlink signal (interruption signal) is input, data reproducer 133 demodulates the downlink signal so as to acquire a downlink packet, and outputs the synchronization pattern included in the downlink packet, to connection status detector 134. Data reproducer 133 extracts control data from the interruption signal after data reproducer 133 confirms that connection status detector 134 can accurately catch the interruption signal. If the control data corresponds to a synchronization request, entrance slave device 100 transitions the process to synchronization processing with intercom master device 200.

Connection status detector 134 of controller 107 stores a synchronization pattern for a check in a case where the two-wire cable is forward connected (referred to as "a synchronization pattern for forward connection check" below (for example, all of 16 bits are "0")) and stores a synchronization pattern for a check in a case where the two-wire cable is reversely connected (referred to as "a synchronization pattern for reverse connection check" below (for example, all of 16 bits are "1")). The synchronization pattern for reverse connection check is a pattern obtained by inverting the synchronization pattern for forward connection check. Connection status detector 134 compares the synchronization pattern of the reception data output from data reproducer 133, to the synchronization pattern for forward connection check and the synchronization pattern for reverse connection check. In a case where the synchronization pattern of the reception data completely coincides with the synchronization pattern for forward connection check, connection status detector 134 determines that the two-wire cable is forward connected. In a case where the synchronization pattern of the reception data completely coincides with the synchronization pattern for reverse connection check, connection status detector 134 determines that the two-wire cable is reversely connected. Connection status detector 134 outputs an inverted control signal (INV CON) which indicates a determination result, to transmission data inverter 109 and reception data inverter 112.

If the enable signal (SSCS) is input from packet generator 132, transmission data processor 108 performs modulation processing on data of the uplink packet output from packet generator 132 by using the clock (SSCK) of the second frequency which has been output from packet generator 132, so as to generate an uplink signal. Transmission data processor 108 outputs the generated uplink signal to transmission data inverter 109. Details (specific example) of the modulation processing in transmission data processor 108 will be described later.

In a case where connection status detector 134 determines that the two-wire cable is reversely connected, transmission data inverter 109 inverts the uplink signal output from transmission data processor 108 and outputs the inverted uplink signal to transmission driver 110. In a case where connection status detector 134 determines that the two-wire cable is forward connected, transmission data inverter 109 outputs the uplink signal itself output from transmission data processor 108 to transmission driver 110.

Transmission driver 110 transmits the uplink signal to intercom master device 200 through cable connector 101 in a transmission section of which an instruction is performed by the switching control signal (SW CON) from controller 107.

Reception driver 111 receives the downlink signal transmitted from intercom master device 200, through cable connector 101. Reception driver 111 outputs the downlink signal to reception data inverter 112 in a reception section of which an instruction is performed by the switching control signal (SW CON) from controller 107.

In a case where connection status detector 134 determines that the two-wire cable is reversely connected, reception data inverter 112 inverts the downlink signal output from reception driver 111 and outputs the inverted downlink signal to reception data processor 113A. In a case where connection status detector 134 determines that the two-wire cable is forward connected, reception data inverter 112 outputs the downlink signal itself output from reception driver 111 to reception data processor 113A.

Reception data processor 113A detects synchronization (the leading timing of each bit in the reception data) with intercom master device 200 by using the clock (CLK) of the first frequency which has been output from first clock generator 131, and by using preamble data which is included in the downlink signal output from reception driver 111. Reception data processor 113A outputs an enable signal (SSCS) for permitting data reproduction operation, to data reproducer 133 at a timing when the unique pattern of the preamble data is detected.

Reception data processor 113A decodes the downlink signal (reception data) output from reception data inverter 112, and outputs the decoded data to data reproducer 133. Reception data processor 113A generates a clock (SSCK) of the second frequency (for example, 4.8 MHz) which corresponds to the bit rate of the reception data, based on the clock (CLK) of the first frequency which has been output from first clock generator 131. Reception data processor 113A outputs the generated clock (SSCK) to data reproducer 133. A configuration of reception data processor 113A will be described later in detail.

Identifier storage 114A stores the own-device IDslave and the IDmaster which have been received from intercom master device 200.

Configuration of Entrance Slave Device

Figure 3B:
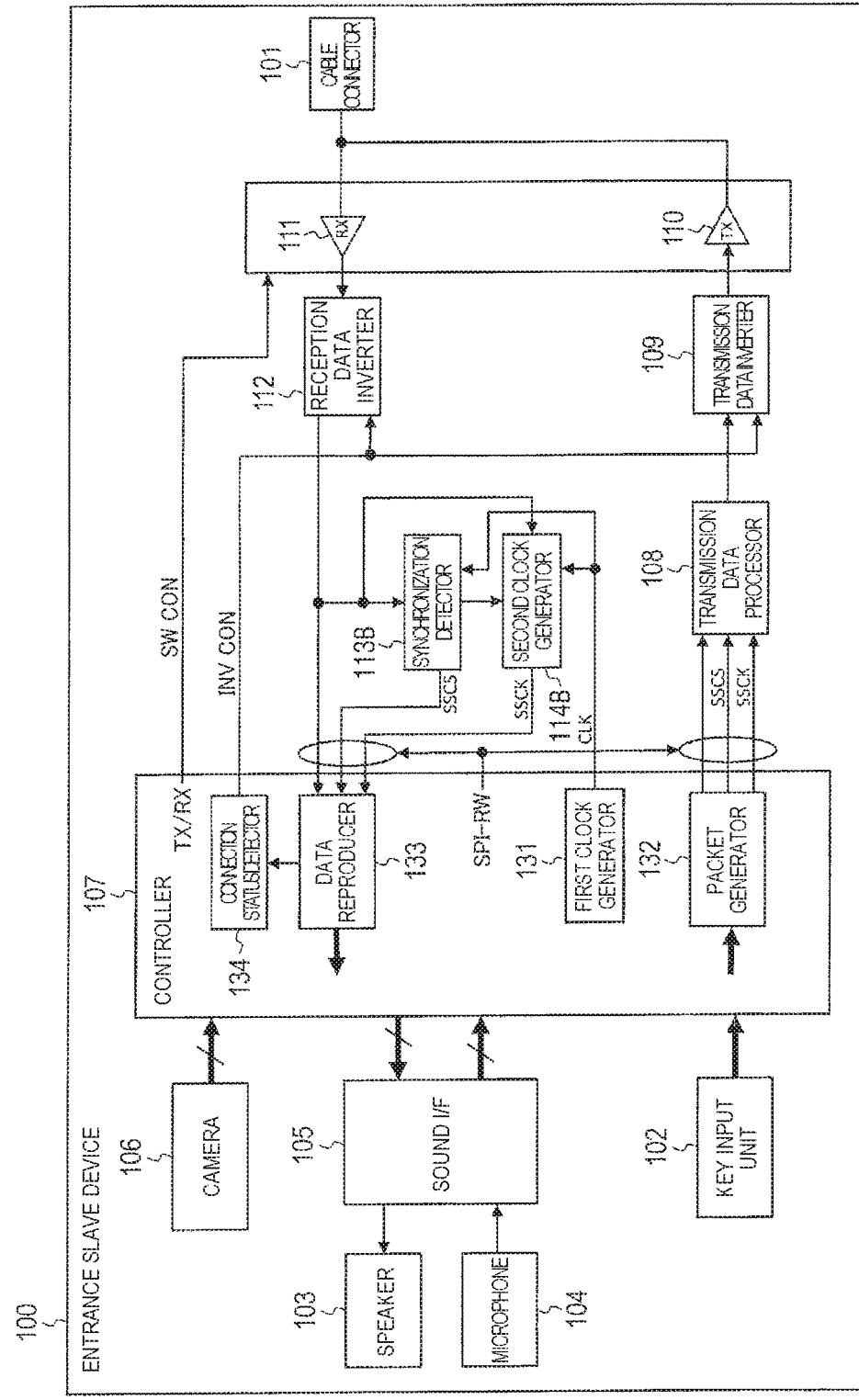
FIG. 3B is a block diagram illustrating the configuration of the entrance slave device according to the exemplary embodiment of the present disclosure.

Next, another configuration of entrance slave device 100 will be described with reference to the block diagram in FIG. 3B. Parts which are the same as those in FIG. 3A are denoted by the same reference signs. In a case where functions or operations are the same as those in FIG. 3A, descriptions thereof will be omitted. As illustrated in FIG. 3B, entrance slave device 100 includes cable connector 101, key input unit 102, speaker 103, microphone 104, sound I/F (interface) 105, camera 106, and controller 107. Controller 107 includes first clock generator 131, packet generator 132, data reproducer 133, and connection status detector 134. Entrance slave device 100 includes transmission data processor 108, transmission data inverter 109, transmission driver 110, reception driver 111, reception data inverter 112, synchronization detector 113B, and second clock generator 114B.

First clock generator 131 of controller 107 generates a clock (CLK) of the first frequency (for example, 48 MHz (n=10)), which is a clock for sampling reception data. The first frequency corresponds to n times (n is equal to or more than 1) the bit rate of the reception data based on the crystal oscillation frequency. First clock generator 131 outputs the generated clock (CLK) to synchronization detector 113B and second clock generator 114B.

Packet generator 132 of controller 107 generates an uplink packet for realizing a call with an image. Specifically, packet generator 132 appropriately splits digital sound data output from sound I/F 105, and digital image data output from camera 106. Packet generator 132 writes pieces of data obtained by the split, in user data field of time slots, respectively. Packet generator 132 writes control data in the control data field of each of the time slots. Packet generator 132 writes the preamble data and the synchronization pattern in each of the time slots, and generates an uplink packet (transmission data). Packet generator 132 generates an enable signal (SSCS) for transmission, and a clock (SSCK) of a second frequency (for example, 4.8 MHz) for transmission. Packet generator 132 synchronizes the uplink packet with the enable signal (SSCS) and the clock (SSCK) for the transmission, and outputs the uplink packet to transmission data processor 108.

If the enable signal (SSCS) is input from synchronization detector 113B, data reproducer 133 of controller 107 demodulates the downlink signal output from reception data inverter 112 by using the clock (SSCK) of the second frequency which has been output from second clock generator 114B, so as to acquire a downlink packet. Data reproducer 133 outputs digital sound data included in the downlink packet to sound I/F 105, and outputs the synchronization pattern included in the downlink packet (reception data) to connection status detector 134.

In a case where connection status detector 134 determines that the two-wire cable is reversely connected, reception data inverter 112 inverts the downlink signal output from reception driver 111 and outputs the inverted downlink signal to synchronization detector 113B, second clock generator 114B, and data reproducer 133. In a case where connection status detector 134 determines that the two-wire cable is forward connected, reception data inverter 112 outputs the downlink signal itself output from reception driver 111 to synchronization detector 113B, second clock generator 114B, and data reproducer 133.

Synchronization detector 113B detects synchronization (the leading timing of each bit in the reception data) with intercom master device 200, by using the clock (CLK) of the first frequency which has been output from first clock generator 131, and by using the preamble data which is included in the downlink signal output from reception driver 111. Synchronization detector 113B outputs a triggering signal to second clock generator 114B and outputs an enable signal (SSCS) to data reproducer 133 at a timing when the unique pattern of the preamble data is detected. The triggering signal functions as a criterion for starting an output of the clock. The enable signal (SSCS) is used for permitting the data reproduction operation. A configuration of synchronization detector 113B will be described later in detail.

Second clock generator 114B generates a clock (SSCK) of the second frequency (for example, 4.8 MHz) which corresponds to the bit rate of the reception data, based on the clock (CLK) of the first frequency which has been output from first clock generator 131, at a timing of which an instruction is performed from synchronization detector 113B. Second clock generator 114B outputs the generated clock (SSCK) to data reproducer 133.

Configuration of Intercom Master Device

Figure 4A:
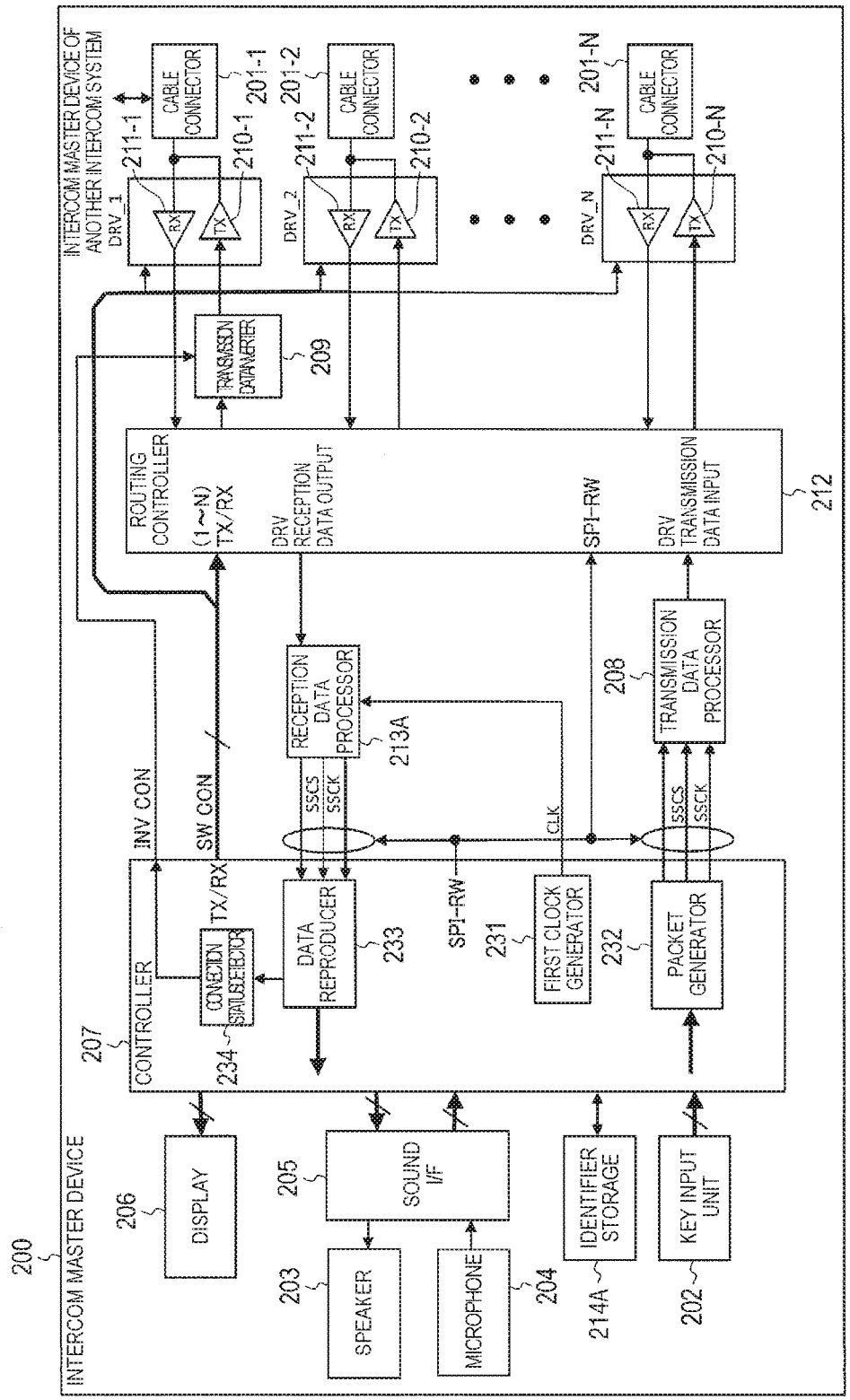
FIG. 4A is a block diagram illustrating a configuration of an intercom master device according to the exemplary embodiment of the present disclosure.

Next, a configuration of intercom master device 200 will be described with reference to the block diagram of FIG. 4A. As illustrated in FIG. 4A, intercom master device 200 includes cable connector 201, key input unit 202, speaker 203, microphone 204, sound I/F 205, display 206, and controller 207. Controller 207 includes first clock generator 231, packet generator 232, data reproducer 233, and connection status detector 234 in the inside thereof. Intercom master device 200 includes transmission data processor 208, transmission data inverter 209, transmission driver 210, reception driver 211, routing controller 212, reception data processor 213A, and identifier storage 214A. Intercom master device 200 includes N (N is the natural number) pieces of cable connectors 201, transmission drivers 210, and reception drivers 211.

Cable connector 201-$i$ ($i$ is any integer of 1 to N) includes a connection terminal for the two-wire cable, and connects one end of the two-wire cable on the indoor side, with transmission driver 210-$i$ and reception driver 211-$i$ in a state where a signal can be transmitted between the one end of the two-wire cable on the indoor side, and transmission driver 210-$i$ and reception driver 211-$i$. Another end of each two-wire cable is connected to entrance slave device 100, additional monitor 300, or a master device of another intercom system. FIG. 4A illustrates a case where cable connector 201-1 is connected to the master device of the other intercom system.

Key input unit 202 includes a response button. When the response button is operated, key input unit 202 outputs a signal indicating that the response button is operated, to controller 207.

Speaker 203 converts analog sound data output from sound I/F 205, into sound and outputs the sound.

Microphone 204 collects sound of the surroundings, converts the collection to analog sound data, and outputs the analog sound data to sound I/F 205.

Sound I/F 205 converts digital sound data output from controller 207, into analog sound data. Sound I/F 205 adjusts a signal level of the analog sound data, and outputs the analog sound data having the adjusted signal level, to speaker 203. Sound I/F 205 adjusts the signal level of analog sound data output from microphone 204. Sound I/F 205 converts the analog sound data having the adjusted signal level, into digital sound data and outputs the digital sound data to controller 207. The analog-digital conversion is performed by an A/D converter and a D/A converter (not illustrated).

Sound I/F 205 may output data obtained by performing predetermined sound compression processing data which is obtained by performing digital conversion of the analog sound data output from microphone 204, to controller 207 as digital sound data. In a case where digital sound data output from controller 207 is the data obtained by performing the predetermined sound compression processing, sound I/F 205 performs predetermined sound decompression processing on this digital sound data, and then performs digital-to-analog conversion.

Display 206 includes a liquid crystal display. Display 206 reproduces digital image data output from controller 207, and thus displays an image of the entrance. In a case where the digital image data output from controller 207 is data obtained by performing predetermined video compression processing, display 206 performs predetermined video decompression processing on this digital image data, and performs image display.

Controller 207 controls the units of intercom master device 200. Controller 207 outputs a switching control signal (SW CON) to each of transmission drivers 210-$i$, each of reception drivers 211-$i$, and routing controller 212. The switching control signal (SW CON) is used for an instruction of a transmission section in which transmission is permitted, and a reception section in which reception is permitted.

First clock generator 231 of controller 207 generates a clock (CLK) of the first frequency (for example, 48 MHz (n=10)), which is a clock for sampling reception data. The first frequency corresponds to n times the bit rate of the reception data based on the crystal oscillation frequency. First clock generator 231 outputs the generated clock (CLK) to reception data processor 213A.

Packet generator 232 of controller 207 generates a downlink packet for realizing a call with an image. Specifically, packet generator 232 appropriately splits digital sound data output from sound I/F 205. Packet generator 232 writes pieces of data obtained by the split, in user data field of time slots, respectively. Packet generator 232 writes control data which includes an identifier (referred to as "the own-device IDmaster" below) specific to the own device (intercom master device 200) and an identifier of a device as the communication counterpart, in the control data field of each of the time slots. Packet generator 232 writes preamble data and the synchronization pattern in each of the time slots, and generates a downlink packet (transmission data). Packet generator 232 generates an enable signal (SSCS) for transmission and a clock (SSCK) of the second frequency (for example, 4.8 MHz), which is used for transmission. Packet generator 232 synchronizes the downlink packet with the enable signal (SSCS) and the clock (SSCK) for transmission, and outputs the downlink packet to transmission data processor 208. The clock (SSCK) is generated based on the crystal oscillation frequency.

Packet generator 232 may output control data relating to an operation of intercom master device 200 or an operation of entrance slave device 100, to transmission data processor 208, as data to be transmitted to entrance slave device 100. Such control data includes, for example, a control signal which is used when intercom master device 200 controls an operation (operation for a data rate, pan, tilt, a light, a shutter, a filter, and the like) of the camera of entrance slave device 100, or which is used when intercom master device 200 controls operations of various sensor devices which are included in entrance slave device 100. Such control data includes a control signal for controlling an operation of a device (electronic key of a door and the like) which is disposed outdoor, through a wireless communication circuit (not illustrated) included in entrance slave device 100.

Packet generator 232 does not generate the downlink packet in the standby state in which data is not transmitted and received between entrance slave device 100 (or additional monitor 300) and intercom master device 200. If a predetermined event (for example, an operation of the response button) occurs in the standby state (during asynchronous communication), packet generator 232 generates a downlink packet (interruption signal) in which preamble data, a synchronization pattern, and control data are written. The preamble and the synchronization pattern used in the interruption signal during the asynchronous communication are the same as those used during the synchronous communication.

If the enable signal (SSCS) is input from reception data processor 213A, data reproducer 233 of controller 207 reproduces the uplink packet output from reception data processor 213A by using the clock (SSCK) of the second frequency which has been output from reception data processor 213A. Data reproducer 233 outputs digital sound data included in the reproduced uplink packet (decoded data) to sound I/F 205, outputs digital image data to display 206, and outputs the synchronization pattern to connection status detector 234.

In a case where the predetermined event occurs and the uplink signal (interruption signal) is input in the standby state (during the asynchronous communication), data reproducer 233 demodulates the uplink signal so as to acquire an uplink packet, and outputs the synchronization pattern included in the uplink packet, to connection status detector 234. Data reproducer 233 extracts control data from the interruption signal after data reproducer 233 confirms that connection status detector 234 can accurately catch the interruption signal. If the control data corresponds to a synchronization request, intercom master device 200 transitions the process to synchronization processing with entrance slave device 100 or additional monitor 300.

Connection status detector 234 of controller 207 stores the synchronization pattern for forward connection check and the synchronization pattern for reverse connection check. Connection status detector 234 compares the synchronization pattern of the reception data output from data reproducer 233, to the synchronization pattern for forward connection check and the synchronization pattern for reverse connection check. In a case where the synchronization pattern of the reception data completely coincides with the synchronization pattern for forward connection check, connection status detector 234 determines that the two-wire cable is forward connected. In a case where the synchronization pattern of the reception data completely coincides with the synchronization pattern for reverse connection check, connection status detector 234 determines that the two-wire cable is reversely connected. Connection status detector 234 outputs an inverted control signal (INV CON) which indicates a determination result, to transmission data inverter 209.

If the enable signal (SSCS) is input from packet generator 232, transmission data processor 208 performs modulation processing on data of the downlink packet output from packet generator 232 by using the clock (SSCK) of the second frequency which has been output from packet generator 232, so as to generate a downlink signal. Transmission data processor 208 outputs the generated downlink signal to routing controller 212.

In a case where connection status detector 234 determines that the two-wire cable is reversely connected, transmission data inverter 209 inverts the downlink signal output from routing controller 212, and outputs the inverted downlink signal to transmission driver 210-1. In a case where connection status detector 234 determines that the two-wire cable is forward connected, transmission data inverter 209 outputs the downlink signal itself output from routing controller 212, to transmission driver 210-1.

Transmission driver 210-1 transmits the downlink signal to the master device of the other intercom system through cable connector 201-1, in a transmission section of which an instruction is performed by a switching control signal (SW CON) from controller 207. Transmission driver 210-$i$ (in this case, $i$ is not 1) transmits the downlink signal to entrance slave device 100 or additional monitor 300 through cable connector 201-$i$, in a transmission section of which an instruction is performed by a switching control signal (SW CON) from controller 207.

Reception driver 211-$i$ receives an uplink signal transmitted from entrance slave device 100, additional monitor 300 or the master device of the other intercom system, through cable connector 201-$i$. Reception driver 211-$i$ outputs the uplink signal to routing controller 212, in a reception section of which an instruction is performed by a switching control signal (SW CON) from controller 207.

Routing controller 212 outputs the uplink signal which has been transmitted from entrance slave device 100 and has been output from reception driver 211-$i$, to reception data processor 213A in a case where master device 200 is a destination. Routing controller 212 outputs this uplink signal to corresponding transmission driver 210-$i$ in a case where additional monitor 300 is the destination. Routing controller 212 outputs the downlink signal for entrance slave device 100, which has been output from transmission data processor 208, to corresponding transmission driver 210-$i$. Routing controller 212 outputs the uplink signal for entrance slave device 100, which has been transmitted from additional monitor 300 and has been output from reception driver 211-$i$, to corresponding transmission driver 210-$i$. Routing controller 212 controls routing (validity or invalidity of a communication route). A specific example of the routing control performed by routing controller 212 will be described later.

Reception data processor 213A detects synchronization (the leading timing of each bit in the reception data) with entrance slave device 100, by using the clock (CLK) of the first frequency which has been output from first clock generator 231, and by using preamble data which is included in the uplink signal output from routing controller 212. Reception data processor 213A outputs an enable signal (SSCS) for permitting the data reproduction operation, to data reproducer 233 at the timing when the unique pattern of the preamble data is detected.

Reception data processor 213A decodes the uplink signal (reception data) output from routing controller 212, and outputs the decoded data to data reproducer 233. Reception data processor 213A generates a clock (SSCK) of the second frequency (for example, 4.8 MHz) which corresponds to the bit rate of the reception data, based on the clock (CLK) of the first frequency which has been output from first clock generator 231, and outputs the generated clock (SSCK) to data reproducer 233.

Identifier storage 214A stores the own-device IDmaster and an identifier of each of the devices (entrance slave device 100, additional monitor 300, and master device of the other intercom system).

Figure 4B:
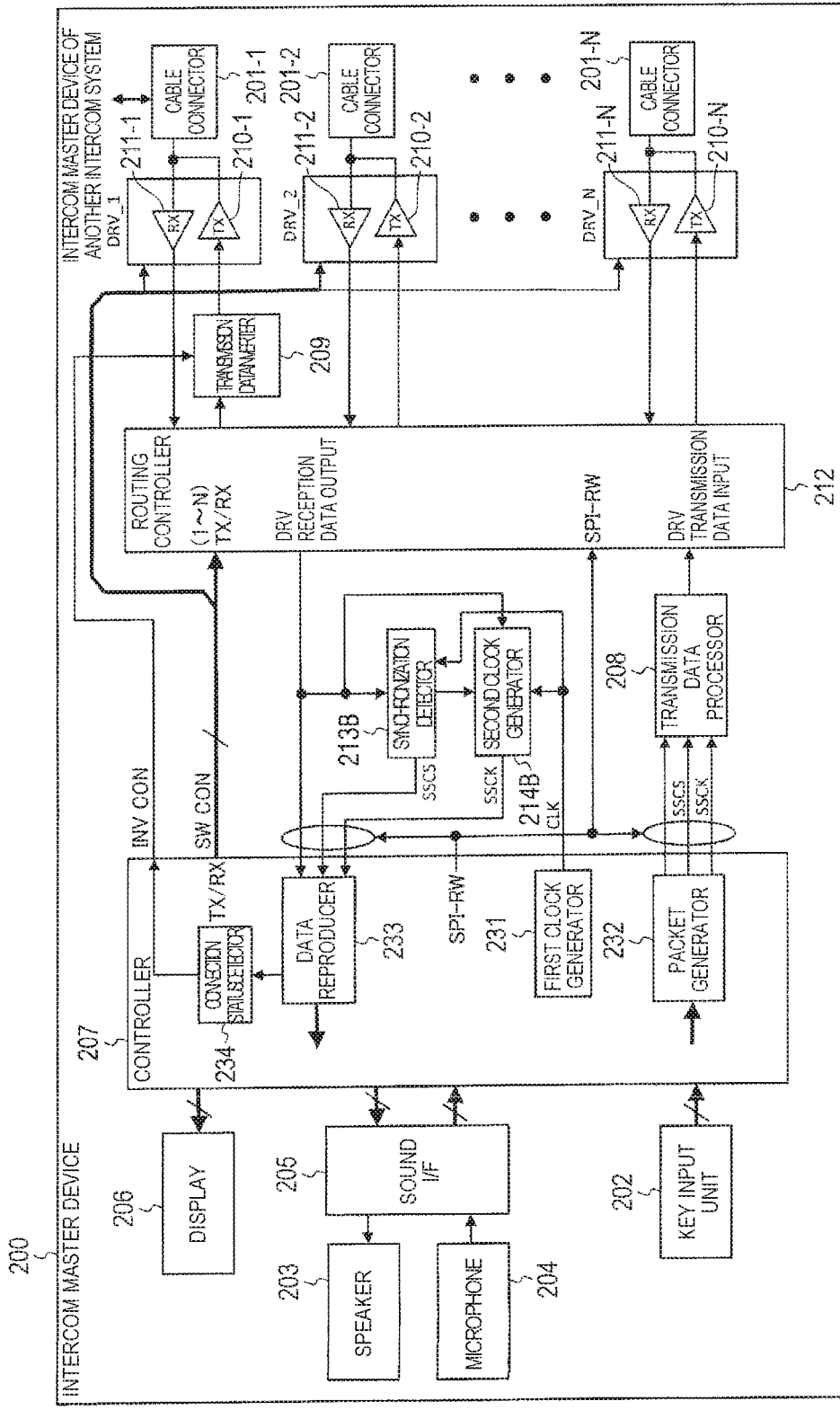
FIG. 4B is a block diagram illustrating the configuration of the intercom master device according to the exemplary embodiment of the present disclosure.

Next, another configuration of intercom master device 200 will be described with reference to the block diagram of FIG. 4B. Parts which are the same as those in FIG. 4A are denoted by the same reference signs. In a case where functions or operations are the same as those in FIG. 4A, descriptions thereof will be omitted. As illustrated in FIG. 4B, intercom master device 200 includes cable connector 201, key input unit 202, speaker 203, microphone 204, sound I/F 205, display 206, and controller 207. Controller 207 includes first clock generator 231, packet generator 232, data reproducer 233, and connection status detector 234 in the inside thereof. Intercom master device 200 includes transmission data processor 208, transmission data inverter 209, transmission driver 210, reception driver 211, routing controller 212, synchronization detector 213B, and a second clock generator 214B. Intercom master device 200 includes N (N is the natural number) pieces of cable connectors 201, transmission drivers 210, and reception drivers 211.

First clock generator 231 of controller 207 generates a clock (CLK) of the first frequency (for example, 48 MHz (n=10)), which is a clock for sampling reception data. The first frequency corresponds to n times the bit rate of the reception data based on the crystal oscillation frequency. First clock generator 231 outputs the generated clock (CLK) to synchronization detector 213B and second clock generator 214B.

If the enable signal (SSCS) is input from synchronization detector 213B, data reproducer 233 of controller 207 demodulates the uplink signal output from routing controller 212 by using the clock (SSCK) of the second frequency which has been output from second clock generator 214B, so as to acquire an uplink packet. Data reproducer 233 outputs digital sound data included in the uplink packet to sound I/F 205, outputs digital image data included in the uplink packet to display 206, and outputs the synchronization pattern included in the uplink packet to connection status detector 234.

Routing controller 212 outputs the uplink signal which has been transmitted from entrance slave device 100 and has been output from reception driver 211-$i$, to synchronization detector 213B, second clock generator 214B, and data reproducer 233 in a case where master device 200 is a destination. Routing controller 212 outputs this uplink signal to corresponding transmission driver 210-$i$ in a case where additional monitor 300 is the destination. Routing controller 212 outputs the downlink signal for entrance slave device 100, which has been output from transmission data processor 208, to corresponding transmission driver 210-$i$. Routing controller 212 outputs the uplink signal for entrance slave device 100, which has been transmitted from additional monitor 300 and has been output from reception driver 211-$i$, to the corresponding transmission driver 210-$i$.

Synchronization detector 213B detects synchronization (the leading timing of each bit in the reception data) with entrance slave device 100, by using the clock (CLK) of the first frequency which has been output from first clock generator 231, and by using preamble data which is included in the uplink signal output from routing controller 212. Synchronization detector 213B outputs a triggering signal to second clock generator 214B and outputs an enable signal (SSCS) to data reproducer 233 at a timing when the unique pattern of the preamble data is detected. The triggering signal functions as a criterion for starting an output of the clock. The enable signal (SSCS) is used for permitting the data reproduction operation.

Second clock generator 214B generates a clock (SSCK) of the second frequency (for example, 4.8 MHz) which corresponds to the bit rate of the reception data, based on the clock (CLK) of the first frequency which has been output from first clock generator 231, at a timing of which an instruction is performed from synchronization detector 213B. Second clock generator 214B outputs the generated clock (SSCK) of the second frequency to data reproducer 233.

Configuration of Intercom Master Device

Figure 4C:
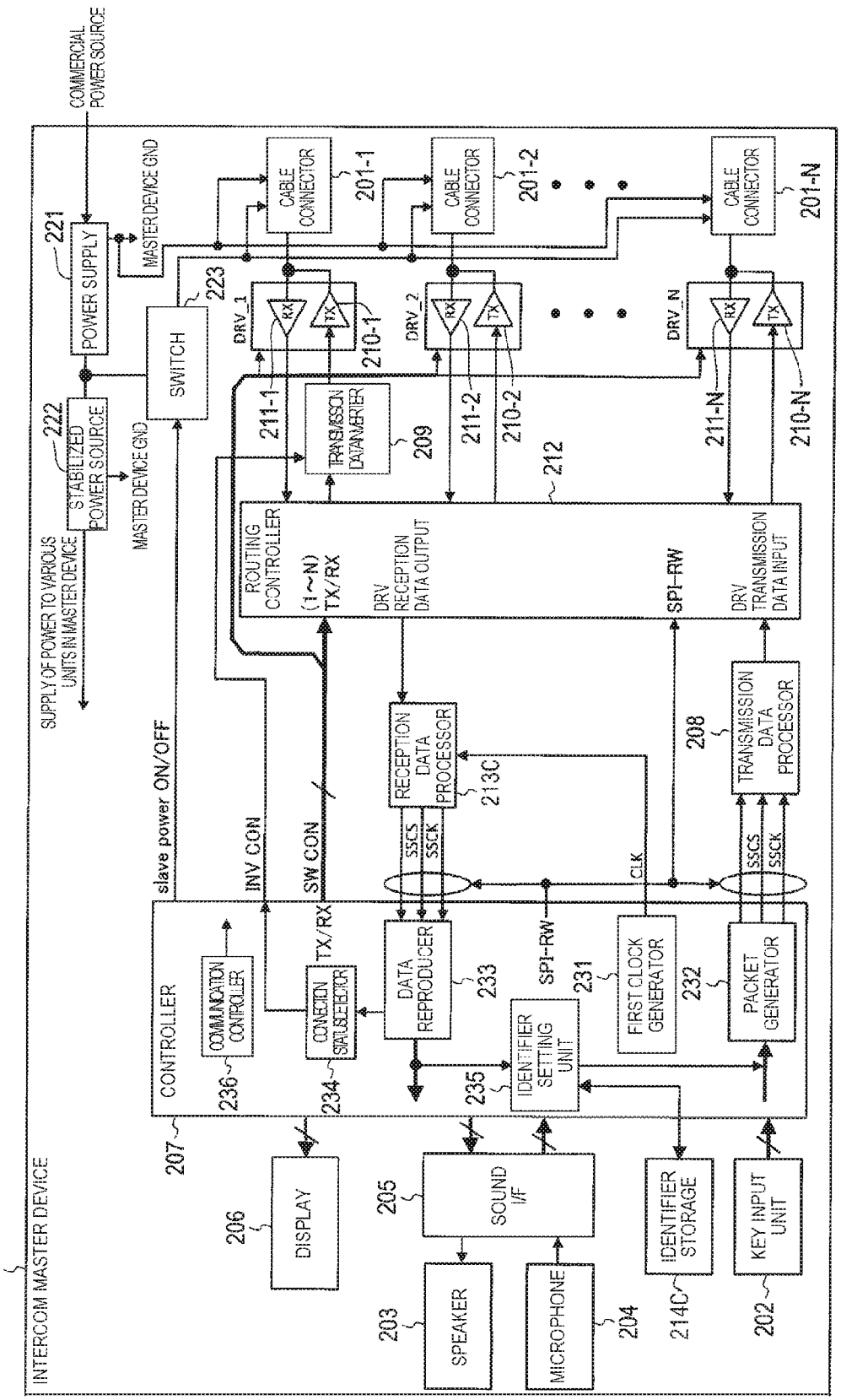
FIG. 4C is a block diagram illustrating the configuration of the intercom master device according to the exemplary embodiment of the present disclosure.

Next, still another configuration of intercom master device 200 will be described with reference to the block diagram of FIG. 4C. Parts which are the same as those in FIGS. 4A and 4B are denoted by the same reference signs. In a case where functions or operations are the same as those in FIGS. 4A and 4B, descriptions thereof will be omitted. As illustrated in FIG. 4C, intercom master device 200 includes cable connector 201, key input unit 202, speaker 203, microphone 204, sound I/F 205, display 206, and controller 207. Controller 207 includes first clock generator 231, packet generator 232, data reproducer 233, connection status detector 234, identifier setting unit 235, and communication controller 236 in the inside thereof. Intercom master device 200 includes transmission data processor 208, transmission data inverter 209, transmission driver 210, reception driver 211, routing controller 212, reception data processor 213C, and identifier storage 214C. Intercom master device 200 includes N (N is the natural number) pieces of cable connectors 201, transmission drivers 210, and reception drivers 211. Intercom master device 200 includes power supply 221 (power supply of the present disclosure), stabilized power source 222, and switch 223 (switch of the present disclosure).

Cable connector 201-$i$ supplies power from power supply 221 to entrance slave device 100 or additional monitor 300 through the two-wire cable. A configuration of cable connector 201-$i$ will be described later in detail.

Packet generator 232 generates a downlink signal when a device such as entrance slave device 100 and additional monitor 300 is initially registered. The downlink signal includes a specific identifier which has been set in identifier setting unit 235 and has been assigned to a device as a registration target.

When a device such as entrance slave device 100 and additional monitor 300 is initially registered, identifier setting unit 235 of controller 207 sets a specific identifier assigned to a device as a registration target, outputs the specific identifier to packet generator 232, and records the specific identifier in identifier storage 214. Identifier setting unit 235 reads an identifier which has been recorded in identifier storage 214, if necessary. Even though a predetermined period elapses from when the identifier is transmitted, identifier setting unit 235 outputs the set identifier to packet generator 232 again in a case where a confirmation of receiving the identifier is not input from data reproducer 233.

Power supply 221 is connected to a predetermined commercial power source. Power supply 221 causes an AC/DC converter to convert AC power to DC power, and supplies the DC power to stabilized power source 222. Power supply 221 supplies power to a device which has been connected to cable connector 201-$i$, through switch 223 and cable connector 201-$i$.

In a case where a device (entrance slave device 100, another intercom master device, additional monitor 300, or the like) connected to cable connector 201-$i$ independently uses a power source such as the commercial power source, power may be not supplied from power supply 221 of intercom master device 200. In addition, even in a case where power receiving from intercom master device 200 is possible, the device connected to cable connector 201-$i$ may have a configuration in which power is not received.

Stabilized power source 222 supplies DC power obtained from power supply 221, to the components of intercom master device 200.

Switch 223 is a switch provided between power supply 221 and cable connector 201-$i$. In a case where switch 223 is ON, power supply 221 and cable connector 201-$i$ are connected to each other, and thus power is supplied from power supply 221 to all components from cable connector 201-1 to cable connector 201-N. In a case where switch 223 is OFF, the connection between power supply 221 and cable connector 201-$i$ is released, and thus power is not supplied from power supply 221 to all of the components from cable connector 201-1 to cable connector 201-N. Switch 223 controls ON/OFF in accordance with a control signal (slave power ON/OFF) from communication controller 236, for example.

Communication controller 236 of controller 207 outputs a switch control signal (slave power ON/OFF) for controlling ON/OFF of switch 223. Communication controller 236 may be defined to output a control signal for causing switch 223 to turn OFF and then causing switch 223 to be switched to the ON state, for example, in a case where an instruction to reset entrance slave device 100 is input through key input unit 202.

Configuration of Additional Monitor

Figure 5A:
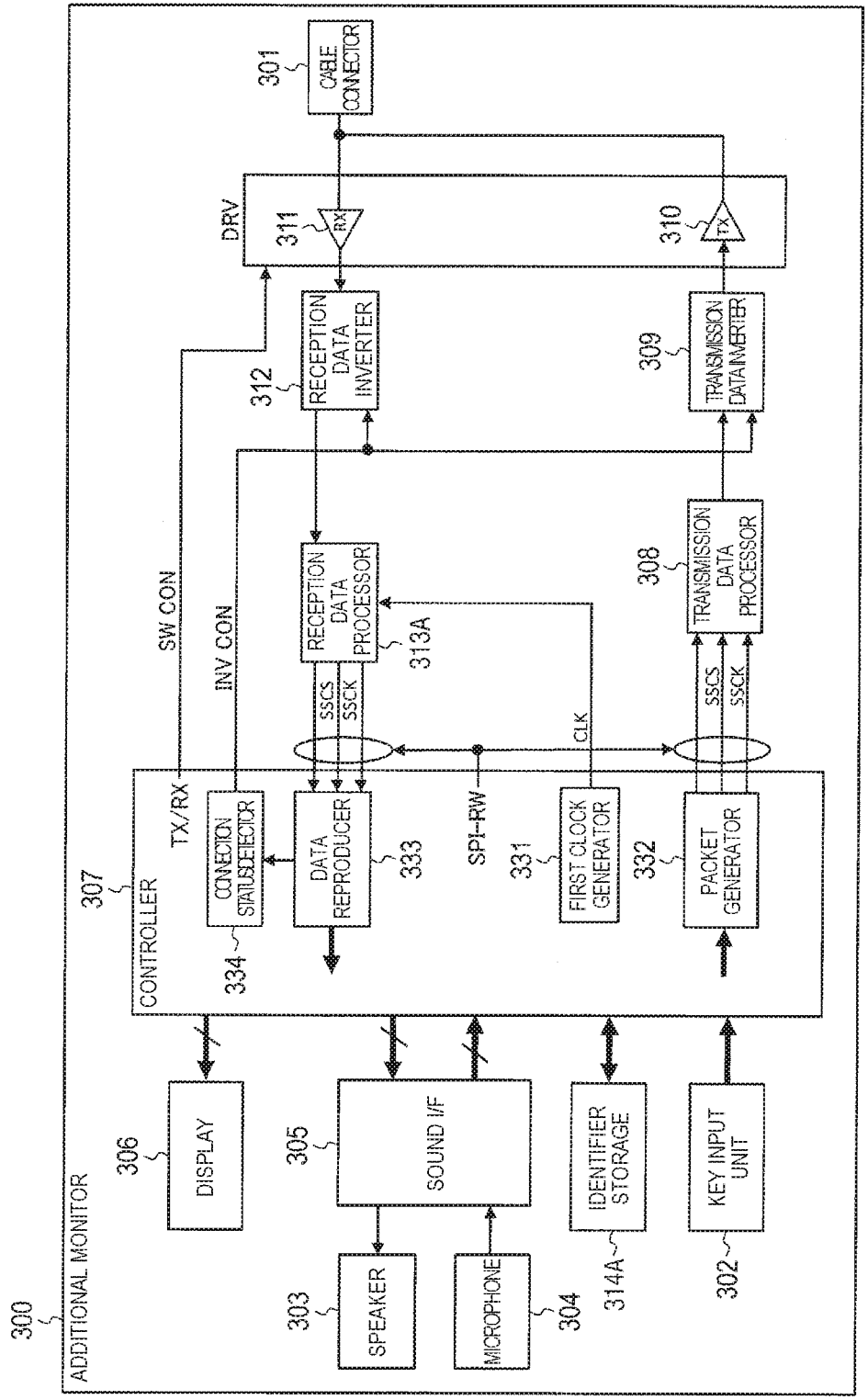
FIG. 5A is a block diagram illustrating a configuration of an additional monitor according to the exemplary embodiment of the present disclosure.

Next, a configuration of additional monitor 300 will be described with reference to the block diagram of FIG. 5A. As illustrated in FIG. 5A, additional monitor 300 includes cable connector 301, key input unit 302, speaker 303, microphone 304, sound I/F (interface) 305, display 306, and controller 307. Controller 307 includes first clock generator 331, packet generator 332, data reproducer 333, and connection status detector 334 in the inside thereof. Additional monitor 300 includes transmission data processor 308, transmission data inverter 309, transmission driver 310, reception driver 311, reception data inverter 312, reception data processor 313A, and identifier storage 314A. Cable connector 301 includes a connection terminal for the two-wire cable, and connects one end of the two-wire cable on the additional monitor side, with reception driver 311 and transmission driver 310 in a state where a signal can be transmitted between the one end of the two-wire cable on the additional monitor side, and reception driver 311 and transmission driver 310. Another end of the two-wire cable is connected to intercom master device 200.

Key input unit 302 includes a call button. When the call button is operated, key input unit 302 outputs a signal indicating that the call button is operated, to controller 307.

Speaker 303 converts analog sound data output from sound I/F 305, into sound and outputs the sound.

Microphone 304 collects sound of the surroundings, converts the collection to analog sound data, and outputs the analog sound data to sound I/F 305.

Sound I/F 305 converts digital sound data output from controller 307, into analog sound data. Sound I/F 305 adjusts a signal level of the analog sound data, and outputs the analog sound data having the adjusted signal level, to speaker 303. Sound I/F 305 adjusts a signal level of analog sound data output from the microphone 304. Sound I/F 305 converts the analog sound data into digital sound data, and outputs the digital sound data to controller 307. The analog-digital conversion is performed by an A/D converter and a D/A converter (not illustrated).

Predetermined sound compression processing is performed on data which is obtained by performing digital conversion of the analog sound data output from the microphone 304. Sound I/F 305 may output data obtained by performing the sound compression processing, to controller 307 as digital sound data. In a case where digital sound data output from controller 307 is the data obtained by performing the predetermined sound compression processing, sound I/F 305 performs predetermined sound decompression processing on this digital sound data, and then performs digital-to-analog conversion.

Display 306 includes a liquid crystal display. Display 306 reproduces digital image data output from controller 307, and thus displays an image of the entrance. In a case where the digital image data output from controller 307 is data obtained by performing predetermined video compression processing, the display 306 performs predetermined video decompression processing on this digital image data, and performs image display.

Controller 307 controls the units of additional monitor 300. Controller 307 outputs a switching control signal (SW CON) to transmission driver 310 and reception driver 311. The switching control signal (SW CON) is used for an instruction of a transmission section in which transmission is permitted, and a reception section in which reception is permitted.

First clock generator 331 of controller 307 generates a clock (CLK) of the first frequency (for example, 48 MHz (n=10)), which is a clock for sampling reception data. The first frequency corresponds to n times the bit rate of the reception data based on the crystal oscillation frequency. First clock generator 331 outputs the generated clock (CLK) to reception data processor 313.

Packet generator 332 of controller 307 generates an uplink packet for realizing a call with an image. Specifically, packet generator 332 appropriately splits digital sound data output from sound I/F 305. Packet generator 332 writes pieces of data obtained by the split, in user data field of time slots, respectively. Packet generator 332 writes control data which includes an identifier (referred to as "the own-device IDmonitor" below) specific to the own device (additional monitor 300) and IDmaster, in the control data field of each of the time slots. Packet generator 332 writes preamble data and the synchronization pattern in each of the time slots, and generates an uplink packet (transmission data). Packet generator 332 generates an enable signal (SSCS) for transmission and a clock (SSCK) of the second frequency (for example, 4.8 MHz), which is used for transmission. Packet generator 332 synchronizes the uplink packet with the enable signal (SSCS) and the clock (SSCK) for the transmission, and outputs the uplink packet to transmission data processor 308. The clock (SSCK) is generated based on the crystal oscillation frequency.

Packet generator 332 does not generate an uplink packet in the standby state in which data is not transmitted and received between additional monitor 300 and intercom master device 200. If a predetermined event (for example, an operation of a call button) occurs in the standby state (during asynchronous communication), packet generator 332 generates an uplink packet (interruption signal) in which preamble data, a synchronization pattern, and control data are written. The preamble and the synchronization pattern used in the interruption signal during the asynchronous communication are the same as those used during the synchronous communication.

If the enable signal (SSCS) is input from reception data processor 313, data reproducer 333 of controller 307 reproduces a downlink packet output from reception data processor 313, by using the clock (SSCK) of the second frequency which has been output from reception data processor 313A. Data reproducer 333 outputs digital image data included in the reproduced downlink packet (decoded data), to display 306, outputs digital sound data included in the reproduced downlink packet to sound I/F 305, and outputs a synchronization pattern included in the reproduced downlink packet, to connection status detector 334. Data reproducer 333 stores the own-device IDmonitor and IDmaster which are included in the downlink packet, in identifier storage 314A when the device is initially registered.

In a case where the predetermined event occurs in the standby state (during the asynchronous communication) and a downlink signal (interruption signal) is input, data reproducer 333 demodulates the downlink signal so as to acquire a downlink packet, and outputs the synchronization pattern included in the downlink packet, to connection status detector 334. Data reproducer 333 extracts control data from the interruption signal after data reproducer 333 confirms that connection status detector 334 can accurately catch the interruption signal. If the control data corresponds to a synchronization request, additional monitor 300 transitions the process to synchronization processing with intercom master device 200.

Connection status detector 334 of controller 307 stores the synchronization pattern for forward connection check and the synchronization pattern for reverse connection check. Connection status detector 334 compares the synchronization pattern of the reception data output from data reproducer 333, to the synchronization pattern for forward connection check and the synchronization pattern for reverse connection check. In a case where the synchronization pattern of the reception data completely coincides with the synchronization pattern for forward connection check, connection status detector 334 determines that the two-wire cable is forward connected. In a case where the synchronization pattern of the reception data completely coincides with the synchronization pattern for reverse connection check, connection status detector 334 determines that the two-wire cable is reversely connected. Connection status detector 334 outputs an inverted control signal (INV CON) which indicates a determination result, to transmission data inverter 309 and reception data inverter 312.

If the enable signal (SSCS) is input from packet generator 332, transmission data processor 308 performs modulation processing on data of the uplink packet output from packet generator 332 by using the clock (SSCK) of the second frequency which has been output from packet generator 332, so as to generate an uplink signal. Transmission data processor 308 outputs the generated uplink signal to transmission data inverter 309.

In a case where connection status detector 334 determines that the two-wire cable is reversely connected, transmission data inverter 309 inverts the uplink signal output from transmission data processor 308 and outputs the inverted uplink signal to transmission driver 310. In a case where connection status detector 334 determines that the two-wire cable is forward connected, transmission data inverter 309 outputs the uplink signal itself output from transmission data processor 308 to transmission driver 310.

Transmission driver 310 transmits the uplink signal to intercom master device 200 through cable connector 301, in a transmission section of which an instruction is performed by the switching control signal (SW CON) from controller 307.

Reception driver 311 receives the downlink signal transmitted from intercom master device 200 through cable connector 301. Reception driver 311 outputs the downlink signal to reception data inverter 312, in a reception section of which an instruction is performed by the switching control signal (SW CON) from controller 307.

In a case where connection status detector 334 determines that the two-wire cable is reversely connected, reception data inverter 312 inverts the downlink signal output from reception driver 311 and outputs the inverted downlink signal to reception data processor 313A. In a case where connection status detector 334 determines that the two-wire cable is forward connected, reception data inverter 312 outputs the downlink signal itself output from reception driver 311 to reception data processor 313A.

Reception data processor 313 detects synchronization (the leading timing of each bit in the reception data) with intercom master device 200 by using the clock (CLK) of the first frequency which has been output from first clock generator 331, and by using preamble data which is included in the downlink signal output from reception driver 311. Reception data processor 313A outputs an enable signal (SSCS) for permitting the data reproduction operation, to data reproducer 333 at the timing when the unique pattern of the preamble data is detected.

Reception data processor 313A decodes the downlink signal (reception data) output from reception data inverter 312, and outputs the decoded data to data reproducer 333. Reception data processor 313A generates a clock (SSCK) of the second frequency (for example, 4.8 MHz) which corresponds to the bit rate of the reception data, based on the clock (CLK) of the first frequency which has been output from first clock generator 331. Reception data processor 313A outputs the generated clock (SSCK) to data reproducer 333.

Identifier storage 314A stores the own-device IDmonitor and IDmaster which have been received from intercom master device 200.

In the exemplary embodiment, additional monitor 300 is connected to a predetermined commercial power source. Power supply 221 causes an AC/DC converter to convert AC power to DC power, and supplies the DC power to the components. That is, additional monitor 300 has a power supply and a stabilized power source similarly to those of intercom master device 200 illustrated in FIG. 4 (illustrations of the power supply and the stabilized power source will be omitted). In other words, in the exemplary embodiment, a case where additional monitor 300 does not receive power which has been supplied from intercom master device 200 through the two-wire cable will be described.

Although not illustrated, each of entrance slave device 100, intercom master device 200, and additional monitor 300 includes, for example, a central processing unit (CPU), a storage medium such as a read only memory (ROM), in which a control program is stored, a work memory such as a random access memory (RAM), and a communication circuit. In this case, the CPU executes the control program, and thereby the above-described functions of the components are realized.

Figure 5B:
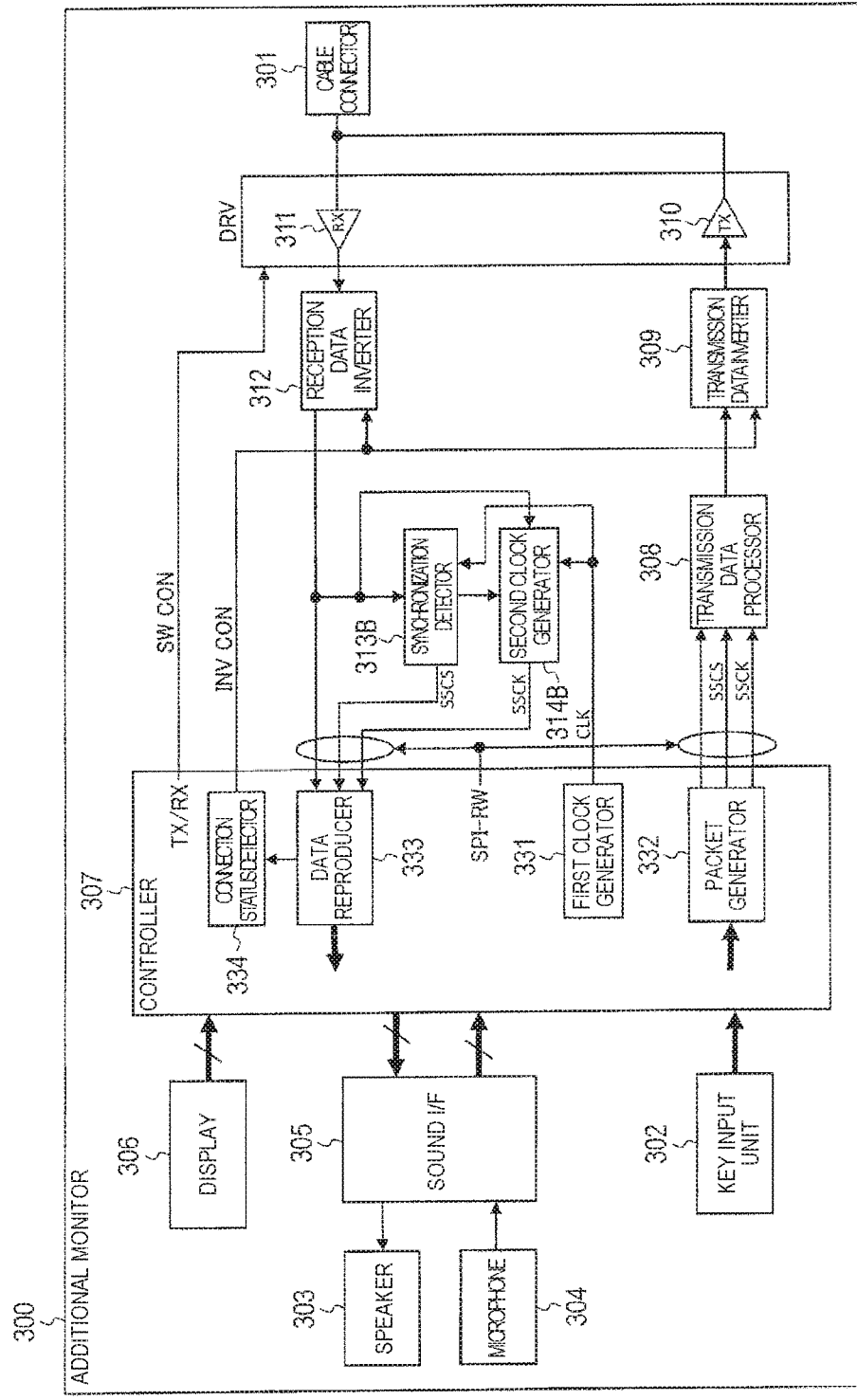
FIG. 5B is a block diagram illustrating the configuration of the additional monitor according to the exemplary embodiment of the present disclosure.

Next, another configuration of additional monitor 300 will be described with reference to the block diagram of FIG. 5B. Parts which are the same as those in FIG. 5A are denoted by the same reference signs. In a case where functions or operations are the same as those in FIG. 5A, descriptions thereof will be omitted. As illustrated in FIG. 5B, additional monitor 300 includes cable connector 301, key input unit 302, speaker 303, microphone 304, sound I/F (interface) 305, display 306, and controller 307. Controller 307 includes first clock generator 331, packet generator 332, data reproducer 333, and connection status detector 334 in the inside thereof. Additional monitor 300 includes transmission data processor 308, transmission data inverter 309, transmission driver 310, reception driver 311, reception data inverter 312, synchronization detector 313B, and second clock generator 314B.

Packet generator 332 of controller 307 generates an uplink packet for realizing a call with an image. Specifically, packet generator 332 appropriately splits digital sound data output from sound I/F 305. Packet generator 332 writes pieces of data obtained by the split, in user data field of time slots, respectively. Packet generator 332 writes control data in the control data field of each of the time slots. Further, packet generator 332 writes preamble data and a synchronization pattern in each slot, so as to generate an uplink packet (transmission data). Packet generator 332 generates an enable signal (SSCS) for transmission and a clock (SSCK) of the second frequency (for example, 4.8 MHz), which is used for transmission. Packet generator 332 synchronizes the uplink packet with the enable signal (SSCS) and the clock (SSCK) for the transmission, and outputs the uplink packet to transmission data processor 308.

If the enable signal (SSCS) is input from synchronization detector 313B, data reproducer 333 of controller 307 demodulates the downlink signal output from reception data inverter 312 by using the clock (SSCK) of the second frequency which has been output from second clock generator 314B, so as to acquire a downlink packet. Data reproducer 333 outputs digital image data included in the downlink packet to display 306, outputs digital sound data included in the downlink packet to sound I/F 305, and outputs the synchronization pattern included in the downlink packet to connection status detector 334.

In a case where connection status detector 334 determines that the two-wire cable is reversely connected, reception data inverter 312 inverts the downlink signal output from reception driver 311 and outputs the inverted downlink signal to synchronization detector 313B, second clock generator 314B, and data reproducer 333. In a case where connection status detector 334 determines that the two-wire cable is forward connected, reception data inverter 312 outputs the downlink signal itself output from reception driver 311 to synchronization detector 313B, second clock generator 314B, and data reproducer 333.

Synchronization detector 313B detects synchronization (the leading timing of each bit in the reception data) with intercom master device 200, by using the clock (CLK) of the first frequency which has been output from first clock generator 331, and by using the preamble data which is included in the downlink signal output from reception driver 311. Synchronization detector 313B outputs a triggering signal to second clock generator 314B and outputs an enable signal (SSCS) to data reproducer 333 at a timing when the unique pattern of the preamble data is detected. The triggering signal functions as a criterion for starting an output of the clock. The enable signal (SSCS) is used for permitting the data reproduction operation.

Second clock generator 314B generates a clock (SSCK) of the second frequency (for example, 4.8 MHz) which corresponds to the bit rate of the reception data, based on the clock (CLK) of the first frequency which has been output from first clock generator 331, at a timing of which an instruction is performed from synchronization detector 313B. Second clock generator 314B outputs the generated clock (SSCK) to data reproducer 333.

Example of Modulation Processing

Figure 6:
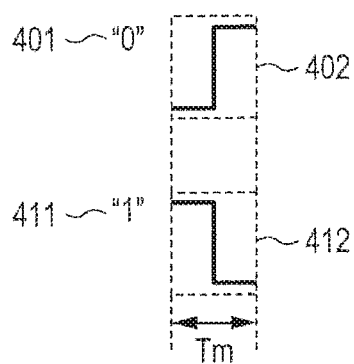
FIG. 6 is a diagram illustrating an example of modulation processing on packet data (one bit)
Figure 7:
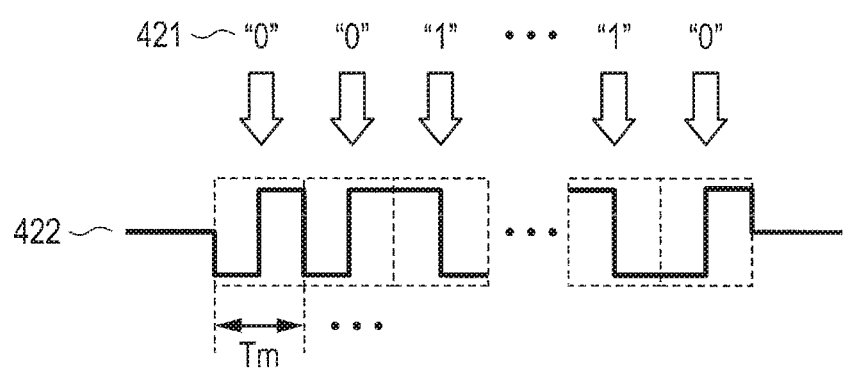
FIG. 7 is a diagram illustrating an example of the modulation processing on packet data (a plurality of bits)

Next, an example of modulation processing performed by transmission data processor 108 (208 or 308) will be described with reference to FIGS. 6 and 7. FIGS. 6 and 7 illustrate a case where the Manchester code is employed.

Transmission data processor 108 (208 or 308) generates one piece of a signal corresponding to each piece (1 bit) of data of a packet, for each period Tm. In a case where the Manchester code is employed, as illustrated in FIG. 6, transmission data processor 108 (208 or 308) generates rising from Low to High, in data 401 having a value "0", and thereby generating modulation signal 402. Transmission data processor 108 (208 or 308) generates falling from High to Low, in data 411 having a value "1", and thereby generating modulation signal 412.

As illustrated in FIG. 7, transmission data processor 108 (208 or 308) generates modulation signal 422 for data sequence 421 which refers to "0, 0, 1, . . . , 1, and 0". Modulation signal 422 has rising or falling corresponding to a value of each of the bits, for each period Tm.

Example of Preamble Data

An example of preamble data used in the exemplary embodiment will be described with reference to FIG. 8A.

Figure 8A:
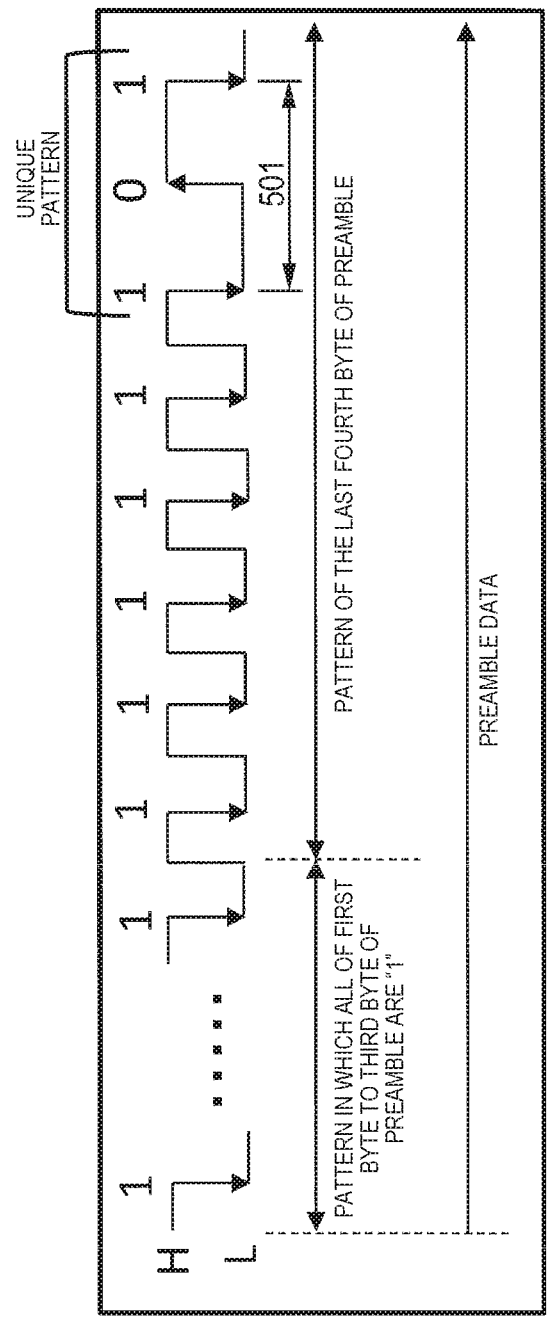
FIG. 8A is a diagram illustrating an example of preamble data used in the exemplary embodiment of the present disclosure.

As illustrated in FIG. 8A, preamble data (4 byte=32 bit) used in the exemplary embodiment has a pattern in which all of values from the first byte to the third byte are "1", and a pattern in which, in the fourth byte, all of values of the first bit to the sixth bit are "1", the value of the seventh bit is "0", and the value of the eighth bit (the last one bit) is "1". In this case, subsequently to the preamble data, the first one bit of the synchronization pattern is "1". As a result, the preamble data illustrated in FIG. 8A has a unique pattern in which interval 501 between falling edges which are adjacent to each other between the sixth bit and the eighth bit in the fourth byte is longer than another interval. A duration of H (High) and a duration of L (Low) in interval 501 between the adjacent falling edges are longer than others, respectively. FIG. 8A illustrates a waveform of preamble data after Manchester encoding.

In the exemplary embodiment, preamble data may be data obtained by reversing the preamble data illustrated in FIG. 8A. That is, the preamble data (4 byte=32 bit) used in the exemplary embodiment may have a pattern in which all of values from the first byte to the third byte are "0", and a pattern in which, in the fourth byte, all of values of the first bit to the sixth bit are "0", the value of the seventh bit is "1", and the value of the eighth bit (the last one bit) is "0". In this case, subsequently to the preamble data, the first one bit of the synchronization pattern is "0".

Next, another example of the preamble data used in the exemplary embodiment will be described with reference to FIG. 8B.

Figure 8B:
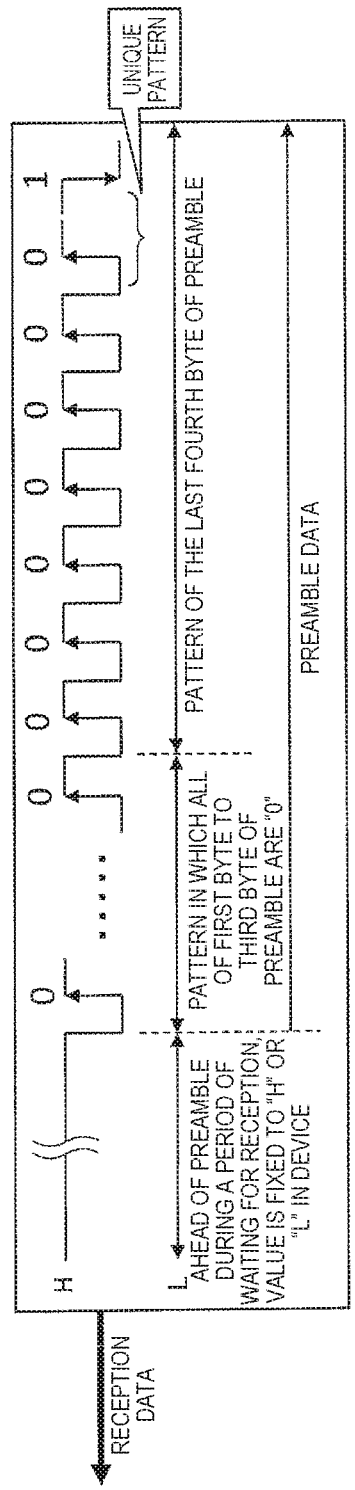
FIG. 8B is a diagram illustrating an example of the preamble data used in the exemplary embodiment of the present disclosure.

As illustrated in FIG. 8B, preamble data (4 byte=32 bit) used in the exemplary embodiment has a pattern in which all of values from the first byte to the third byte are "0", and a pattern in which, in the fourth byte, all of values of the first bit to the seventh bit are "0", the value of the last one bit is "1". As a result, the preamble data illustrated in FIG. 8B has a unique pattern in which a duration of H (High) in a part from the seventh bit to the eighth bit of the fourth byte (the 31st bit and the 32nd bit when viewed from the first of the pattern) is longer than others is obtained.

In a case where the two-wire cable is reversely connected, if reversing processing is not performed in the transmission-side device, the preamble data has a unique pattern in which a duration of L (Low) in a part from the seventh bit to the eighth bit of the fourth byte is longer than others, when the reception-side device receives data.

Internal Configuration of Reception Data Processor

Next, an internal configuration of reception data processor 113 of entrance slave device 100 will be described in detail with reference to FIG. 9A. The descriptions will be made with reference to FIGS. 9A and 10B, for easy understandings of the synchronization detection processing in the exemplary embodiment. In the example of FIG. 10A, as preamble data and a unique pattern, those illustrated in FIG. 8A are used. FIG. 10A illustrates a case where first clock generator 131 generates a clock (CLK) of 48 MHz and the second clock generator 156 generates a clock (SSCK) of 4.8 MHz.

Figure 9A:
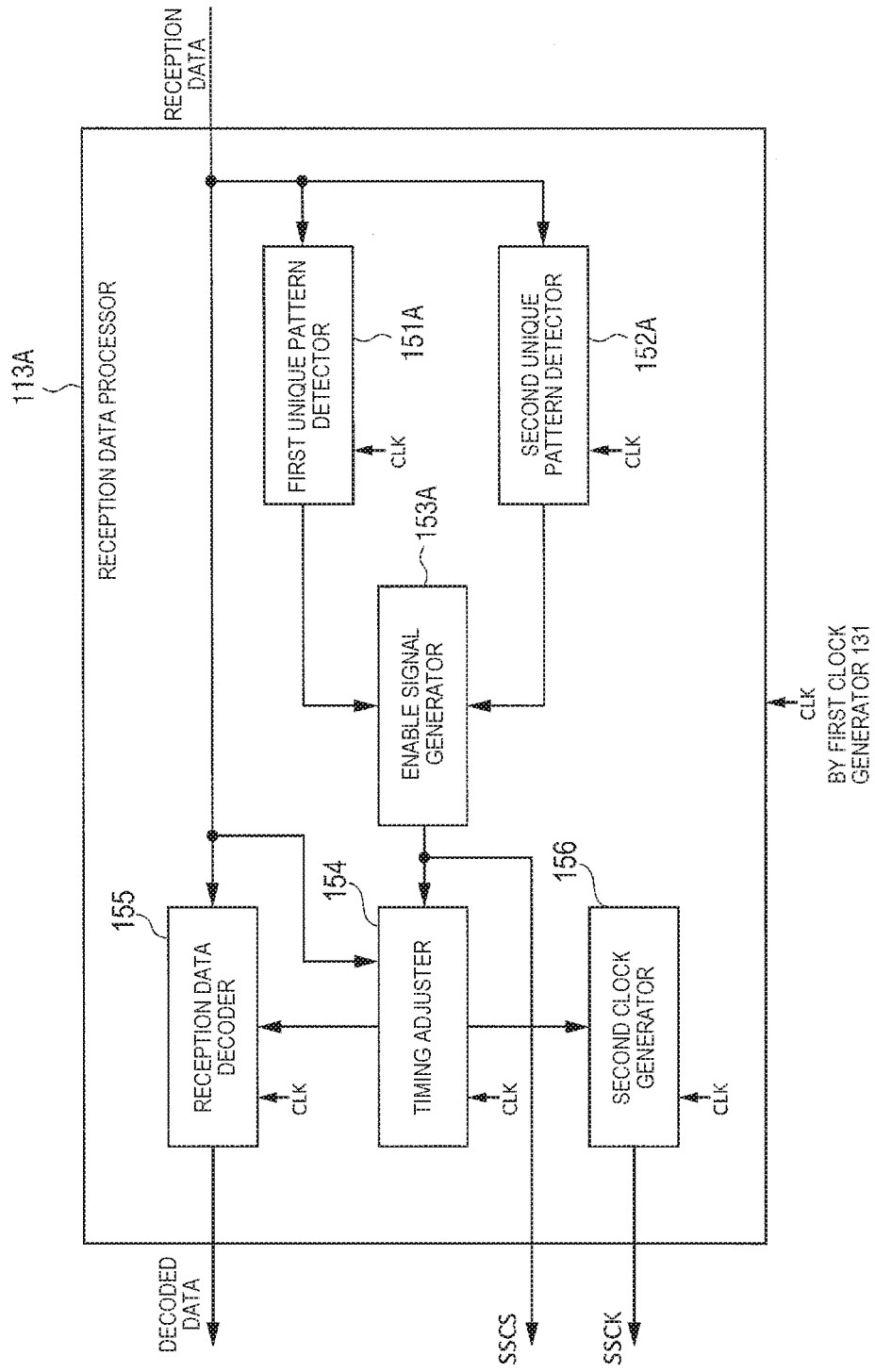
FIG. 9A is a block diagram illustrating an internal configuration of a reception data processor in the entrance slave device according to the exemplary embodiment of the present disclosure.

As illustrated in FIG. 9A, reception data processor 113A includes first unique pattern detector 151A, second unique pattern detector 152A, enable signal generator 153A, timing adjuster 154, reception data decoder 155, and second clock generator 156.

Reception data output from reception data inverter 112 is input to first unique pattern detector 151A, second unique pattern detector 152A, timing adjuster 154, and reception data decoder 155. The clock (CLK) of first clock generator 131 is input to first unique pattern detector 151A, second unique pattern detector 152A, timing adjuster 154, reception data decoder 155, and second clock generator 156.

First unique pattern detector 151A and second unique pattern detector 152A store the first defined numbers (for example, "18" to "22") of a clock for unique pattern detection.

First unique pattern detector 151A performs sampling on preamble data included in the reception data which has been output from reception data inverter 112, in accordance with the clock of first clock generator 131, and counts the number of clocks between adjacent falling edges. First unique pattern detector 151A determines to detect a unique pattern, in a case where the number of clocks between the adjacent falling edges is equal to any of the first defined numbers. In the example of the FIG. 10A, the number of clocks of an interval 501 between adjacent falling edges is "20" and is equal to one of the first defined number. First unique pattern detector 151A outputs a signal indicating that the number of clocks between adjacent falling edges equal to one of the first defined number, to enable signal generator 153A at a predetermined timing.

Second unique pattern detector 152A performs sampling on preamble data included in the reception data which has been output from reception data inverter 112, at the same timing as that of first unique pattern detector 151A, and counts the number of clocks between adjacent rising edges. Second unique pattern detector 152A determines to detect a unique pattern, in a case where the number of clocks between adjacent rising edges is equal to any of the first defined numbers. Second unique pattern detector 152A outputs a signal indicating that the number of clocks between adjacent rising edges equal to one of the first defined number, to enable signal generator 153A.

If a signal indicating that the unique pattern is detected is input from any of first unique pattern detector 151A and second unique pattern detector 152A (timing 510 in FIG. 10A), enable signal generator 153A outputs an enable signal for permitting the data reproduction operation, to timing adjuster 154 and data reproducer 133 (in the example of FIG. 10A, the enable signal SSCS is caused to fall, so as to make an L (Low) signal (becomes active)).

Timing adjuster 154 includes a counter for timing generation in the inside thereof. If an enable signal is input from the enable signal generator 153, timing adjuster 154 detects a waveform edge of the leading reception data (first bit in the synchronization pattern). The leading reception data is started from timing 511 when data which is waveform edges between the preamble data and the synchronization pattern is inverted.

After the waveform edges are detected, timing adjuster 154 repeats counting of "0" to "9" by the counter for timing generation in accordance with the clock of the first frequency. Timing adjuster 154 observes a counter value at the timing of the waveform edge of each piece of reception data. In a case where the counter value is different from a normal value, timing adjuster 154 corrects the counter value, and outputs the corrected counter value to reception data decoder 155 and second clock generator 156. Thus, a start timing of a range (range 502 in FIG. 10A) of a data reproduction window, which is a range in which the counter value is a predetermined value is adjusted.

Reception data decoder 155 receives an input of the counter value from timing adjuster 154. Reception data decoder 155 scans and detects logic inversion of a waveform corresponding to one bit of the reception data, in a range (range 502 in FIG. 10A) of the data reproduction window. Reception data decoder 155 decodes data corresponding to the logic inversion of the waveform which corresponds to the one bit of the reception data and is subjected to the Manchester encoding, and outputs decoded data to data reproducer 133. In the example of FIG. 10A, reception data decoder 155 outputs decoded data of "1" in a case where the waveform is inverted from "H" to "L" in the range 502. Reception data decoder 155 outputs decoded data of "0" in a case where the waveform is inverted from "L" to "H" in the range 502. Decoded data corresponding to the leading reception data is delayed by a predetermined time, and is output from reception data decoder 155 at substantially the same time as a time when the second reception data is input to reception data decoder 155. Decoding processing of reception data performed by reception data decoder 155 will be described later in detail.

Second clock generator 156 receives an input of counter values ("0" to "9") from timing adjuster 154. Second clock generator 156 starts an output of SSCK ("L" in FIG. 10A) from the counter value "0" (timing 512 in FIG. 10A) of the second reception data. Second clock generator 156 inverts a logical value of SSCK for the leading decoded data which is delayed by a predetermined time, from "L" to "H" at the counter value of "5" of the leading reception data. Second clock generator 156 inverts a logical value of SSCK on the boundary between the leading decoded data and the second decoded data, from "H" to "L" at the counter value of "0" of the second reception data. Then, second clock generator 156 repeats logic inversion from "H" to "L" at the counter value of "0", and logic inversion from "L" to "H" at the counter value of "5", regarding the reproduction clock SSCK. Second clock generator 156 outputs the clock (SSCK) of the second frequency (for example, 4.8 MHz) to data reproducer 133 at a timing when logic inversion is performed from "L" to "H".

The internal configuration of reception data processor 213 of intercom master device 200 and the internal configuration of reception data processor 313 of additional monitor 300 are the same as the internal configuration of reception data processor 113A of entrance slave device 100.

Internal Configuration of Synchronization Detector

Next, an internal configuration of synchronization detector 113B of entrance slave device 100 will be described in detail with reference to FIG. 9B. The descriptions will be made with reference to FIGS. 9B and 10B, for easy understandings of the synchronization detection processing in the exemplary embodiment. In the example of FIG. 10B, as preamble data and a unique pattern, those illustrated in FIG. 8B are used.

Figure 9B:
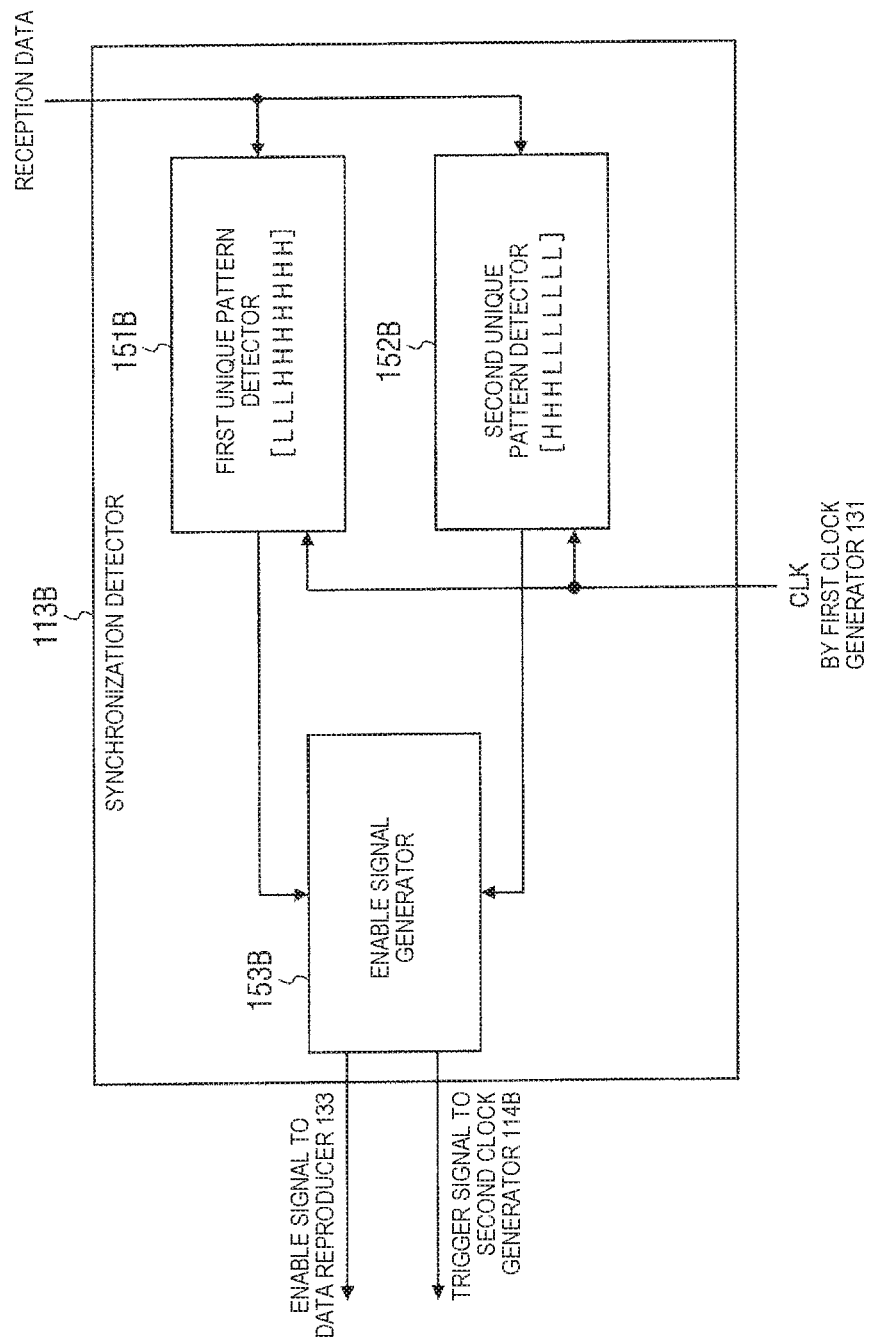
FIG. 9B is a block diagram illustrating an internal configuration of a synchronization detector in the entrance slave device according to the exemplary embodiment of the present disclosure.

As illustrated in FIG. 9B, synchronization detector 113B includes first unique pattern detector 151B, second unique pattern detector 152B, and enable signal generator 153B.

First unique pattern detector 151B stores a unique pattern for a check in a case where the two-wire cable is forward connected (referred to as "a unique pattern for forward connection check" below ([HHHLLLLLLL] in the example of FIG. 9B)). First unique pattern detector 151B performs sampling of preamble data included in the reception data which has been output from reception data inverter 112, in accordance with the clock of first clock generator 131. First unique pattern detector 151B compares sampling values of a sampling section corresponding to the number of the unique pattern for forward connection check, to the unique pattern for forward connection check. In a case where the sampling values and the unique pattern for forward connection check completely coincide with each other, first unique pattern detector 151B determines that the unique pattern is detected, and outputs a signal indicating that the unique pattern is detected, to enable signal generator 153B. In the example of FIG. 10B, 10 sampling values of the sampling section 501 completely coincide with the unique pattern for forward connection check. FIG. 10B illustrates a case where first clock generator 131 generates a clock (CLK) of 48 MHz, and second clock generator 114B generates a clock (SSCK) of 4.8 MHz.

Second unique pattern detector 152B stores a unique pattern which is a pattern obtained by inverting the unique pattern for forward connection check, and is used for a check in a case where the two-wire cable is reversely connected (referred to as "a unique pattern for reverse connection check" ([LLLHHHHHHH] in FIG. 9B)). Second unique pattern detector 152B performs sampling on preamble data included in the reception data which has been output from reception data inverter 112, at the same timing as first unique pattern detector 151B. Second unique pattern detector 152B compares sampling values to the unique pattern for reverse connection check. In a case where the sampling values and the unique pattern for reverse connection check completely coincide with each other, second unique pattern detector 152B determines that the unique pattern is detected, and outputs a signal (in the example of FIG. 10B, the L (Low) signal of SSCS) indicating that the unique pattern is detected, to enable signal generator 153B.

If the signal indicating that the unique pattern is detected is input from any of first unique pattern detector 151B and second unique pattern detector 152B, enable signal generator 153B outputs a triggering signal to second clock generator 114B and outputs an enable signal (SSCS) to data reproducer 133 of controller 107. The triggering signal functions as a criterion for starting an output of the clock. The enable signal (SSCS) is used for permitting the data reproduction operation.

In this case, second clock generator 114B generates the clock by using the clock (t0 in FIG. 10B) of the first frequency after a period (section 502 in FIG. 10B) of the defined number of clocks has elapsed from a timing when the triggering signal is input from enable signal generator 153B, as a start timing. In the example of FIG. 10B, since SSCK is a clock obtained by dividing CLK by 10, the defined number of clocks is "10".

The internal configuration of synchronization detector 213 of intercom master device 200 and the internal configuration of synchronization detector 313B of additional monitor 300 are the same as the internal configuration of synchronization detector 113B of entrance slave device 100 illustrated in FIGS. 9A and 9B.

Detailed Descriptions of Detection of Unique Pattern

Figures 11A, 11B:
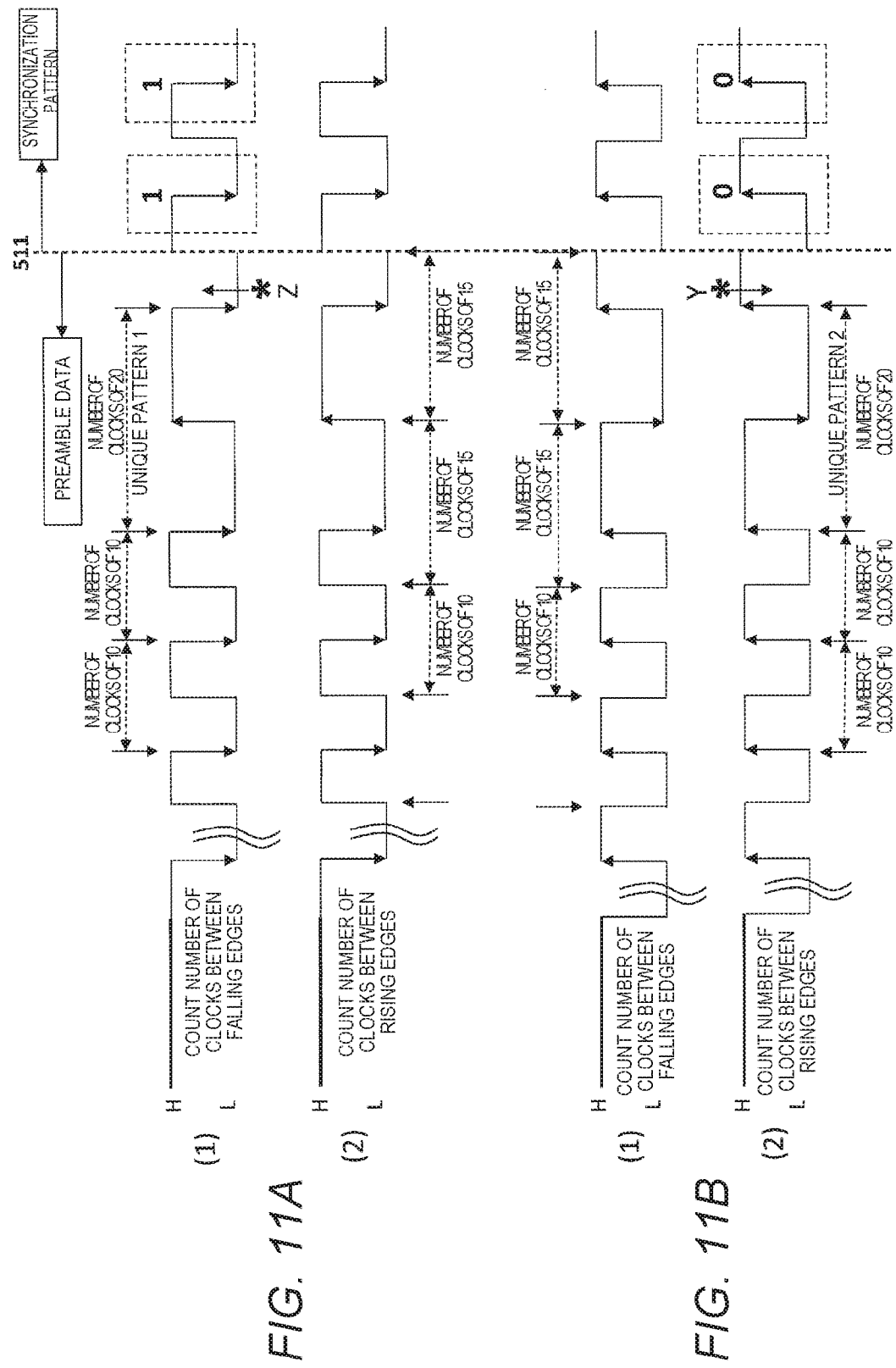
FIGS. 11A and 11B are diagrams illustrating detection of a unique pattern of the entrance slave device according to the exemplary embodiment of the present disclosure.

Next, detection of the unique pattern will be described in detail with reference to FIGS. 11A and 11B. FIG. 11A illustrates a unique pattern of normal polarity and a reception waveform in the vicinity of the unique pattern, in a case where the two-wire cable is forward connected. (1) of FIG. 11A illustrates the number of clocks counted by first unique pattern detector 151A. (2) of FIG. 11A illustrates the number of clocks counted by second unique pattern detector 152A. 65 FIG. 11B illustrates a unique pattern of inverted polarity and a reception waveform in the vicinity of the unique pattern, in a case where the two-wire cable is reversely connected. (1) of FIG. 11B illustrates the number of clocks counted by first unique pattern detector 151A. (2) of FIG. 11B illustrates the number of clocks counted by second unique pattern detector 152A.

In a case where the two-wire cable is forward connected, as illustrated in (1) of FIG. 11A, the number of clocks counted by first unique pattern detector 151A is "20" between adjacent falling edges of unique pattern 1, and coincides with one of the first defined numbers. The number of clocks counted by first unique pattern detector 151A is "10" between other adjacent falling edges, and coincides with none of the first defined numbers. If first unique pattern detector 151A detects unique pattern 1, enable signal generator 153A falls the enable signal (SSCS) at a predetermined timing Z (becomes active). As illustrated in (2) of FIG. 11A, the number of clocks counted by second unique pattern detector 152A is "10" or "15" between any adjacent rising edges, and coincides with none of the first defined numbers. Thus, it is not possible that second unique pattern detector 152A detects the unique pattern. As described above, in a case where the two-wire cable is forward connected, only unique pattern 1 in which the number of sampling clocks is unique is detected by reception data processor 113A (first unique pattern detector 151A and second unique pattern detector 152A).

In a case where the two-wire cable is reversely connected, as illustrated in (2) of FIG. 11B, the number of clocks counted by second unique pattern detector 152A is "20" between adjacent rising edges of unique pattern 2, and coincides with one of the first defined numbers. The number of clocks counted by second unique pattern detector 152A is "10" between other adjacent rising edges, and coincides with none of the first defined numbers. If second unique pattern detector 152A detects unique pattern 2, enable signal generator 153A falls the enable signal (SSCS) at a predetermined timing Y (becomes active). As illustrated in (1) of FIG. 11B, the number of clocks counted by first unique pattern detector 151A is "10" or "15" between any adjacent falling edges, and coincides with none of the first defined numbers. Thus, it is not possible that first unique pattern detector 151A detects the unique pattern. As described above, in a case where the two-wire cable is reversely connected, only unique pattern 2 in which the number of sampling clocks is unique is detected by reception data processor 113A (first unique pattern detector 151A and second unique pattern detector 152A).

The reception waveform in FIG. 11B is obtained by inverting the reception waveform in FIG. 11A. Thus, in a case where a unique pattern in which the number of clocks between falling edges at a time of normal polarity corresponds to the first defined number is provided, necessarily, a unique pattern in which the number of clocks between rising edges at a time of inverted polarity corresponds to the first defined number is provided. In this case, unique pattern 1 and unique pattern 2 have the same arrangement position and the same timing, and the timings Z and Y when the enable signal (SSCS) is fallen (becomes active) are the same, respectively (timing 510 in FIG. 10A).

Flow of Reverse Detection Processing of Two-Wire Cable

Figure 12A:
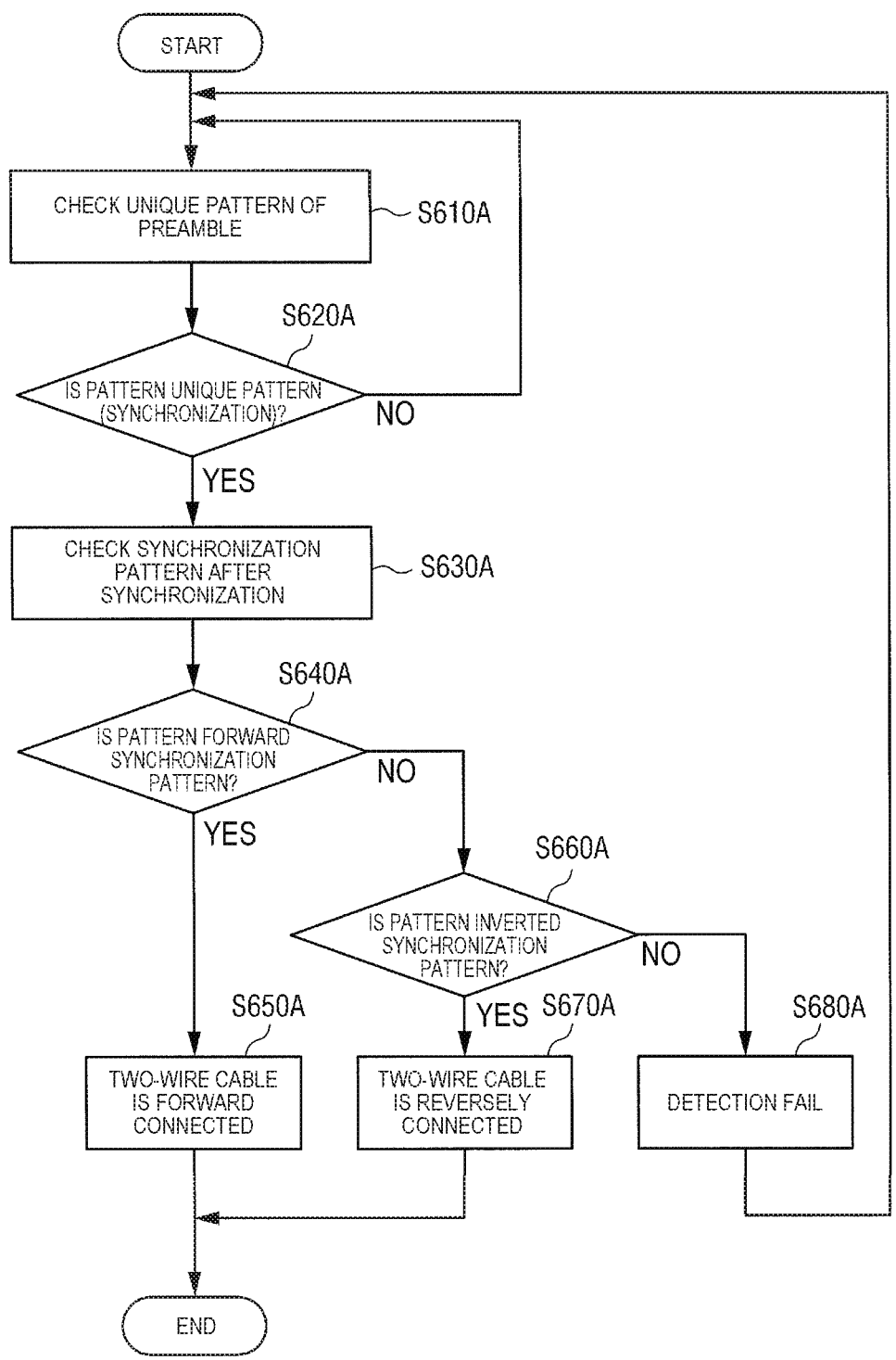
FIG. 12A is a flowchart illustrating an example of an operation of reverse detection processing of a two-wire cable according to the exemplary embodiment of the present disclosure.

Next, a flow of reverse detection processing of the two-wire cable in entrance slave device 100 (reception data processor 113A and connection status detector 134) will be described with reference to FIG. 12A.

In Step S610A, first unique pattern detector 151A and second unique pattern detector 152A cause reception data processor 113A to perform sampling on preamble data included in a downlink signal which has been output from reception driver 111 and has not been demodulated yet, in accordance with the clock of first clock generator 131. Reception data processor 113A checks a unique pattern of the preamble data based on the number of clocks of a measurement section which is positioned between adjacent falling edges or between adjacent rising edges.

In a case where the unique pattern can be detected (S620A: YES), it is determined that bit synchronization can be obtained, and thus the flow proceeds to Step S630A. In a case where detection is not possible (S620A: NO), the flow returns to Step S610A and the unique pattern is checked again.

In Step S630A, connection status detector 134 checks the synchronization pattern of reception data output from data reproducer 133.

In a case where the synchronization pattern of the reception data coincides with the synchronization pattern for forward connection check (first synchronization pattern) (S640A: YES), in Step S650A, connection status detector 134A determines that the two-wire cable is forward connected, and ends the detection processing.

In a case where the synchronization pattern of the reception data coincides with the synchronization pattern for reverse connection check (second synchronization pattern) obtained by inverting the synchronization pattern for forward connection check (S640A: NO, S660A: YES), in Step S670A, connection status detector 134 determines that the two-wire cable is reversely connected, and ends the detection processing.

In a case where the synchronization pattern of the reception data coincides with none of the synchronization pattern for forward connection check and the synchronization pattern for reverse connection check (S640A: NO, S660A: NO), in Step S680A, connection status detector 134 determines that detection of the synchronization pattern fails. Connection status detector 134 causes the flow to return to Step S610A and checks the unique pattern again.

Examples of the timing when the reverse of the two-wire cable is detected (determination of forward connection/reverse connection) include (1) a time when the system is installed or a time when resetting of intercom master device 200 is released (time of releasing resetting), (2) a time when a new device such as entrance slave device 100 is connected to the system in the process of operating the system (time of new connection), and (3) a time when the sub-master device starts an operation as the main master device. The time when the sub-master device starts an operation as the main master device refers to, for example, a time when an operable sub-master device starts an operation as the main master device in the two-household system if communication of main master device 200 is not possible due to a reason such as disconnection of a power supply breaker, and thus it is detected that the sub-master device does not receive a response from the main master device for a defined period or the defined number of times.

Sequences of (1) the time of releasing resetting and sequences of (2) the time of new connection will be described below in detail.

Flow of Synchronization Detection Processing

Figure 12B:
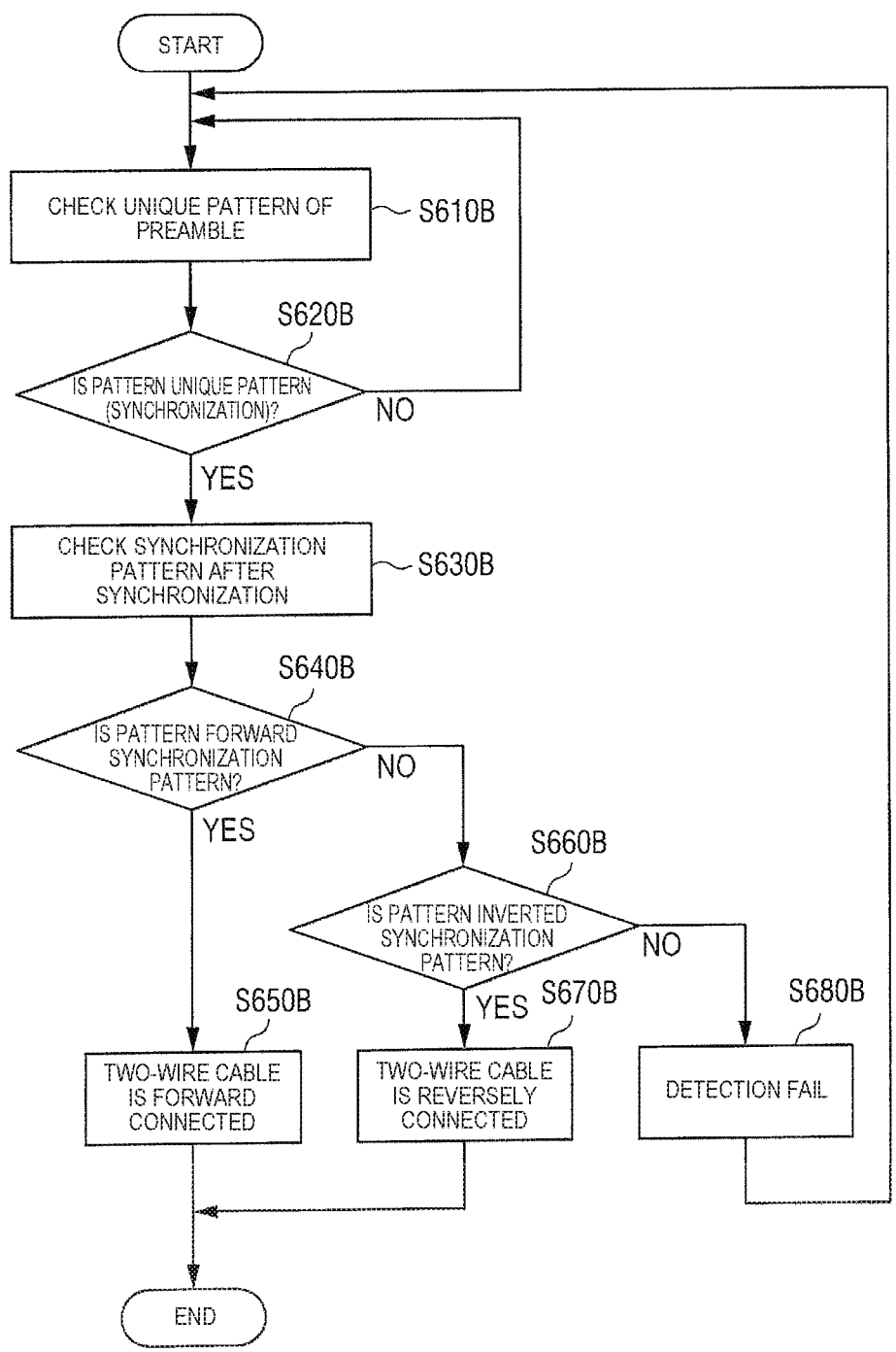
FIG. 12B is a flowchart illustrating an example of a synchronization detection processing according to the exemplary embodiment of the present disclosure.

Next, a flow of the synchronization detection processing in entrance slave device 100 (synchronization detector 113A and connection status detector 134) will be described with reference to FIG. 12B.

In Step S610B, first unique pattern detector 151B and second unique pattern detector 152B causes synchronization detector 113B to perform sampling on preamble data included in a downlink signal which has been output from reception driver 111 and has not been demodulated yet, in accordance with the clock of first clock generator 131. Synchronization detector 113B checks the unique pattern of the preamble data. The unique pattern is checked based on the number of clocks of a measurement section which is any one of positioned between adjacent falling edges or between adjacent rising edges.

In a case where the unique pattern can be detected (S620B: YES), it is determined that bit synchronization can be obtained, and thus the flow proceeds to Step S630B. In a case where detection is not possible (S620B: NO), the flow returns to Step S610B and the unique pattern is checked again.

In Step S630B, connection status detector 134 checks the synchronization pattern of the reception data output from data reproducer 133.

In a case where the synchronization pattern of the reception data coincides with the synchronization pattern for forward connection check (S640B: YES), in Step S650B, connection status detector 134 determines that the two-wire cable is forward connected, and ends the synchronization detection processing.

In a case where the synchronization pattern of the reception data coincides with the synchronization pattern for reverse connection check (S640B: NO, S660B: YES), in Step S670B, connection status detector 134 determines that the two-wire cable is reversely connected, and ends the synchronization detection processing.

In a case where the synchronization pattern of the reception data coincides with none of the synchronization pattern for reverse connection check and the synchronization pattern for forward connection check (S640B: NO, S660B: NO), in Step S680B, connection status detector 134 determines that detection of the synchronization pattern fails. Connection status detector 134 causes the flow to return to Step S610B and checks the unique pattern again.

Sequences of Initial Registration After Resetting is Released

Figure 15:
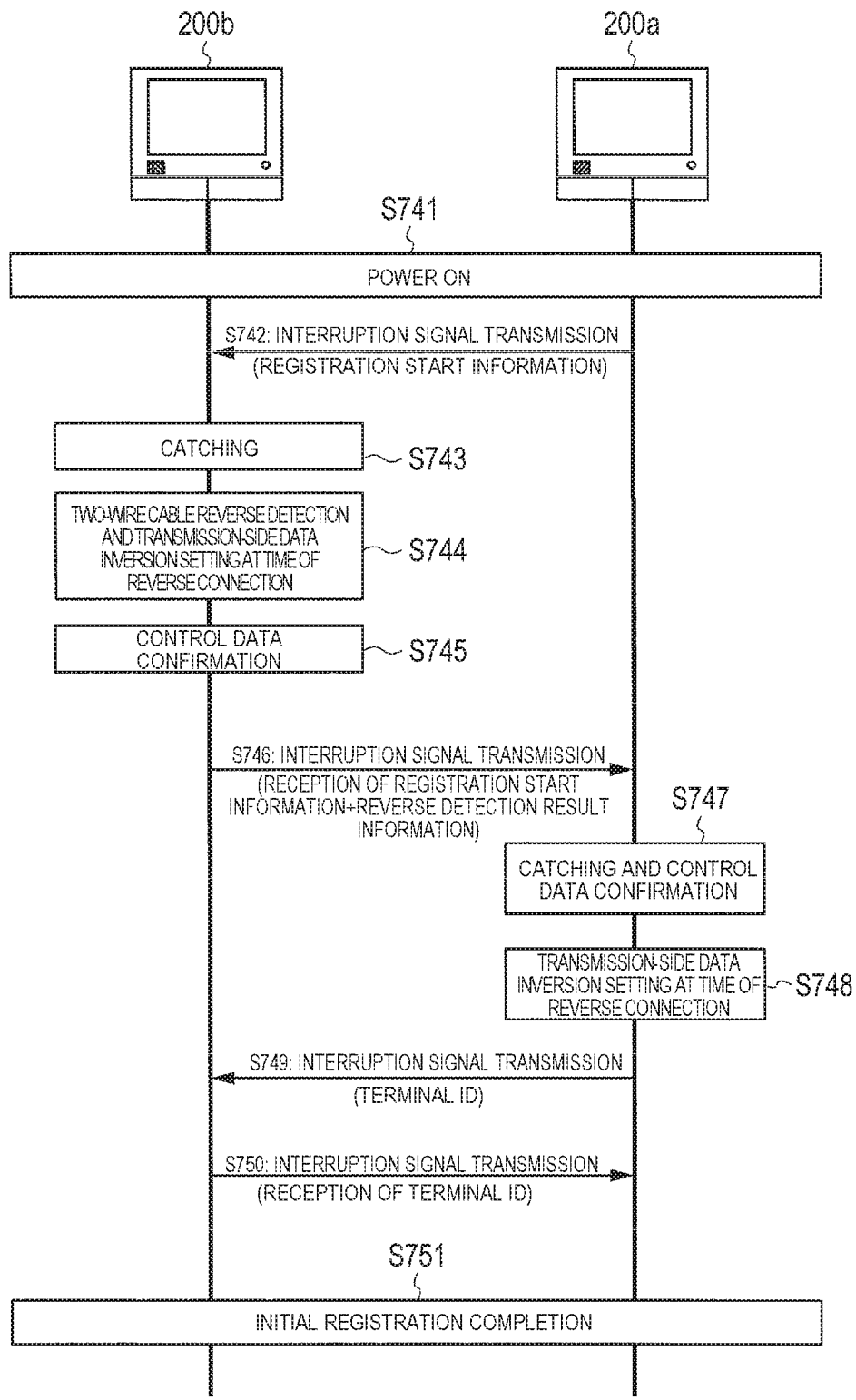
FIG. 15 is a sequence diagram illustrating initial registration (registration of a master device, use of an interruption signal) after resetting is released, according to the exemplary embodiment of the present disclosure.
Figure 16:
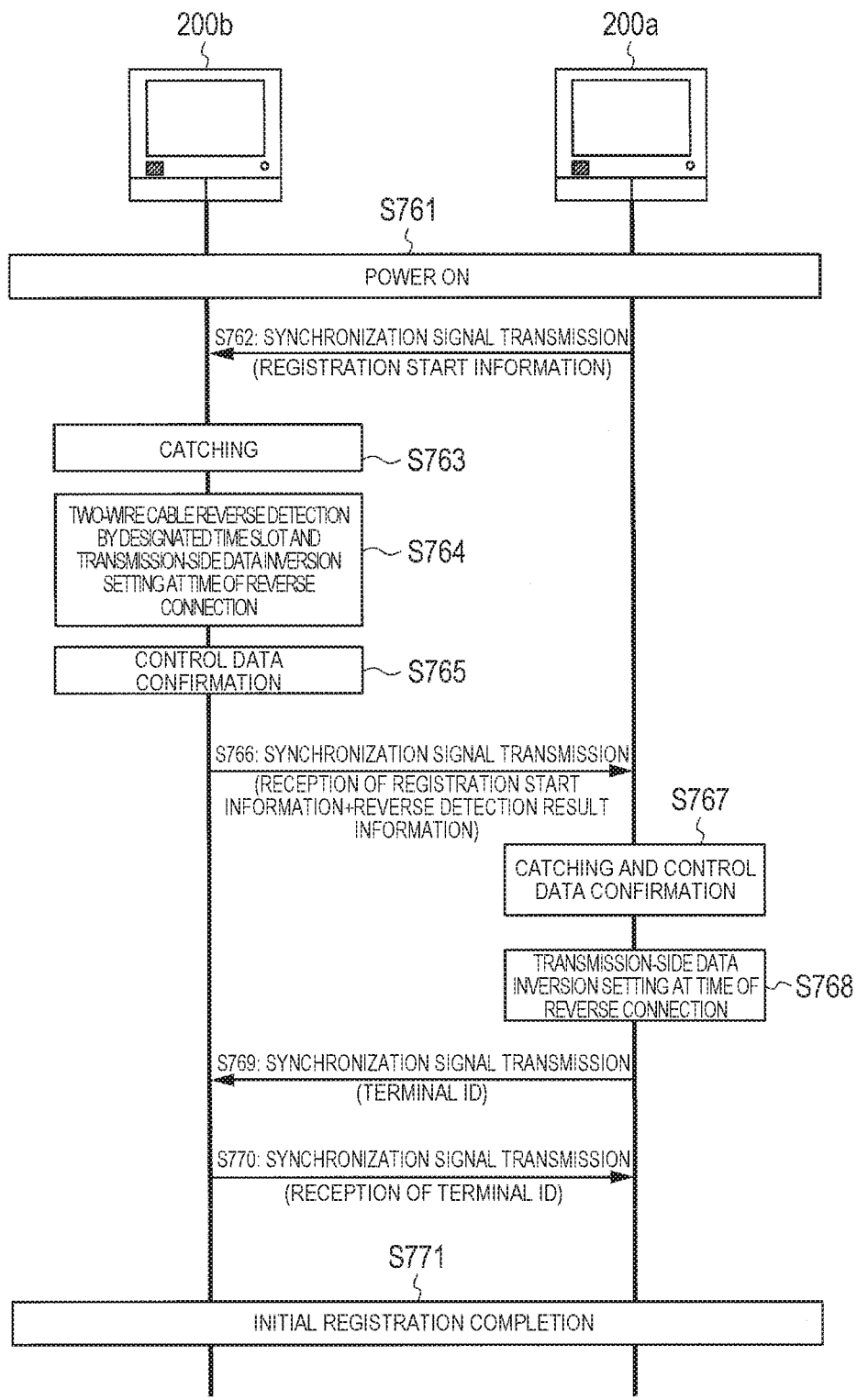
FIG. 16 is a sequence diagram illustrating initial registration (registration of the master device, use of a synchronization signal) after resetting is released, according to the exemplary embodiment of the present disclosure.

Next, sequences of initial registration after resetting is released, according to the exemplary embodiment will be described with reference to FIGS. 13 to 16. FIGS. 13 and 14 illustrate sequences of initial registration between intercom master device 200 and entrance slave device 100. FIGS. 15 and 16 illustrate sequences of initial registration between main master device 200a and sub-master device 200b. FIGS. 13 and 15 illustrate a case of using the interruption signal illustrated in FIG. 2B. FIGS. 14 and 16 illustrate a case of using a synchronization signal by a frame configured by time slots illustrated in FIG. 2A.

In a case of FIG. 13, if the power source turn ON (S701), intercom master device 200 transmits an interruption signal (downlink packet) in which registration start information is written in the control data field, to entrance slave device 100 (S702).

Entrance slave device 100 catches the interruption signal from intercom master device 200 (S703). Catching of the interruption signal specifically means that sampling is performed on the interruption signal by using the clock of the first frequency, the unique pattern in the preamble is detected so as to establish bit synchronization, the interruption signal is reproduced by using the clock of the second frequency, and thus the synchronization pattern is detected.

Entrance slave device 100 detects reverse of the two-wire cable (determines forward connection/reverse connection) by using the synchronization pattern of the interruption signal. In a case where the two-wire cable is reversely connected, entrance slave device 100 performs inversion setting to transmission data inverter 109 and reception data inverter 112 (S704).

Then, entrance slave device 100 confirms control data (registration start information) of the interruption signal (S705), and transmits the interruption signal (uplink packet) in which reception of the registration start information is written in the control data field, to intercom master device 200 (S706).

Entrance slave device 100 may further write reverse detection result information indicating whether the two-wire cable is forward connected or reversely connected, in the control data field, and may notify intercom master device 200 of the interruption signal.

Intercom master device 200 catches the interruption signal from entrance slave device 100, and confirms control data (reception of the registration start information) in the interruption signal (S707).

Intercom master device 200 transmits an interruption signal (downlink packet) in which a specific identifier (terminal ID) assigned to entrance slave device 100 is written in the control data field (S708).

Entrance slave device 100 confirms control data (terminal ID) of the interruption signal, and transmits an interruption signal (uplink packet) in which reception of the terminal ID is written in the control data field, to intercom master device 200 (S709).

The initial registration is ended by the above processing (S710).

FIG. 13 illustrates sequences in which an interruption signal is transmitted to entrance slave device 100 from intercom master device 200, entrance slave device 100 detects reverse of the two-wire cable (determines forward connection/reverse connection), and inversion setting of data is performed in a case of the reverse connection. However, the exemplary embodiment is not limited thereto, and the following sequences may be performed. That is, an interruption signal is transmitted to intercom master device 200 from entrance slave device 100, intercom master device 200 detects reverse of the two-wire cable (determines forward connection/reverse connection), and performs inversion setting of data is performed in a case of the reverse connection, and entrance slave device 100 is notified of reverse detection result information from intercom master device 200. In this case, processes subsequent to S708 in which ID is transmitted to entrance slave device 100 from intercom master device 200 may be similarly performed.

In a case of FIG. 14, if the power source turn ON (S721), intercom master device 200 transmits a synchronization signal (downlink packet) in which registration start information and a second designated time slot (number) in a case where transmission is performed from entrance slave device 100 to intercom master device 200 are written in the control data field of a first designated time slot, to entrance slave device 100 (S722). As the second designated time slot, a known time slot which has been prepared as being dedicated for registration may be used.

Entrance slave device 100 obtains synchronization with intercom master device 200, in accordance with the synchronization signal (downlink packet) from intercom master device 200 (S723). Thus, entrance slave device 100 and intercom master device 200 are in a synchronization state. Acquisition of synchronization specifically means that sampling is performed on the synchronization signal by using the clock of the first frequency, the unique pattern in the preamble is detected so as to establish bit synchronization, the interruption signal is reproduced by using the clock of the second frequency, and thus the synchronization pattern is detected.

Entrance slave device 100 detects reverse of the two-wire cable (determines forward connection/reverse connection) by using a synchronization pattern of the first designated time slot in the synchronization signal (downlink packet) or a time slot which arrives ahead of the first designated time slot. In a case where the two-wire cable is reversely connected, entrance slave device 100 performs inversion setting to transmission data inverter 109 and reception data inverter 112 (S724).

Then, entrance slave device 100 confirms control data (registration start information) of the first designated time slot in the synchronization signal (downlink packet) (S725), and transmits a synchronization signal (uplink packet) in which reception of the registration start information is written in the control data field of the second designated time slot, to intercom master device 200 (S726).

Entrance slave device 100 may further write reverse detection result information indicating whether the two-wire cable is forward connected or reversely connected, in the control data field, and may notify intercom master device 200 of the interruption signal.

Intercom master device 200 catches the synchronization signal (uplink packet) from entrance slave device 100, and confirms the control data (reception of registration start information) of the second designated time slot (S727).

Intercom master device 200 transmits a synchronization signal (downlink packet) including the first designated time slot in which a specific identifier (terminal ID) assigned to entrance slave device 100 is written in the control data field (S728).

Entrance slave device 100 confirms the control data (terminal ID) of the first designated time slot in the synchronization signal (downlink packet), and transmits a synchronization signal (uplink packet) including the second designated time slot in which reception of the terminal ID is written in the control data field, to intercom master device 200 (S729).

The initial registration is completed by the above processing (S730).

FIG. 14 illustrates sequences in which a synchronization signal is transmitted to entrance slave device 100 from intercom master device 200, entrance slave device 100 detects reverse of the two-wire cable (determines forward connection/reverse connection), and inversion setting of data is performed in a case of the reverse connection. However, the exemplary embodiment is not limited thereto, and the following sequences may be performed. That is, a synchronization signal is transmitted to intercom master device 200 from entrance slave device 100, intercom master device 200 detects reverse of the two-wire cable (determines forward connection/reverse connection), and performs inversion setting of data is performed in a case of the reverse connection, and entrance slave device 100 is notified of reverse detection result information from intercom master device 200. In this case, processes subsequent to S728 in which ID is transmitted to entrance slave device 100 from intercom master device 200 may be similarly performed.

In a case of FIG. 15, if the power source turn ON (S741), main master device 200a transmits an interruption signal (downlink packet) in which registration start information is written in the control data field, to sub-master device 200b (S742).

Sub-master device 200b catches the interruption signal from main master device 200a (S743). Sub-master device 200*b* detects reverse of the two-wire cable (determines forward connection/reverse connection) by using the synchronization pattern of the interruption signal. In a case where the two-wire cable is reversely connected, sub-master device 200*b* performs inversion setting to transmission data inverter 209 (S744).

Then, sub-master device 200*b* confirms control data (registration start information) of the interruption signal (S745), and transmits an interruption signal (uplink packet) in which the reception of registration start information and reverse detection result information are written in the control data field, to main master device 200*a* (S746).

Main master device 200*a* catches an interruption signal from sub-master device 200*b*, and confirms the control data (reception of the registration start information and reverse detection result information) of the interruption signal (S747).

In a case where it is determined that the two-wire cable is reversely connected by using the reverse detection result information, main master device 200*a* performs inversion setting to transmission data inverter 209 (S748).

Main master device 200*a* transmits the interruption signal (downlink packet) in which a specific identifier (terminal ID) assigned to sub-master device 200*b* is written in the control data field (S749).

Sub-master device 200*b* confirms control data (terminal ID) of the interruption signal, and transmits the interruption signal (uplink packet) in which reception of the terminal ID is written in the control data field, to main master device 200*a* (S750).

The initial registration is completed by the above processing (S751).

FIG. 15 illustrates sequences in which an interruption signal is transmitted to sub-master device 200*b* from main master device 200*a*, sub-master device 200*b* detects reverse of the two-wire cable (determines forward connection/reverse connection), and inversion setting of data is performed in a case of the reverse connection. However, the exemplary embodiment is not limited thereto, and the following sequences may be performed. That is, an interruption signal is transmitted to main master device 200*a* from sub-master device 200*b*, main master device 200*a* detects reverse of the two-wire cable (determines forward connection/reverse connection), and performs inversion setting of data is performed in a case of the reverse connection, and sub-master device 200*b* is notified of reverse detection result information from main master device 200*a*. In this case, processes subsequent to S749 in which ID is transmitted to sub-master device 200*b* from main master device 200*a* may be similarly performed.

In FIG. 16, in a case where the power source turn ON (S761), main master device 200*a* transmits a synchronization signal (downlink packet) in which registration start information and a second designated time slot (number) in a case where transmission is performed from sub-master device 200*b* to main master device 200*a* are written in the control data field of a first designated time slot, to sub-master device 200*b* (S762). As the second designated time slot, a known time slot which has been prepared as being dedicated for registration may be used.

Sub-master device 200*b* obtains synchronization with main master device 200*a* in accordance with the synchronization signal (downlink packet) from main master device 200*a* (S763). Thus, sub-master device 200*b* and main master device 200*a* are in the synchronization state.

Sub-master device 200*b* detects reverse of the two-wire cable (determines forward connection/reverse connection) by using a synchronization pattern of the first designated time slot in the synchronization signal (downlink packet) or a time slot which arrives ahead of the first designated time slot. In a case where the two-wire cable is reversely connected, sub-master device 200*b* performs inversion setting to transmission data inverter 209 (S764).

Then, sub-master device 200*b* confirms control data (registration start information) of the first designated time slot in the synchronization signal (downlink packet) (S765), and transmits a synchronization signal (uplink packet) in which the reception of the registration start information and reverse detection result information are written in the control data field of the second designated time slot, to main master device 200*a* (S766).

Main master device 200*a* catches a synchronization signal (uplink packet) from sub-master device 200*b*, and confirms the control data (reception of the registration start information and reverse detection result information) of the second designated time slot (S767).

In a case where it is determined that the two-wire cable is reversely connected by using the reverse detection result information, main master device 200*a* performs inversion setting to transmission data inverter 209 (S768).

Main master device 200*a* transmits the synchronization signal (downlink packet) including the first designated time slot in which a specific identifier (terminal ID) assigned to sub-master device 200*b* is written in the control data field (S769).

Sub-master device 200*b* confirms the control data (terminal ID) of the first designated time slot in the synchronization signal (downlink packet), and transmits a synchronization signal (uplink packet) including the second designated time slot in which reception of the terminal ID is written in the control data field, to main master device 200*a* (S770).

The initial registration is completed by the above processing (S771).

FIG. 16 illustrates sequences in which a synchronization signal is transmitted to sub-master device 200*b* from main master device 200*a*, sub-master device 200*b* detects reverse of the two-wire cable (determines forward connection/reverse connection), and inversion setting of data is performed in a case of the reverse connection. However, the exemplary embodiment is not limited thereto, and the following sequences may be performed. That is, a synchronization signal is transmitted to main master device 200*a* from sub-master device 200*b*, main master device 200*a* detects reverse of the two-wire cable (determines forward connection/reverse connection), and performs inversion setting of data is performed in a case of the reverse connection, and sub-master device 200*b* is notified of reverse detection result information from main master device 200*a*. In this case, processes subsequent to S769 in which ID is transmitted to sub-master device 200*b* from main master device 200*a* may be similarly performed.

Sequences of Initial Registration at Time of New Connection

Figure 17:
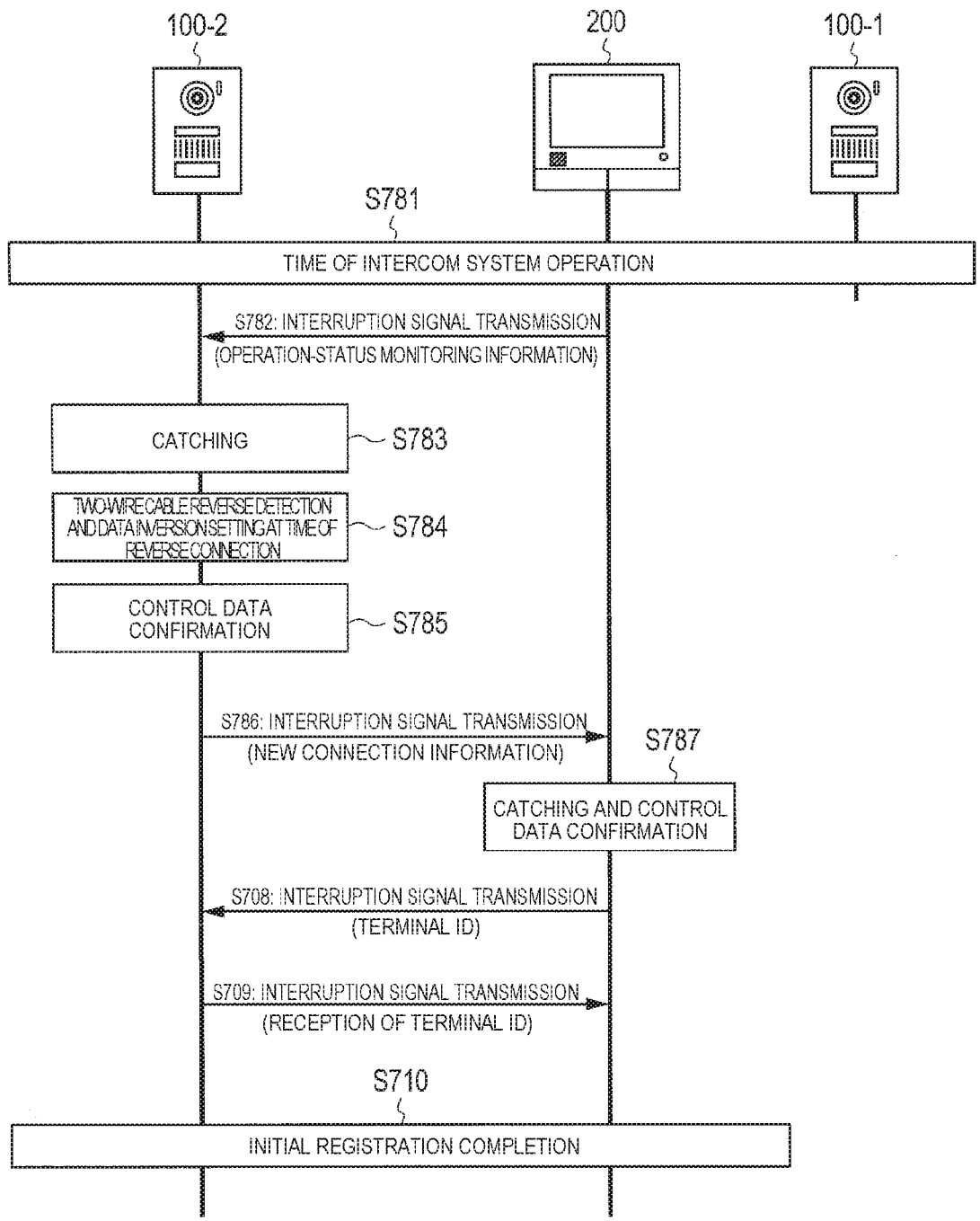
FIG. 17 is a sequence diagram illustrating initial registration (registration of the slave device, use of an interruption signal) when a new connection is performed, according to the exemplary embodiment of the present disclosure.
Figure 18:
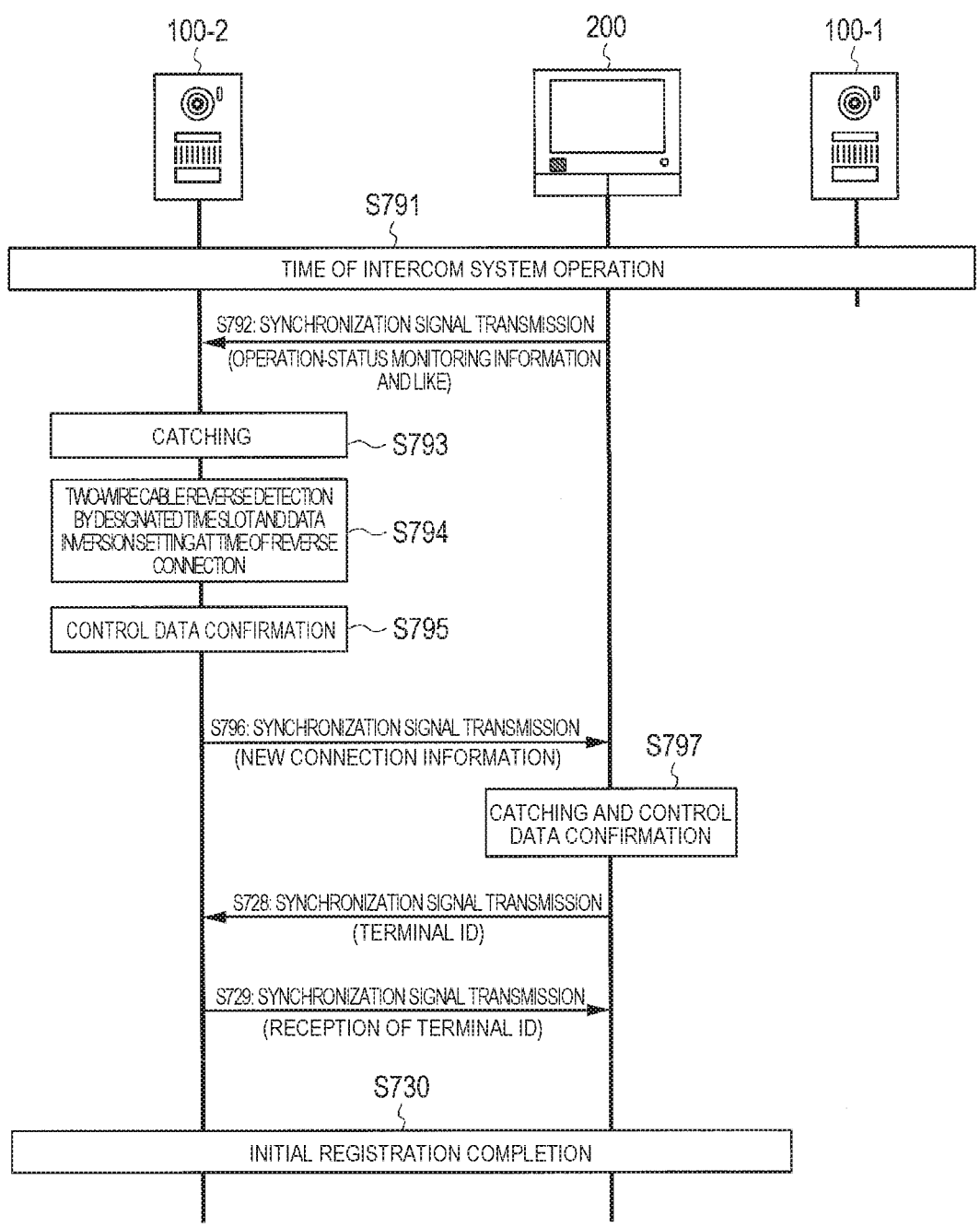
FIG. 18 is a sequence diagram illustrating initial registration (registration of the slave device, use of a synchronization signal) when a new connection is performed, according to the exemplary embodiment of the present disclosure.

Next, sequences of the initial registration at a time of new connection, according to the exemplary embodiment will be described with reference to FIGS. 17 and 18. FIG. 17 illustrates a case of using the interruption signal illustrated in FIG. 2B. FIG. 18 illustrates a case of using a synchronization signal by a frame configured by time slots illustrated in FIG. 2A. In FIGS. 17 and 18, processes which are common with those in FIGS. 13 and 14 are denoted by the same reference signs, and descriptions thereof will be omitted.

In FIGS. 17 and 18, it is assumed that initial registration of entrance slave device 100-1 is already completed, entrance slave device 100-1 is in a communication state with intercom master device 200 or is in a standby state in which communication with intercom master device 200 is possible. Further, it is assumed that a new entrance slave device 100-2 is connected to intercom master device 200, and initial registration of entrance slave device 100-2 is not completed.

In a case of FIG. 17, when the intercom system is operated (S781), intercom master device 200 transmits an interruption signal (downlink packet) in which operation-status monitoring information is written in the control data field, to entrance slave device 100-2 (S782).

Entrance slave device 100-2 catches the interruption signal from intercom master device 200 (S783). Entrance slave device 100-2 detects reverse of the two-wire cable (determines forward connection/reverse connection) by using the synchronization pattern of the interruption signal. In a case where the two-wire cable is reversely connected, entrance slave device 100-2 performs inversion setting to transmission data inverter 109 and reception data inverter 112 (S784).

Then, entrance slave device 100-2 confirms control data (operation-status monitoring information) of the interruption signal (S785), and transmits an interruption signal (uplink packet) in which new connection information is written in the control data field, to intercom master device 200 (S786). Entrance slave device 100-2 may further write reverse detection result information indicating whether the two-wire cable is forward connected or is reversely connected, in the control data field, and may notify intercom master device 200.

Intercom master device 200 catches the interruption signal from entrance slave device 100-2, and confirms control data (new connection information) of the interruption signal (S787).

Then, the processes of S708 and S709 illustrated in FIG. 13 are performed between intercom master device 200 and entrance slave device 100-2, and then the initial registration of entrance slave device 100-2 is completed (S710).

FIG. 17 illustrates sequences in which an interruption signal is transmitted to entrance slave device 100-2 from intercom master device 200, entrance slave device 100-2 detects reverse of the two-wire cable (determines forward connection/reverse connection), and inversion setting of data is performed in a case of the reverse connection. However, the exemplary embodiment is not limited thereto, and the following sequences may be performed. That is, an interruption signal is transmitted to intercom master device 200 from entrance slave device 100-2, intercom master device 200 detects reverse of the two-wire cable (determines forward connection/reverse connection), and performs inversion setting of data is performed in a case of the reverse connection, and entrance slave device 100-2 is notified of reverse detection result information from intercom master device 200. In this case, processes subsequent to S708 in which ID is transmitted to entrance slave device 100-2 from intercom master device 200 may be similarly performed.

In a case of FIG. 18, when the intercom system is operated (S791), intercom master device 200 transmits a synchronization signal (downlink packet) in which operation-status monitoring information and a second designated time slot (number) in a case where transmission is performed from entrance slave device 100-2 to intercom master device 200 are written in the control data field of the first designated time slot, to entrance slave device 100-2 (S792). As the second designated time slot, a known time slot which has been prepared as being dedicated for registration may be used.

Entrance slave device 100-2 obtains synchronization with intercom master device 200, in accordance with the synchronization signal (downlink packet) from intercom master device 200 (S793). Thus, entrance slave device 100-2 and intercom master device 200 are in the synchronization state.

Entrance slave device 100-2 detects reverse of the two-wire cable (determines forward connection/reverse connection) by using a synchronization pattern of the first designated time slot in the synchronization signal (downlink packet) or a time slot which arrives ahead of the first designated time slot. In a case where the two-wire cable is reversely connected, entrance slave device 100-2 performs inversion setting to transmission data inverter 109 and reception data inverter 112 (S794).

Then, entrance slave device 100-2 confirms control data (operation-status monitoring information) of the first designated time slot in the synchronization signal (downlink packet) (S795), and transmits a synchronization signal (uplink packet) in which new connection information is written in the control data field of the second designated time slot, to intercom master device 200 (S796). Entrance slave device 100-2 may further write reverse detection result information indicating whether the two-wire cable is forward connected or is reversely connected, in the control data field, and may notify intercom master device 200. Intercom master device 200 catches the synchronization signal (uplink packet) from entrance slave device 100-2, and confirms control data (new connection information) of the second designated time slot (S797).

Then, the processes of S728 and S729 illustrated in FIG. 14 are performed between intercom master device 200 and entrance slave device 100-2, and then the initial registration of entrance slave device 100-2 is completed (S730).

FIG. 18 illustrates sequences in which a synchronization signal is transmitted to entrance slave device 100-2 from intercom master device 200, entrance slave device 100-2 detects reverse of the two-wire cable (determines forward connection/reverse connection), and inversion setting of data is performed in a case of the reverse connection. However, the exemplary embodiment is not limited thereto, and the following sequences may be performed. That is, a synchronization signal is transmitted to intercom master device 200 from entrance slave device 100-2, intercom master device 200 detects reverse of the two-wire cable (determines forward connection/reverse connection), and performs inversion setting of data is performed in a case of the reverse connection, and entrance slave device 100-2 is notified of reverse detection result information from intercom master device 200. In this case, processes subsequent to S728 in which ID is transmitted to entrance slave device 100-2 from intercom master device 200 may be similarly performed.

FIGS. 15 and 16 illustrate initial registration of intercom master device 200a and intercom master device 200b when the power source turns ON. However, the sequences are similarly also applied to a case where a new sub-master device 200b is connected to main master device 200a when the intercom system is operated. In this case, "power ON" in FIGS. 15 and 16 may be changed to "when the intercom system is operated", and "registration start information" may be changed to "operation-status monitoring information". In this case, illustration of entrance slave device 100 connected to intercom master device 200 will be omitted.

If communication of main master device is not possible due to a reason such as disconnection of a power supply breaker, and thus it is detected that the sub-master device does not receive a response from the main master device for a defined period or the defined number of times, an operable sub-master device starts an operation as a new main master device. Then, in a case where the old main master device in which communication has not been possible is revived, the old main master device is registered as a new sub-master device.

The sequences (illustrated in FIGS. 13 to 18) of detection of reverse connection of the two-wire cable and data inversion setting at a time of reverse connection are performed between devices which are connected to each other by using one two-wire cable. That is, the sequences are performed between intercom master device 200 and entrance slave device 100 connected to intercom master device 200, and between two intercom master devices 200 connected to each other (between main master device 200*a* and sub-master device 200*b*). For example, as in a case of entrance slave device 100 connected to sub-master device 200*b* and main master device 200*a*, even when two two-wire cables between devices which are connected to each other through the two two-wire cables are reversely connected, detection as "forward connection" occurs. Thus, performing the above sequences is not possible.

Sequences from Standby State to Communication State

Figure 19:
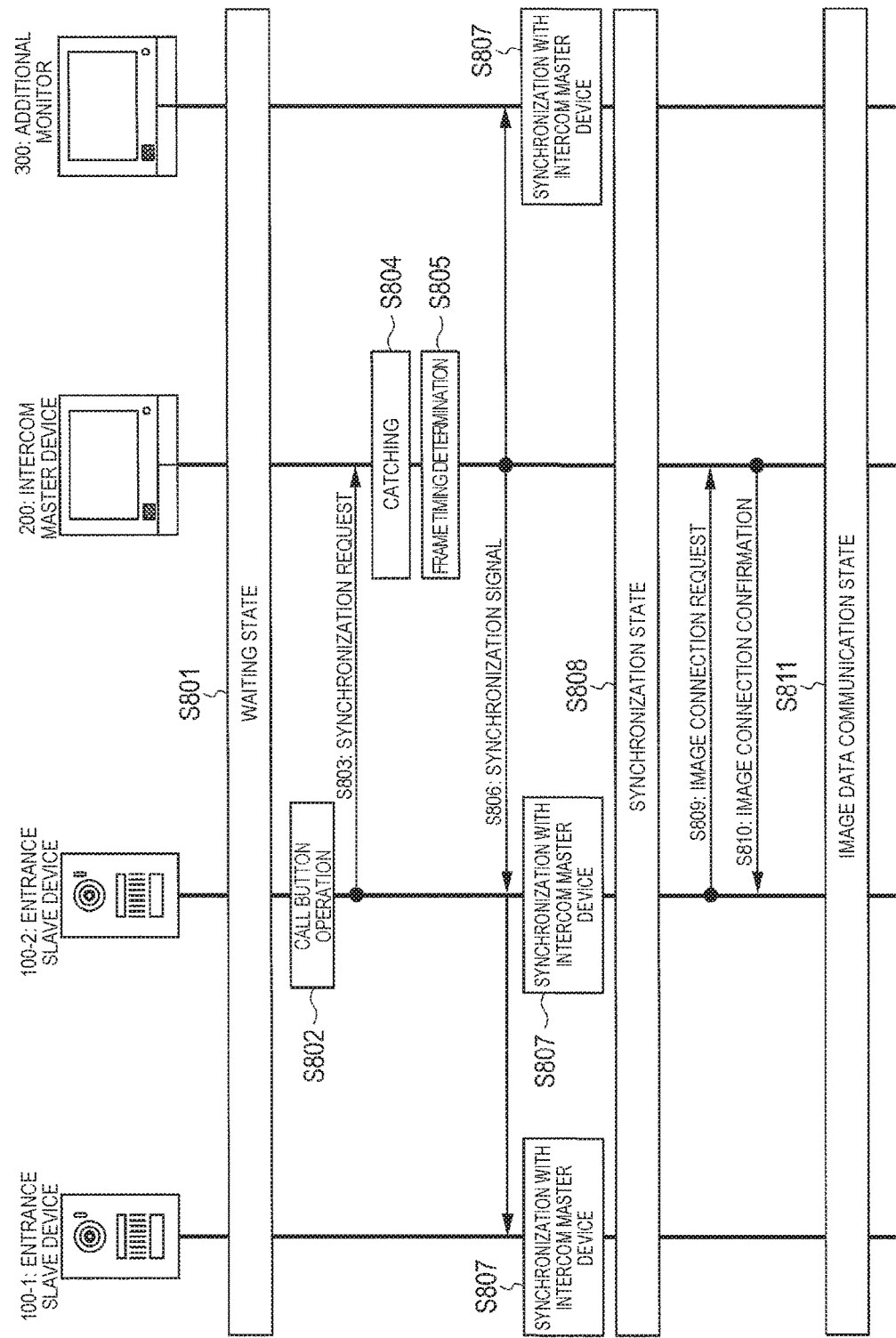
FIG. 19 is a sequence diagram from a standby state to a communication state according to the exemplary embodiment of the present disclosure.

Sequences from the standby state (during asynchronous communication) to the communication state, according to the exemplary embodiment will be described with reference to FIG. 19. FIG. 19 illustrates sequences in a case where the entrance slave devices 100-1 and 100-2, and additional monitor 300 are connected to intercom master device 200.

In the standby state (during asynchronous communication) (S801) in which data is not transmitted and received between each of the devices and intercom master device 200, in a case (S802) where the call button of entrance slave device 100-2 is operated, entrance slave device 100-2 transmits an interruption signal in which a synchronization request is written in the control data field, to intercom master device 200 so as to perform the synchronization request (S803).

Intercom master device 200 catches the interruption signal (S804), and confirms the synchronization request included in the interruption signal. Catching of the interruption signal specifically means that sampling is performed on the interruption signal by using the clock of the first frequency, the unique pattern in the preamble is detected so as to establish bit synchronization, the interruption signal is reproduced by using the clock of the second frequency, and thus the synchronization pattern is detected.

If intercom master device 200 confirms the synchronization request from entrance slave device 100-2, intercom master device 200 determines a frame timing for performing synchronous communication with each of the devices (S805), and transmits a synchronization signal to each of the devices (S806).

Each of the devices obtains synchronization with intercom master device 200, in accordance with the synchronization signal (S807). Thus, each of the devices and intercom master device 200 are in the synchronization state (S808).

Then, entrance slave device 100-2 transmits an uplink packet in which an image connection request is written in the control data field, to the master device 200 so as to perform the image connection request (S809). If intercom master device 200 confirms the image connection request, intercom master device 200 transmits a downlink packet in which image connection confirmation is written in the control data field, to entrance slave device 100-2 so as to perform the image connection confirmation (S810). After that, an image data communication state in which entrance slave device 100-2 transmits image data to intercom master device 200 by using the uplink packet, and intercom master device 200 displays the image data occurs (S811). The image data transmitted from entrance slave device 100-2 is broadcasted from intercom master device 200 to other devices (entrance slave device 100-1 and additional monitor 300), and thus the image data can be displayed in additional monitor 300.

Operation of Each Device

Next, an operation of each of the devices will be described.

Operation of Entrance Slave Device

Figure 20:
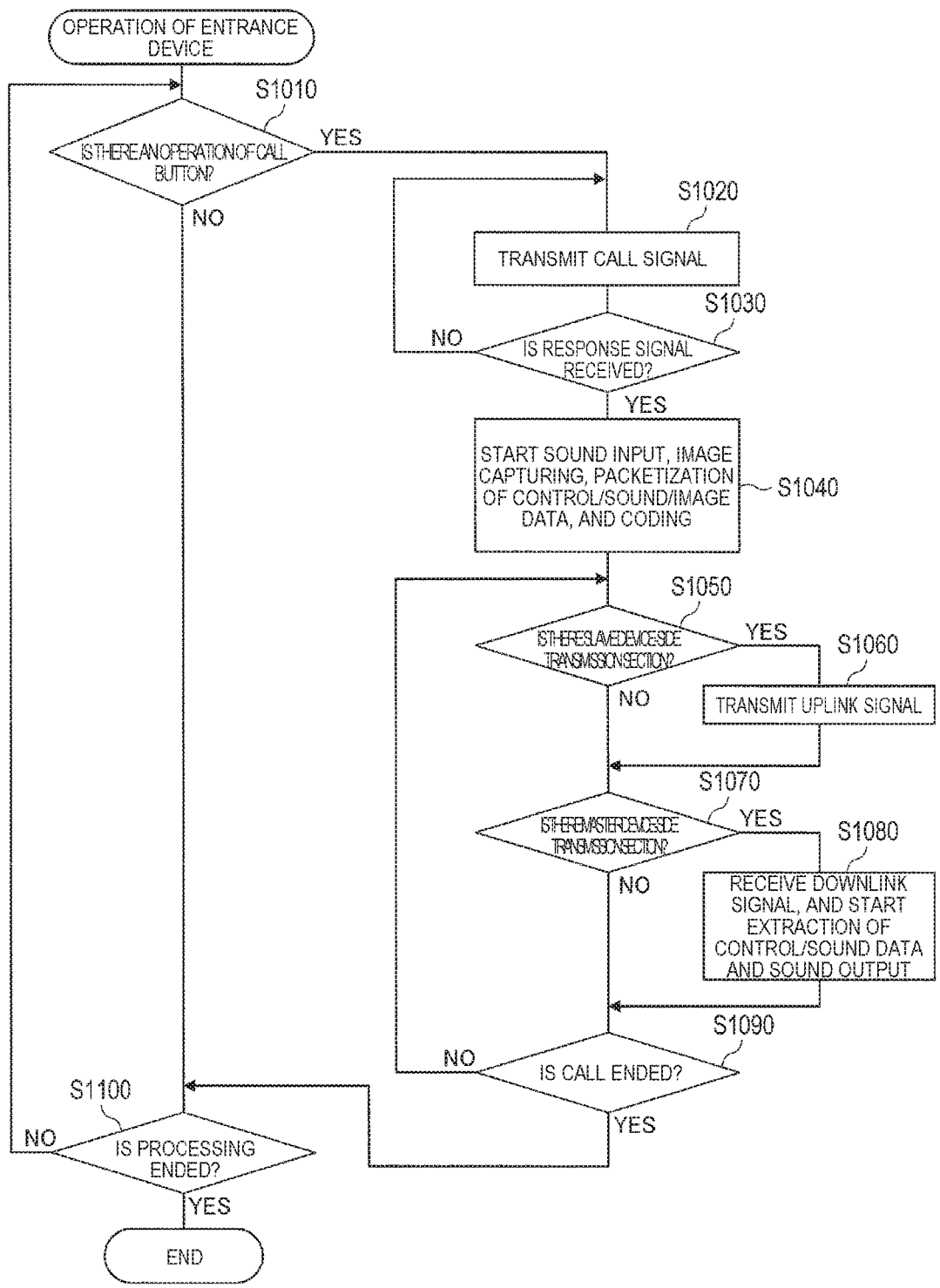
FIG. 20 is a flowchart illustrating an example of an operation of the entrance slave device according to the exemplary embodiment of the present disclosure.

FIG. 20 is a flowchart illustrating an example of an operation of entrance slave device 100.

In Step S1010, controller 107 determines whether or not the call button is operated. In a case where the call button is operated (S1010: YES), controller 107 causes the flow to proceed to Step S1020. In a case where the call button is not operated (S1010: NO), controller 107 causes the flow to proceed to Step S1100 (which will be described later).

In Step S1020, controller 107 transmits a call signal to intercom master device 200.

In Step S1030, controller 107 determines whether or not a response signal is received from intercom master device 200. In a case where the response signal is not received (S1030: NO), controller 107 causes the flow to return to Step S1020. In a case where the response signal is received (S1030: YES), controller 107 causes the flow to proceed to Step S1040. In a case where controller 107 does not receive the response signal even though the call signal is transmitted a predetermined number of times, controller 107 may cause the flow to proceed to Step S1100 (which will be described later).

In Step S1040, controller 107 starts sound input and image capturing by using microphone 104, sound I/F 105, and camera 106. Controller 107 starts packetization and coding of various types of data (control data/digital sound data/digital image data) to be transmitted, by using packet generator 132 and transmission data processor 108. Controller 107 may control a transmission rate of digital sound data and digital image data.

In Step S1050, controller 107 determines whether or not to be in a slave-device side transmission section. In a case of being in the transmission section (S1050: YES), controller 107 causes the flow to proceed to Step S1060. In a case of not being in the transmission section (S1050: NO), controller 107 causes the flow to proceed to Step S1070 (which will be described later).

In Step S1060, controller 107 transmits an uplink signal generated by coding, to intercom master device 200 through the two-wire cable by using transmission driver 110. Controller 107 stops transmission of the uplink signal when the transmission section is ended.

In Step S1070, controller 107 determines whether or not to be a master-device side transmission section. In a case of being in the transmission section (S1070: YES), controller 107 causes the flow to proceed to Step S1080. In a case of not being in the transmission section (S1070: NO), controller 107 causes the flow to proceed to Step S1090 (which will be described later).

In Step S1080, controller 107 starts reception of a downlink signal, extraction of various types of data (control data/sound data), and output of sound. Controller 107 stops the reception of a downlink signal or the extraction of various types of data when the transmission section is ended.

In Step S1090, controller 107 determines whether or not a call between entrance slave device 100 and intercom master device 200 is ended. For example, controller 107 determines that the call is ended, when a signal indicating that an operation of call end is performed in intercom master device 200 is received from intercom master device 200. In a case where the call is not ended (S1090: NO), controller 107 causes the flow to return to Step S1050. In a case where the call is ended (S1090: YES), controller 107 causes the flow to proceed to Step S1100.

In Step S1100, controller 107 determines whether an instruction to end processing relating to an intercom function is performed. For example, controller 107 determines that the instruction to end the above processing is performed, when a signal indicating that an operation of stopping the intercom function is performed in intercom master device 200 is received from intercom master device 200. In a case where the instruction to end the above processing is not performed (S1100: NO), controller 107 causes the flow to return to Step S1010. In a case where the instruction to end the above processing is performed (S1100: YES), controller 107 ends a series of processes.

Operation of Intercom Master Device

Figure 21:
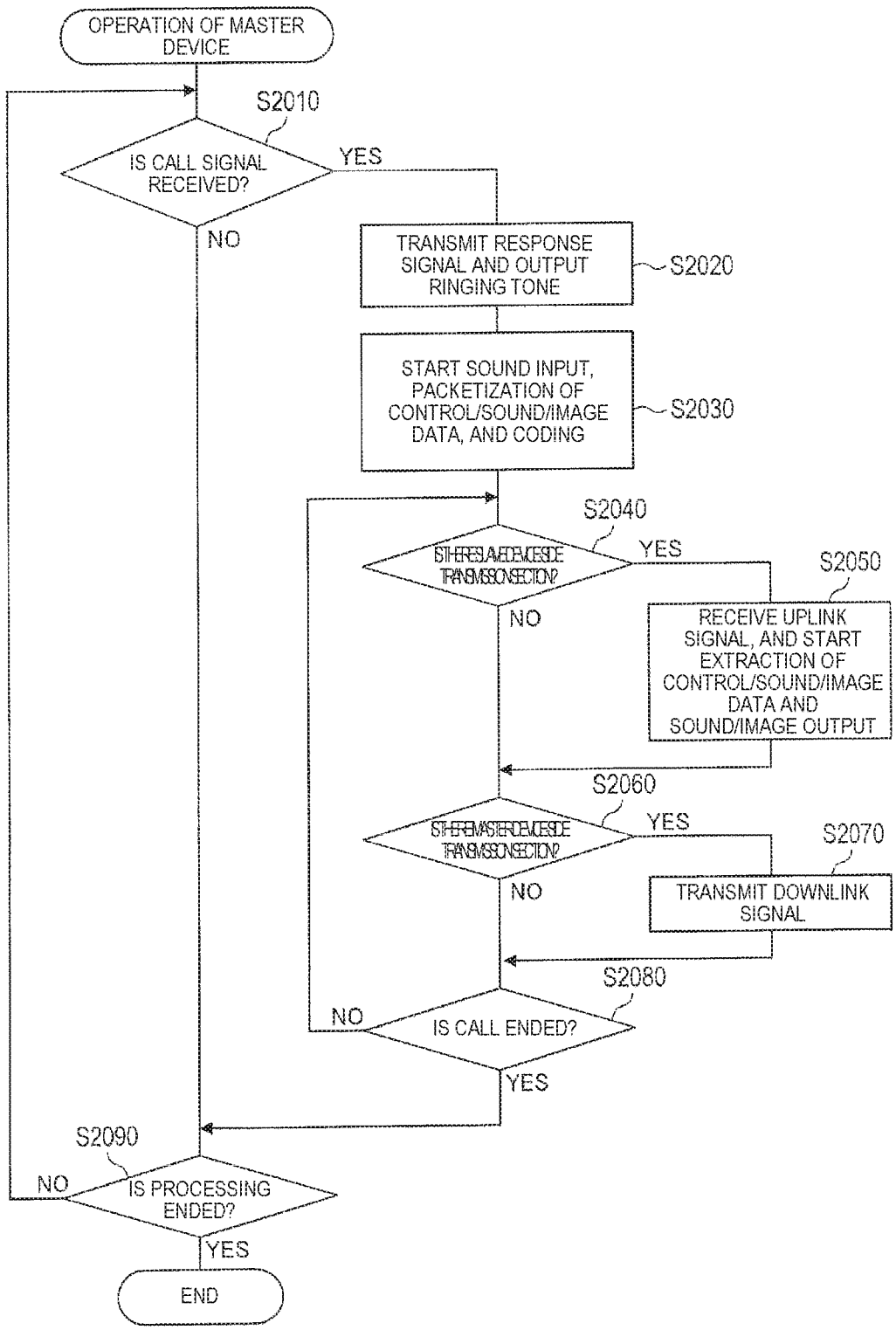
FIG. 21 is a flowchart illustrating an example of an operation of the intercom master device according to the exemplary embodiment of the present disclosure.

FIG. 21 is a flowchart illustrating an example of an operation of intercom master device 200.

In Step S2010, controller 207 determines whether or not a call signal is received from entrance slave device 100. In a case where the call signal is received (S2010: YES), controller 207 causes the flow to proceed to Step S2020. In a case where the call signal is not received (S2010: NO), controller 207 causes the flow to proceed to Step S2090.

In Step S2020, controller 207 transmits a response signal to entrance slave device 100, and outputs a ringing tone by using sound I/F 205 and speaker 203.

In Step S2030, controller 207 starts sound input by using microphone 204 and sound I/F 205. Controller 207 starts packetization and coding of various types of data (control data/digital sound data) to be transmitted, by using packet generator 232 and transmission data processor 208. Controller 207 may control a transmission rate of digital sound data.

In Step S2040, controller 207 determines whether or not to be in a slave-device side transmission section. In a case of being in the transmission section (S2040: YES), controller 207 causes the flow to proceed to Step S2050. In a case of not being in the transmission section (S2040: NO), controller 207 causes the flow to proceed to Step S2060 (which will be described later).

In Step S2050, controller 207 starts reception of an uplink signal and extraction of various types of data (control data/sound data/image data). Controller 207 starts an output of sound and an image by using sound I/F 205, speaker 203, and the liquid crystal display. Controller 207 stops the reception of an uplink signal or the extraction of various types of data when the transmission section is ended.

In Step S2060, controller 207 determines whether or not to be a master-device side transmission section. In a case of being in the transmission section (S2060: YES), controller 207 causes the flow to proceed to Step S2070. In a case of not being in the transmission section (S2060: NO), controller 207 causes the flow to proceed to Step S2080 (which will be described later).

In Step S2070, controller 207 transmits a downlink signal generated by coding, to entrance slave device 100 through the two-wire cable by using transmission driver 210. As described above, it is desirable that controller 207 does not transmit digital sound data until the response button is operated. Controller 207 stops the transmission of a downlink signal when the transmission section is ended.

In Step S2080, controller 207 determines whether or not a call between entrance slave device 100 and intercom master device 200 is ended. For example, controller 207 determines that the call is ended, when it is detected that an operation of call end is performed in intercom master device 200. Controller 207 desirably transmits a signal indicating that the operation of call end is performed, to entrance slave device 100 when the operation of call end has been performed. In a case where the call is not ended (S2080: NO), controller 207 causes the flow to return to Step S2040. In a case where the call is ended (S2080: YES), controller 207 causes the flow to proceed to Step S2090.

In Step S2090, controller 207 determines whether an instruction to end processing relating to the intercom function is performed. For example, controller 207 determines that the instruction to end the above processing is performed, when it is detected that an operation of stopping the intercom function is performed in intercom master device 200. Controller 207 desirably transmits a signal indicating that the operation of stopping the intercom function is performed, to entrance slave device 100, when the operation of stopping the intercom function has been performed. In a case where the instruction to end the above processing is not performed (S2090: NO), controller 207 causes the flow to return to Step S2010. In a case where the instruction to end the above processing is performed (S2090: YES), controller 207 ends a series of processes.

Routing Control at Time of Normal Operation

Figure 23:
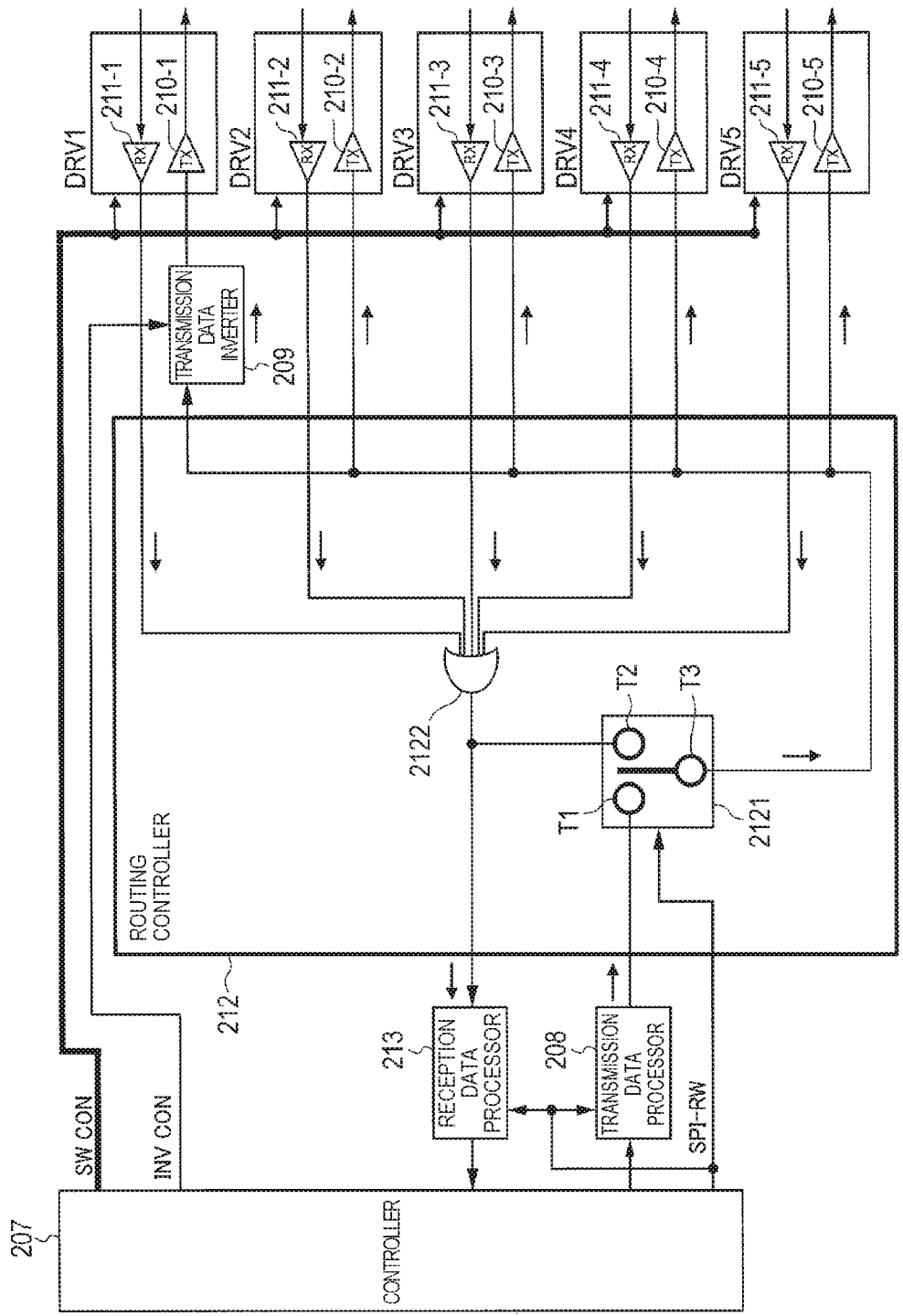
FIG. 23 is a diagram illustrating an internal configuration of a routing controller in the intercom master device according to the exemplary embodiment of the present disclosure.

A specific example of routing control when intercom master device 200 according to the exemplary embodiment is normally operated will be described with reference to FIGS. 22 and 23. In the example of FIG. 22, a case where intercom master device 200 (controller 207 (illustrated as "a master device controller" in FIG. 22)) is connected to five devices (entrance slave device 100, additional monitor 300, and master devices of other intercom systems) through any of DRVs (set of the transmission driver (Tx) and the reception driver (Rx)) 1 to 5 is illustrated. In this case, 7 types of setting patterns (P1 to P7) are prepared. FIG. 23 is a diagram illustrating the internal configuration of routing controller 212. As illustrated in FIG. 23, routing controller 212 includes switch 2121 and OR circuit 2122.

Setting pattern P1 indicates routing (validity/invalidity of communication route) in the standby state where intercom master device 200 transmits and receives data to and from none of the devices. In setting pattern P1, intercom master device 200 is in a reception mode (in which transmission is not performed, and only reception is performed). As illustrated in FIG. 22, since controller 207 is in the reception mode, terminal T3 of switch 2121 is connected to terminal T2, and the reception driver (Rx) of each of the DRVs is caused to be available so as to enable data reception from each of the devices, in accordance with a control of SPI-RW. Then, intercom master device 200 is in a state of waiting for interruption from each connection device.

In setting pattern P1, it is necessary that all inputs of OR circuit 2122 are "L" in a state of waiting for an interruption from each connection device. This is because, in a case where any one of all of the inputs of OR circuit 2122 is "H", even when normalized data is input to OR circuit 2122, the output of OR circuit 2122 is fixed so as to be "H". Thus, if reception data is inverted, a case where an input of OR circuit 2122 is "H" at a time of waiting for reception occurs.

Thus, inversion control of data is not possible between the reception driver (RX) of the DRV and OR circuit 2122. Thus, in the exemplary embodiment, as the countermeasures for a case where the two-wire cable used when intercom master device 200 is connected to an intercom master device of another intercom system is reversely connected, a circuit is designed by using a method of inverting transmission data on intercom master device 200 side.

A reception data processor including a reception data inverter configured to inverting a polarity by a trigger of inverting reception data is provided at the first output of reception data which has been received by each reception driver (RX) of each of the DRVs. A polarity inverter is provided at the second output between the second output of the reception data received by each reception driver (RX) of each of the DRVs, and OR circuit 2122, in order to cause a phase of data transmitted from intercom master device 200 to coincide with a phase of data broadcasted by routing controller 212. The polarity inverter is used for adjusting polarity, and inverts polarity by a trigger of inverting reception data. The second output of the reception data received by each reception driver (RX) is input to OR circuit 2122 from the polarity inverter. The reception data is introduced into a path of broadcasting, from an output of OR circuit 2122 through switch 2121. In addition, (SW CON) to the DRV is used together. Thus, if the output of the reception data processor which are outputting any one piece of reception data is selected and the selection is output to controller 207, reversing reception data on intercom master device 200 side is also possible.

In the standby state, in a case where asynchronous interruption signal is received from any device, intercom master device 200 establishes synchronization with the device which has transmitted the interruption signal. For example, in a case where intercom master device 200 receives the interruption signal from the DRV1, intercom master device 200 establishes synchronization with a device connected to the DRV1, and performs transmission and reception of data (transitions to P2 (in transmission) or P3 (in reception)).

Setting pattern P2 indicates routing in broadcasting in which intercom master device 200 transmits data to all devices. In setting pattern P2, intercom master device 200 is in a transmission mode (mode in which reception is not performed and only transmission is performed). Controller 207 connects terminal T3 of switch 2121 to terminal T1, and causes the transmission driver (Tx) of each of the DRVs to be available, so as to enable data transmission to each of the devices. At this time, even though data is transmitted to intercom master device 200 from any device, reception in each of the DRVs is not possible, and thus the data is discarded in the master device 200. In setting pattern P2, intercom master device 200 transmits data to all devices which are being connected to intercom master device 200. However, since only an identifier of a device as the communication counterpart is described in the control data field of the downlink packet, other devices discards the data even if it is received. In setting pattern P2, outputs of reception drivers (Rx) of all of the DRVs are set to be "L".

Setting patterns P3 to P7 indicate routing in separate reception in which intercom master device 200 receives data from any one of the devices. In setting patterns P3 to P7, intercom master device 200 is in the reception mode, and controller 207 connects terminal T3 of switch 2121 to terminal T2. Controller 207 causes the reception driver (Rx) of one DRV corresponding to each of the setting pattern to be available, and causes transmission drivers (Tx) of other DRVs to be available. Thus, intercom master device 200 may cause routing controller 212 to output data received from a DRV which has been selected by the reception driver (Rx), to reception data processor 213, and simultaneously, may broadcast the data itself to other devices connected to all DRVs which have been selected by the transmission driver (Tx). Accordingly, decoding and analyzing reception data is not required when broadcasting is performed. Outputs of reception drivers (Rx) of all DRVs which have been selected by the transmission driver (Tx) are set to be "L".

For example, in a case where intercom master device 200 receives data of entrance slave device 100 from the DRV2, controller 207 causes the reception driver (Rx) of the DRV2 to be available, and causes transmission drivers (Tx) of other DRVs to be available. In this case, the data from entrance slave device 100 is received from the DRV2, and is output to reception data processor 213 through OR circuit 2122 of routing controller 212, in order to be used for decoding. The data passing through OR circuit 2122 is transmitted to the DRVs 1, 3, 4, and 5 via switch 2121, and is broadcasted to the connection devices. At this time, in the DRV2, only the reception driver (Rx) is available, and the transmission driver (Tx) is unavailable. Thus, the data passing through OR circuit 2122 is not broadcasted from the DRV2. At this time, even though data is transmitted to intercom master device 200 from other devices, reception in the DRVs 1, 3, 4, and 5 is not possible, and thus the data is discarded in the master device 200.

Routing Control at Time of Initial Registration

A specific example of the routing control at a time of initial registration of intercom master device 200, according to the exemplary embodiment will be described with reference to FIGS. 23 and 24. In the example of FIG. 24, a case where intercom master device 200 (controller 207 (illustrated as "a master device controller" in FIG. 24)) is connected to five devices through any of DRVs 1 to 5. In this case, five types of setting patterns (EP1 to EP5) are prepared.

Setting patterns EP1 to EP5 indicate routing at a time of the initial registration in which intercom master device 200 registers any one device. In setting patterns EP1 to EP5, intercom master device 200 is in the transmission mode, and controller 207 connects the terminal of T3 of switch 2121 to terminal T1. Controller 207 causes a transmission driver (Tx) of the DRV corresponding to a device to be registered to be available, and causes reception drivers (Rx) of other DRVs to be available. Thus, intercom master device 200 does not transmit a packet to devices other than a registration target, and can transmit the packet only to the registration target in a section in which the packet is transmitted. At this time, the reception drivers (Rx) of other DRVs are set to be available. However, in a case where intercom master device 200 performs transmission, reception of a packet from all of the devices is blocked, and thus the packet is not received from the DRVs (in SPI-RW, controller 207 selects transmission). Settings of P3 to P7 in FIG. 22 are used for transmission of packet to intercom master device 200 from the device to be registered. In this case, the function of broadcasting to other connection devices is operated. However, since transmission only to intercom master device 200 is set, other connection devices ignore the broadcasting. Thus, intercom master device 200 can one-to-one communicate with a registration target device such as entrance slave device 100. Outputs of reception drivers (Rx) of all DRVs which have been selected by the transmission driver (Tx) are set to be "L". The output of the reception driver (Rx) is set to be "L" in a state where the reception driver (Rx) of the DRV is selected and waiting for interruption from each connection device is performed.

Non-Polarization of Two-Wire Cable

In the above descriptions, as an example, a case where entrance slave device 100, intercom master device 200, and additional monitor 300 cause connection status detectors 134, 234, and 334 to detect the connection status of the two-wire cable, and in a case where the two-wire cable is reversely connected, transmission data inverters 109, 209, and 309 and reception data inverters 112 and 312 invert a signal is described. Thus, it is possible to cause connection of the two-wire cable to be substantially unpolarized, and to realize digital communication without being affected by the connection status of the two-wire cable.

However, a signal transmitted or received in digital communication may be inverted on the transmission side or the reception side. In the following descriptions, a configuration in which non-polarization is realized between entrance slave device 100 and intercom master device 200 is exemplified.

Figure 25:
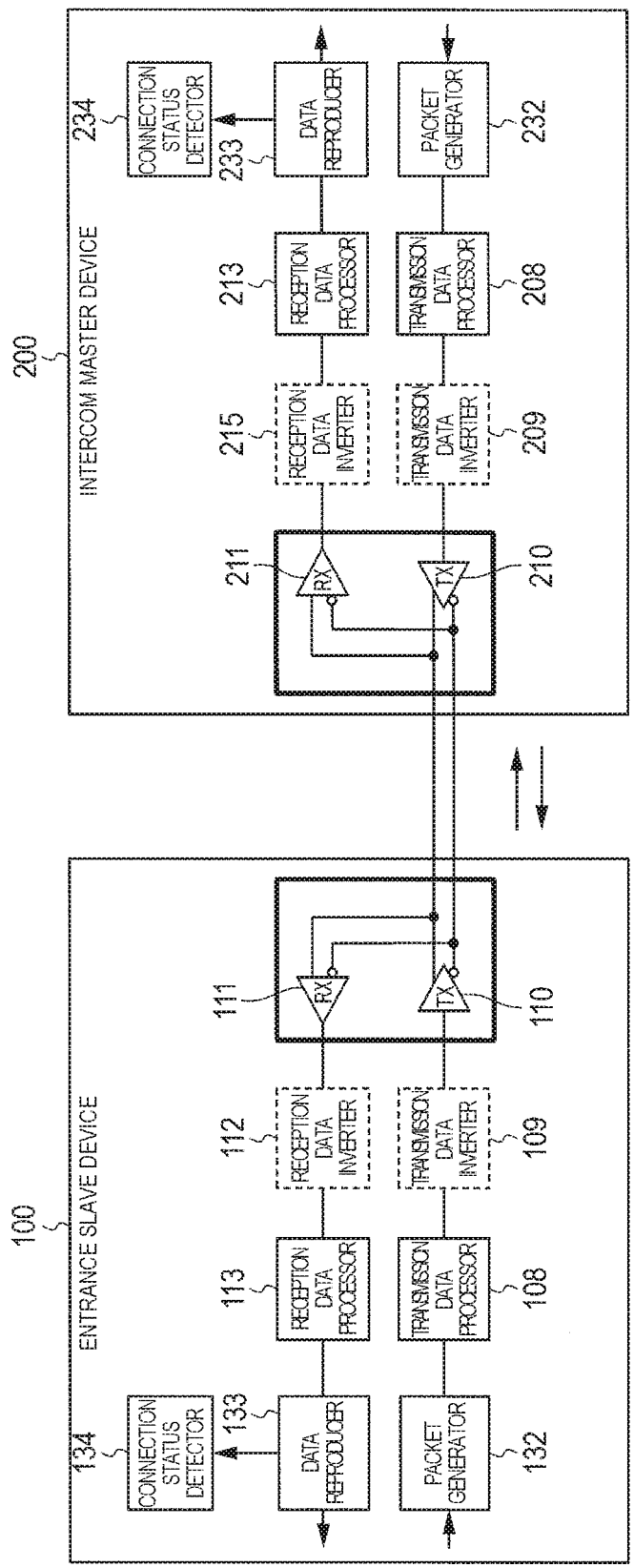
FIG. 25 is a schematic diagram illustrating a form in a case where a two-wire cable is forward connected.

FIG. 25 is a schematic diagram illustrating a form when the two-wire cable is in a state of forward connection. FIGS. 26 to 29 are schematic diagrams illustrating a form when the two-wire cable is in a state of reverse connection.

In FIGS. 26 to 29, illustration of parts other than parts which closely relate to non-polarization of digital communication by using the two-wire cable will be omitted. In FIGS. 26 to 29, it is assumed that each of entrance slave device 100 and intercom master device 200 (appropriately and collectively referred to as "a device" below) includes a transmission data inverter and a reception data inverter. In the following descriptions, a configuration in which intercom master device 200 does not include the reception data inverter has been described. However, in the following descriptions, a case where intercom master device 200 includes reception data inverter 215 will be described.

As described above, the transmission data inverter inverts a transmission signal output from the transmission data processor or outputs the transmission signal to the transmission driver without inversion, in accordance with an inverted control signal (INV CON) output from the connection status detector.

As described above, the reception data inverter inverts a reception signal output from the reception driver or outputs the reception signal to the reception data processor without inversion, in accordance with the inverted control signal (INV CON) output from the connection status detector.

In FIGS. 25 to 29, among the transmission data inverter and the reception data inverter, the inverter which is in a state where a signal is not inverted (state where the signal passes as it is) is indicated by a broken line. Two lines of the two-wire cable in FIGS. 25 to 29 indicate two cables constituting the two-wire cable.

As illustrated in FIG. 25, in a case where the two-wire cable is set to be forward connected, polarities of devices on both sides of the two-wire cable coincide with each other. Thus, both of the devices do not need to perform inversion on any of an uplink signal and a downlink signal. Thus, transmission data inverters 109 and 209 and reception data inverters 112 and 215 of the devices do not invert a signal.

As illustrated in FIGS. 26 to 29, in a case where the two-wire cable is set to be reversely connected, the polarities of the device on both sides of the two-wire cable are reverse to each other. Thus, it is necessary that signal inversion is performed on both of an uplink signal and a downlink signal in any device.

Figure 26:
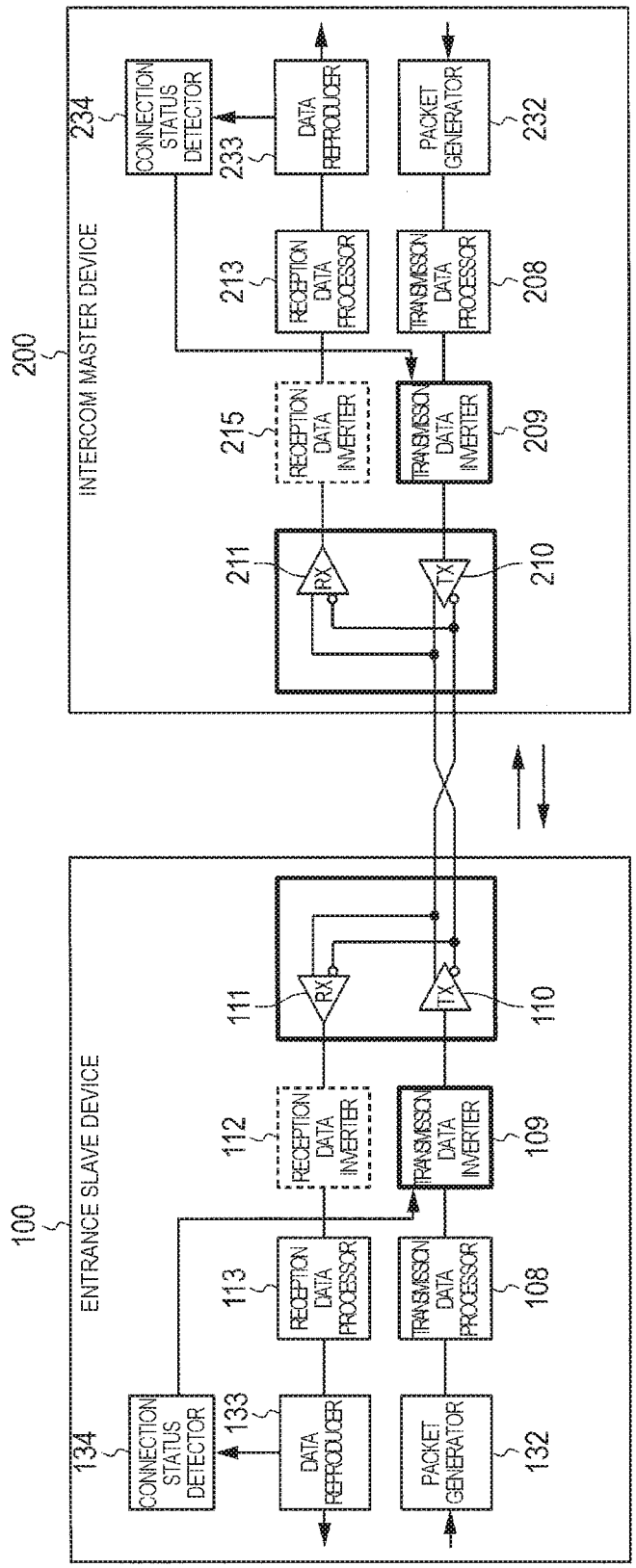
FIG. 26 is a first schematic diagram illustrating a form in a case where the two-wire cable is reversely connected.

FIG. 26 illustrates an example in which connection status detectors 134 and 234 detect reverse connection, and when reverse connection is detected, transmission data inverters 109 and 209 start signal inversion, regarding both of the devices. In this case, entrance slave device 100 and intercom master device 200 are not necessarily required to include reception data inverters 112 and 215.

Figure 27:
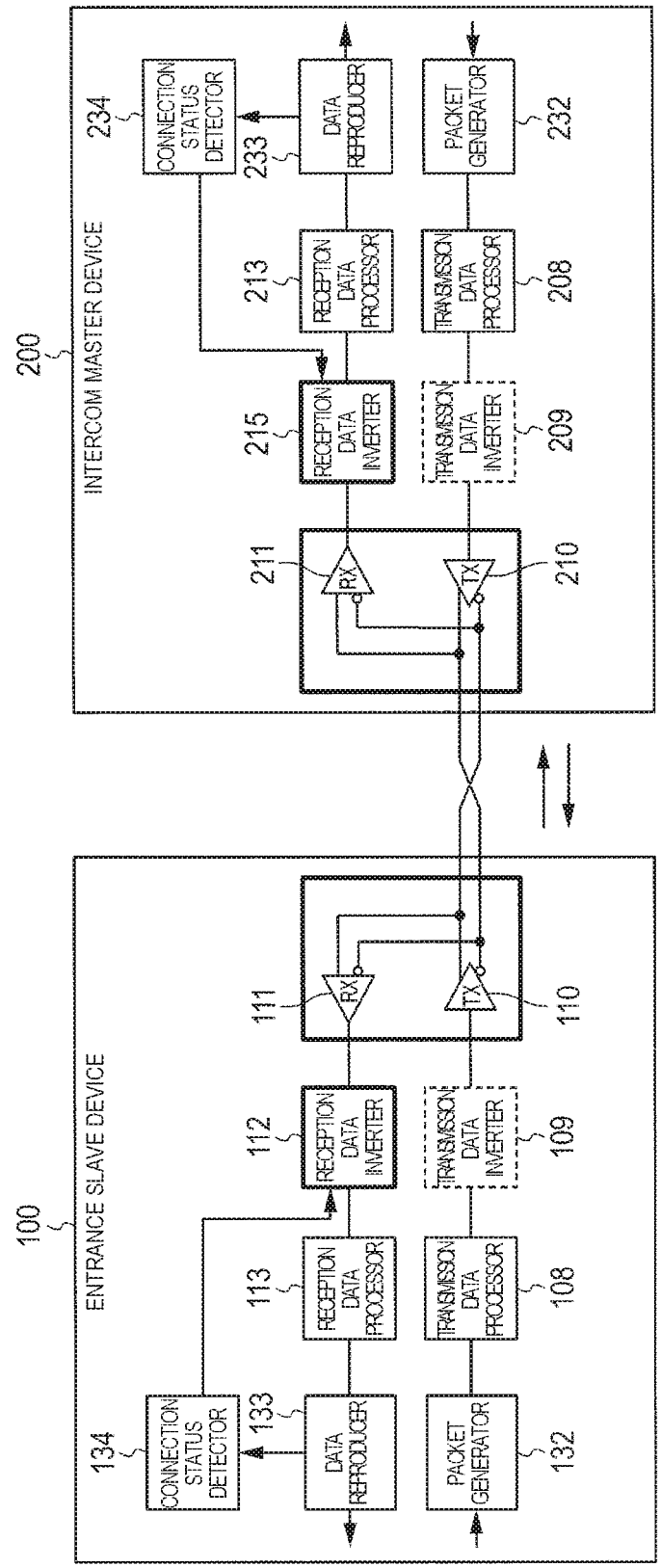
FIG. 27 is a second schematic diagram illustrating a form in a case where the two-wire cable is reversely connected.

FIG. 27 illustrates an example in which, when reverse connection is detected, reception data inverters 112 and 212 start signal inversion, regarding both of the devices. In this case, entrance slave device 100 and intercom master device 200 are not necessarily required to include transmission data inverters 109 and 209.

Figure 28:
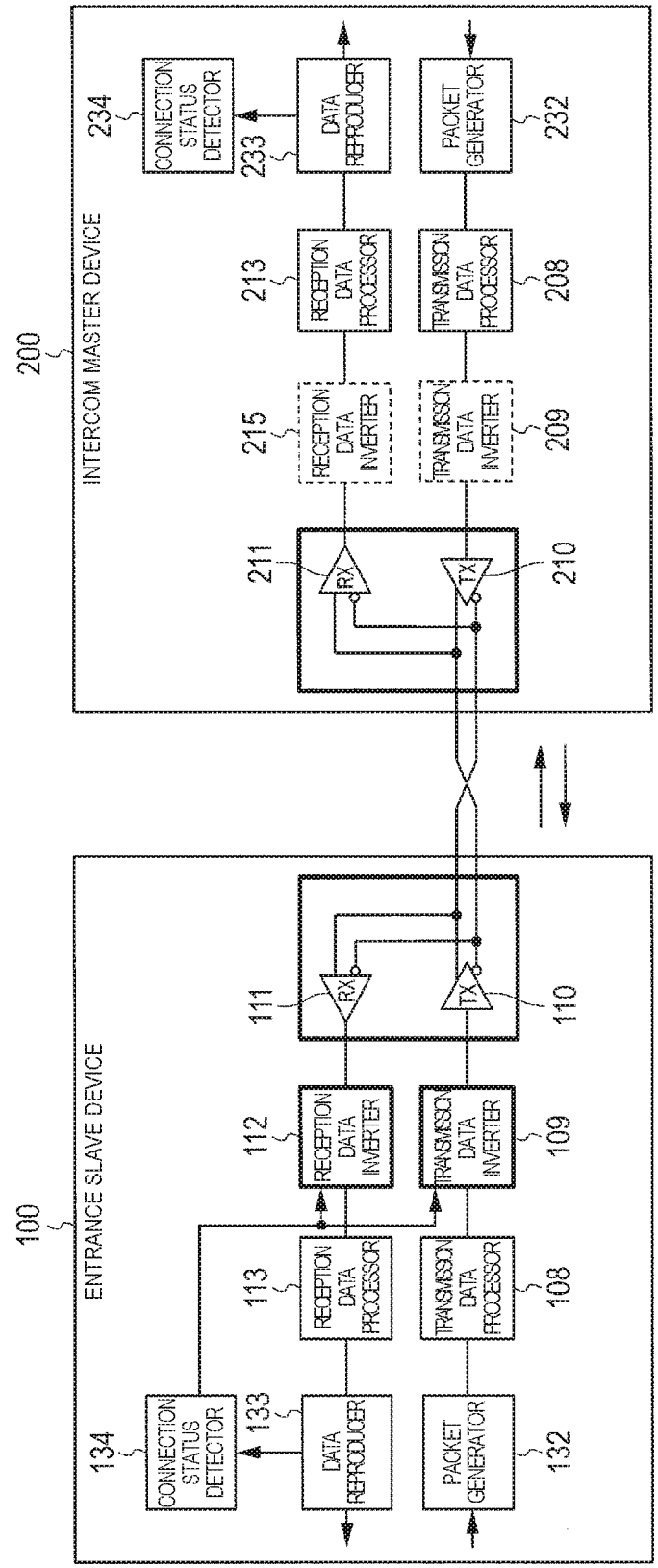
FIG. 28 is a third schematic diagram illustrating a form in a case where the two-wire cable is reversely connected.
Figure 29:
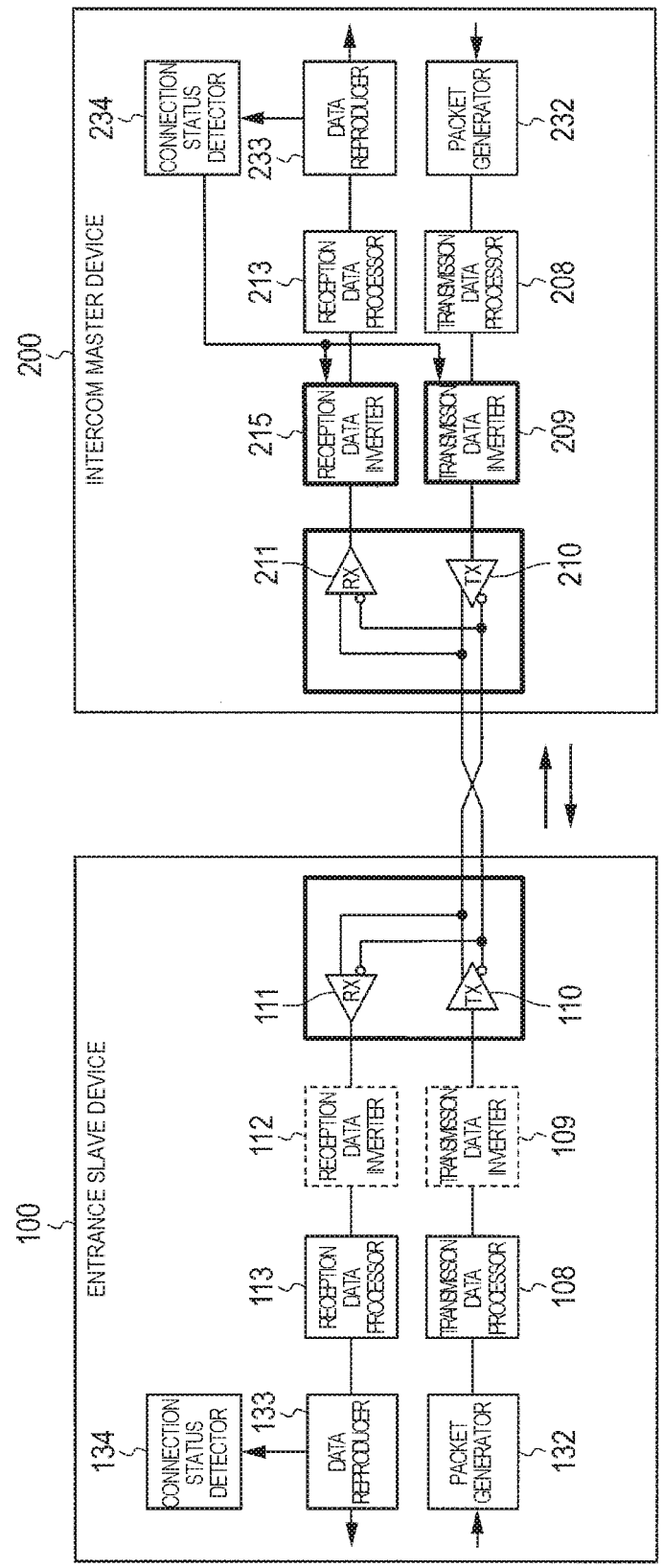
FIG. 29 is a fourth schematic diagram illustrating a form in a case where the two-wire cable is reversely connected.

In addition, for example, as illustrated in FIGS. 28 and 29, in only one device, the connection status detector detects reverse connection. When reverse connection is detected, the transmission data inverter and the reception data inverter in this device may start signal inversion. In this case, another device is not necessarily required to include the connection status detector, the transmission data inverter, and the reception data inverter.

In FIGS. 25 to 29, as an example, a case of entrance slave device 100 and intercom master device 200 is described. However, in the exemplary embodiment, entrance slave device 100 may be set as sub-master device 100b, and intercom master device 200 may be set as main master device 200a.

As described above, in the present disclosure, the configuration for causing the two-wire cable to be substantially unpolarized is not limited to the above-described exemplary embodiment.

Hitherto, various exemplary embodiments are described with reference to the drawings. However, the present disclosure is not limited to the above examples. According to the person skilled in the related art, it is apparent that various changes or modifications may be made in a scope described in Claims, and the various changes or modifications surely belong to the technical range of the present disclosure. The components in the exemplary embodiment may be randomly combined in the scope without departing from the gist of the disclosure.

In the above-described exemplary embodiment, intercom master device 200 and entrance slave device 100 includes the connection status detector and the transmission data inverter as the components for adjusting the polarity of the two-wire cable. However, for example, in a case where adjusting the polarity is not required, the above components may not be provided.

In the above-described exemplary embodiment, as an example, a configuration in which intercom master device 200 is connected to a plurality of entrance slave devices 100 or additional monitors 300 is described. However, intercom master device 200 may be connected to one entrance slave device 100 or one additional monitor 300.

In the above-described exemplary embodiment, intercom master device 200 controls ON/OFF of switch 223, and thus controls a supply of power to entrance slave device 100. However, for example, intercom master device 200 may control ON/OFF of power supply 221 not switch 223, and thus may control the supply of power to entrance slave device 100.

In the above-described exemplary embodiment, as an example, connection between connection devices such as intercom master device 200 and entrance slave device 100 is described. However, the present disclosure is not limited thereto. For example, as other application devices, in a case of a control device (communication device) and the like of a business phone (between an extension phone and a control device), a home security device (between a monitoring camera device and an interior monitor, between various sensor nodes and a control device, and the like), similar effects are also obtained.

Detailed Descriptions of Cable Connector 101 and Cable Connector 201-i

Figure 30:
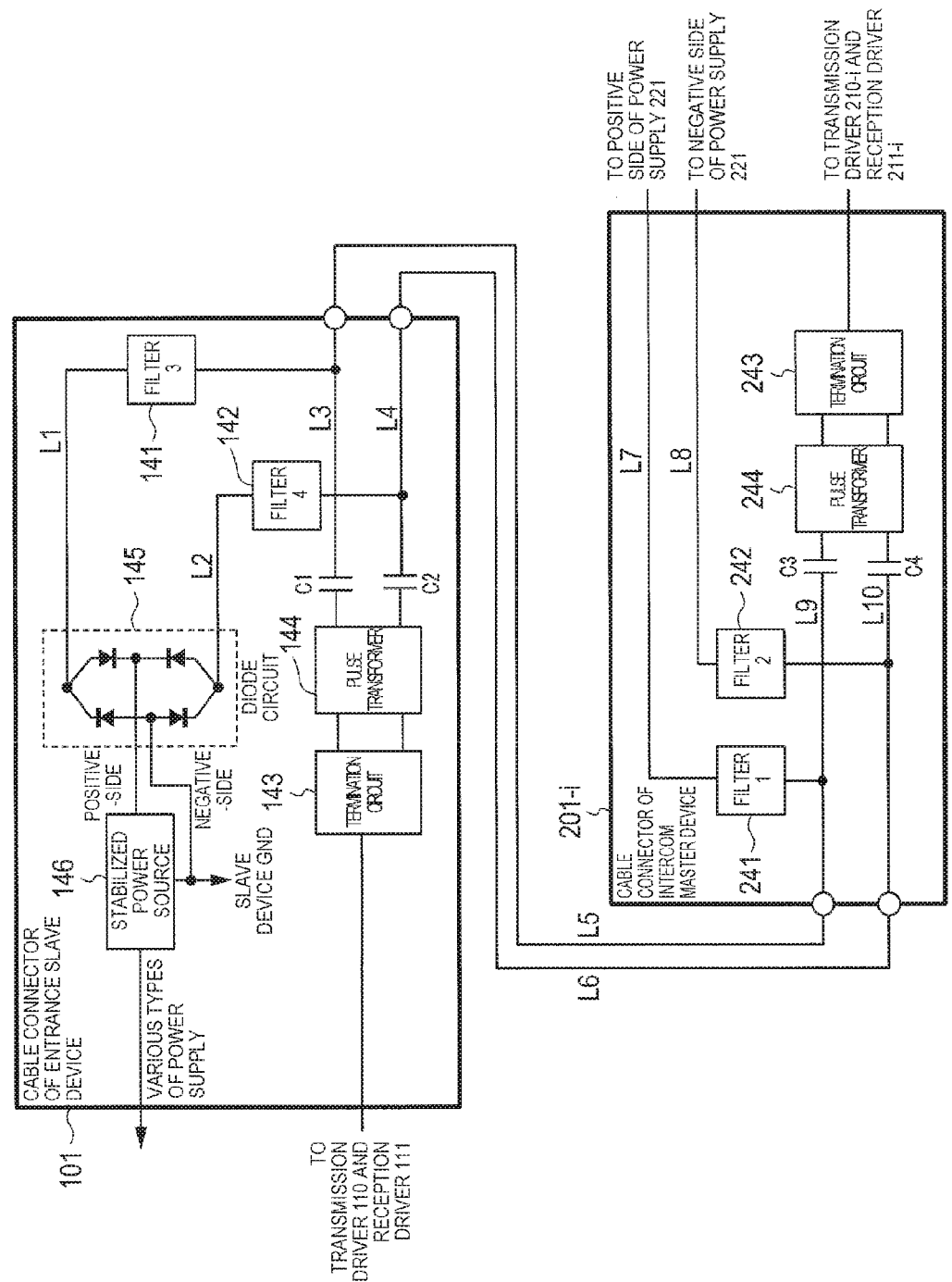
FIG. 30 is a diagram illustrating a configuration of a cable connector of the entrance slave device and a cable connector of the intercom master device.

Next, details of cable connector 101 and cable connector 201-i will be described. FIG. 30 is a diagram illustrating a configuration of cable connector 101 of entrance slave device 100 and a configuration of cable connector 201-i of intercom master device 200.

The configuration diagram of cable connector 301 of additional monitor 300 will be omitted. As described above, since additional monitor 300 uses a commercial power source, a supply of power from intercom master device 200 through the two-wire cable is not received. Thus, differently from cable connector 101 of entrance slave device 100 illustrated in FIG. 13, cable connector 301 of additional monitor 300 does not include two filters, a diode circuit, a stabilized power source connected to an output of the diode circuit, and the like.

As illustrated in FIG. 30, cable connector 101 of entrance slave device 100 includes filter 141, filter 142, termination circuit 143, and pulse transformer 144.

In cable connector 101 of FIG. 30, lines L1 and L2 are lines for a supply of power. Lines L3 and L4 are lines for data communication. Filters 141 and 142 are filters in which only a DC current flows. Filters 141 and 142 cause a digital communication signal not to flow in the lines L1 and L2.

Termination circuit 143 terminates the two-wire cable, and is connected to transmission driver 110 and reception driver 111 illustrated in FIG. 3. In FIG. 30, termination circuit 143 is connected to transmission driver 110 and reception driver 111 illustrated in FIG. 3, by using one piece of wiring. However, the connection may be made by using two pieces of balanced wiring.

Pulse transformer 144 is a transformer for insulating.

In cable connector 101 of FIG. 30, lines L3 and L4 are lines for data communication, and are connected to transmission driver 110 or reception driver 111 through capacitors C1 and C2, pulse transformer 144, and termination circuit 143. Capacitors C1 and C2 are used for blocking a DC component of the power, which is obtained by superimposition on intercom master device 200 side.

Diode circuit 145 is a circuit which has a plurality (4 in FIG. 30) of diodes. Diode circuit 145 has a first circuit and a second circuit. In the first circuit, an output line of the positive side is connected to a node at which cathodes of two diodes are connected to each other. In the second circuit, an output line of the negative side is connected to a node at which anodes of other two diodes are connected to each other. In diode circuit 145, two input lines (lines L1 and L2) are connected to two nodes which are one node at which the anode of the first circuit and the cathode of the second circuit are connected to each other, and one node at which another anode of the first circuit and another cathode of the second circuit are connected to each other. With such a configuration, in diode circuit 145, the polarity of an output to the two output lines is fixed regardless of the polarity of an input to lines L1 and L2. Thus, even when the two-wire cable is reversely connected, diode circuit 145 can output the output of the positive side to the original output line on the positive side, and output the output of the negative side to the original output line on the negative side. Accordingly, it is possible to normally receive the supply of power from intercom master device 200.

Stabilized power source 146 supplies DC power which has been supplied from the intercom master device through the two-wire cable and diode circuit 145, to the units of entrance slave device 100.

With the above-described configuration, cable connector 101 of entrance slave device 100 can receive the supply of power with no problem even in a case where the two-wire cable is reversely connected.

As illustrated in FIG. 30, cable connector 201-i of intercom master device 200 includes filter 241, filter 242, termination circuit 243, and pulse transformer 244.

In cable connector 201-i of FIG. 30, lines L7 and L8 are lines for a supply of power. Line L7 is connected to the positive side of power supply 221 through switch 223. Line L8 is connected to the negative side of power supply 221. Filters 241 and 242 are filters in which only a DC current flows. Filters 241 and 242 cause a digital communication signal not to flow in lines L7 and L8.

Termination circuit 243 terminates the two-wire cable, and is connected to transmission driver 210-i and reception driver 211-i illustrated in FIG. 4C. In FIG. 30, termination circuit 243 is connected to transmission driver 210-i and reception driver 211-i illustrated in FIG. 4C, by using one piece of wiring. However, the connection may be made by using two pieces of balanced wiring.

Pulse transformer 244 is a transformer for insulating.

In cable connector 201-i of FIG. 30, lines L9 and L10 are lines for data communication, and are connected to transmission driver 210-i or reception driver 211-i through capacitors C3 and C4, pulse transformer 244, and termination circuit 243. Capacitors C3 and C4 are used for blocking a DC component of the power, which is obtained by superimposition.

Two-wire cables L5 and L6 connect entrance slave device 100 to cable connector 201-i of corresponding intercom master device 200. Two-wire cables L5 and L6 superimpose power supplied from intercom master device 200 side to entrance slave device 100, on a digital communication signal, and transmit a result of the superimposition.

As described above, cable connector 101 of entrance slave device 100 and cable connector 201-i of intercom master device 200 can cause transmission and reception of a digital communication signal between entrance slave device 100 and intercom master device 200 to be performed through the two-wire cable, and can cause a supply of power from intercom master device 200 to entrance slave device 100 to be performed through the two-wire cable.

Operation of Entrance Slave Device 100 at Time of Resetting Control

Next, an operation example of a case where intercom master device 200 side controls resetting of entrance slave device 100 in intercom system 1 will be described.

As described above, intercom master device 200 supplies power to entrance slave device 100. Intercom master device 200 blocks the supplied power by using switch 223, and thus can perform power ON/OFF control of entrance slave device 100. In intercom system 1 according to the exemplary embodiment, with such a configuration, intercom master device 200 causes power of entrance slave device 100 to turn OFF. Then, after a predetermined time elapses, intercom master device 200 causes power to turn ON, and thus can substantially perform a resetting operation of entrance slave device 100. In the exemplary embodiment, the resetting means that, for example, a state of the device is brought back into an initial state by an operation such as a re-start.

In the following descriptions, an operation example when intercom master device 200 performs resetting control of entrance slave device 100 will be described. In the following descriptions, an operation example when resetting control of entrance slave device 100 is performed will be described. However, an operation when resetting control of other connection devices which receive a supply of power from intercom master device 200 is performed is similar to the following operation.

Figure 31:
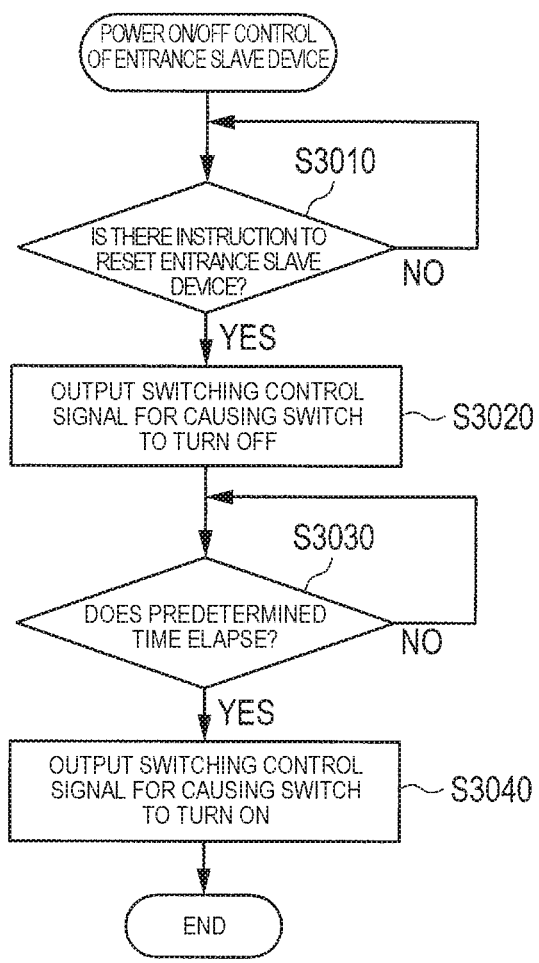
FIG. 31 is a flowchart illustrating an example of an operation when the intercom master device controls resetting of the entrance slave device in the exemplary embodiment of the present disclosure.

FIG. 31 is a flowchart illustrating an example of an operation when intercom master device 200 controls resetting of entrance slave device 100.

In Step S3010, controller 207 of intercom master device 200 determines whether or not an instruction to reset entrance slave device 100 is input. The instruction to reset power of entrance slave device 100 is input through key input unit 202, for example. In a case where it is determined that the instruction to reset entrance slave device 100 is input (Step S3010: YES), controller 207 causes the flow to proceed to Step S3020. In a case where it is determined that the instruction is not input (Step S3010: NO), controller 207 repeats Step S3010.

In Step S3020, controller 207 outputs a switch control signal (slave power OFF) for causing switch 223 to turn OFF, to switch 223.

In Step S3030, controller 207 outputs the switch control signal (slave power OFF), and determines whether or not a predetermined time elapses after the power of entrance slave device 100 turns OFF. The predetermined time is a sufficient time taken from when charges in entrance slave device 100 is discharged until a voltage of an electronic circuit in entrance slave device 100 drops to a resettable voltage. The predetermined time may be determined in such a manner that, for example, power ON/OFF of entrance slave device 100 has been experimentally performed in advance, and may be stored in a memory (not illustrated) and the like. In a case where it is determined that the predetermined time elapses (Step S3030: YES), controller 207 causes the flow to proceed to Step S3040. In a case where it is determined that the predetermined time does not elapse (Step S3030: NO), controller 207 repeats Step S3030.

In Step S3040, controller 207 outputs a switch control signal (slave power ON) for causing switch 223 to turn ON.

With such an operation, in intercom system 1 according to the exemplary embodiment, it is possible to easily reset entrance slave device 100 in intercom master device 200 side. As illustrated in FIG. 4C, in a case where switch 223 is provided on a connection path between power supply 221, and all cable connectors 201-1 to 201-N, intercom master device 200 can simultaneously reset all entrance slave devices 100.

In the above operation example described with reference with FIG. 31, as an example, a case where intercom master device 200 resets entrance slave device 100 is described. However, for example, in a case where, simply, an instruction to cause the power of entrance slave device 100 to turn ON/OFF is input to the intercom master device, controller 207 of intercom master device 200 may output the switch control signal for controlling switch 223, in accordance with the instruction.

Regarding the above operation described with reference with FIG. 31, in the operation of intercom master device 200 (which has been described with reference to FIG. 21) when the intercom function is required, for example, the operation may be started by interruption which occurs at a time when an instruction to reset entrance slave device 100 is input to key input unit 202.

A case having a configuration in which intercom master device 200 can be reset by, for example, a reset switch (not illustrated) provided in intercom master device 200 may be made. In such a case, controller 207 may output a switch control signal for maintaining switch 223 to be in the OFF state, stop a supply of power to entrance slave device 100, and thus prevent an unnecessary operation of entrance slave device 100, in the process of resetting intercom master device 200.

As described above, in intercom system 1 according to the above-described exemplary embodiment, intercom master device 200 and entrance slave device 100 are connected to each other through the two-wire cable, and thus digital communication between intercom master device 200 and entrance slave device 100 and the supply of power from intercom master device 200 to entrance slave device 100 are simultaneously performed. Cable connector 101 of entrance slave device 100 includes diode circuit 145 which can fix the polarity of the output to the two output lines regardless of the polarity of the input to the two input lines (lines L1 and L2). Further, in a case where connection status detectors 134 and 234 determine that the two-wire cable is reversely connected, entrance slave device 100 and intercom master device 200 cause transmission data inverters 109 and 209 and reception data inverter 112 to perform signal inversion.

With such a configuration, in intercom system 1 according to the above-described exemplary embodiment, even though the two-wire cable is reversely connected, entrance slave device 100 can normally receive power supplied from intercom master device 200, and digital communication can be normally performed between entrance slave device 100 and intercom master device 200.

Intercom master device 200 includes switch 223 for switching a connection status of power supply 221 and all of the cable connectors 201-*i*, between ON and OFF. Controller 207 controls switch 223, and thus performs ON/OFF control of power supplied to entrance slave device 100. With such a configuration, controller 207 of intercom master device 200 causes power supplied to entrance slave device 100 to turn OFF. Then, after a predetermined time elapses, controller 207 causes the supply of the power to turn ON. Thus, it is possible to appropriately perform resetting by re-start of entrance slave device 100. Thus, intercom master device 200 can easily reset entrance slave device 100.

When resetting control of entrance slave device 100 is performed, controller 207 of intercom master device 200 waits from when the power of entrance slave device 100 turns OFF until a predetermined time taken to reliably enable resetting of entrance slave device 100 elapses. Then, controller 207 outputs a switch control signal for causing the power of entrance slave device 100 to turn ON. Thus, controller 207 can reliably reset entrance slave device 100 without affecting the electronic circuit (controller 107 and the like) of entrance slave device 100.

Hitherto, one exemplary embodiment of the present disclosure has been described. In the following descriptions, other exemplary embodiments according to the present disclosure will be described by using a specific example.

Other Exemplary Embodiment 1

Figure 32:
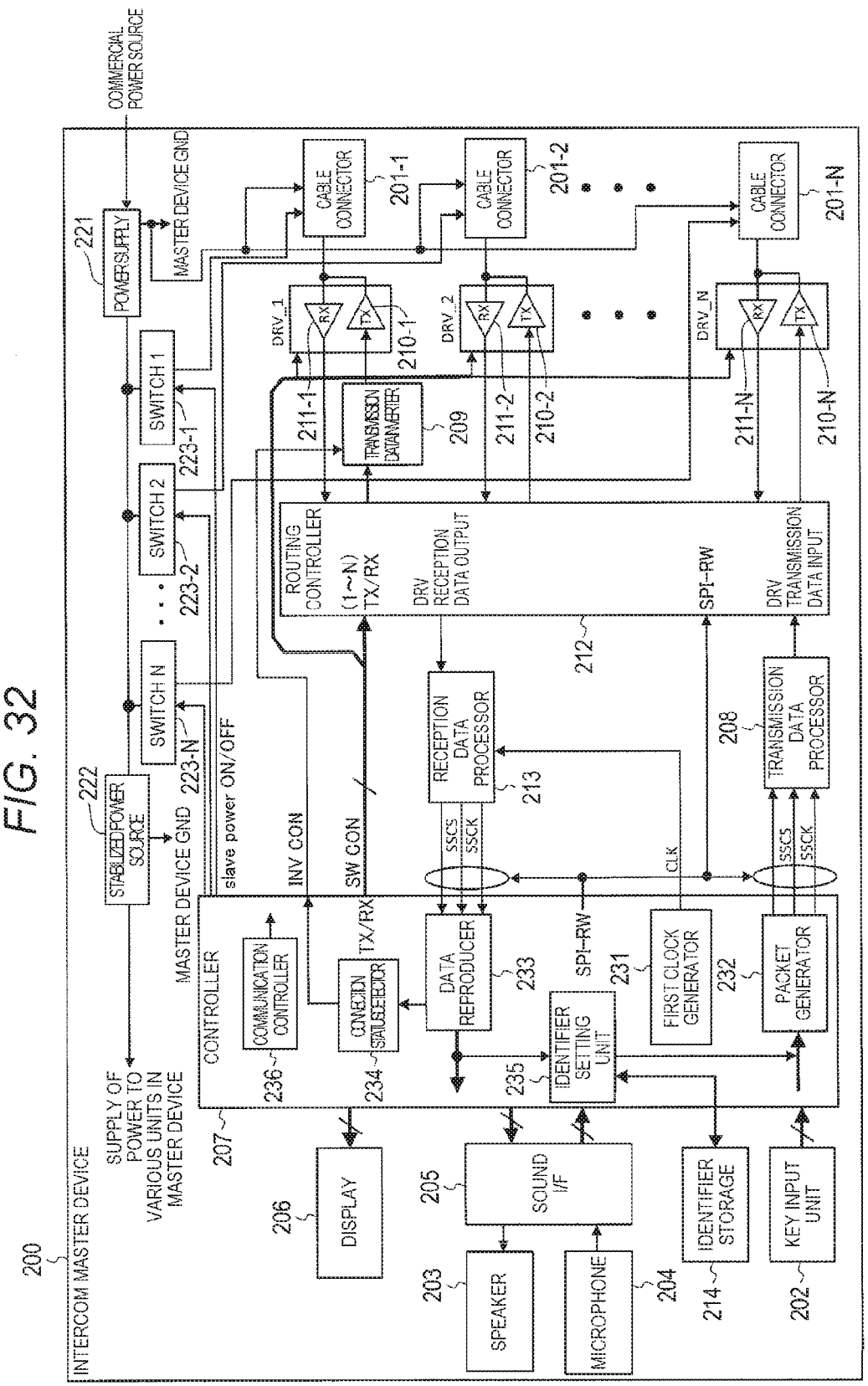
FIG. 32 is a block diagram illustrating a configuration of an intercom master device in another Exemplary Embodiment 1.

FIG. 32 is a block diagram illustrating a configuration of intercom master device 200 in intercom system 1 according to other Exemplary Embodiment 1. Intercom master device 200 illustrated in FIG. 32 includes a plurality of switches 223-*i* (i is the number corresponding to cable connector 201-*i*). The plurality of switches 223-*i* is provided on connection paths between power supply 221 and a plurality of cable connectors 201-*i*, respectively. Controller 207 has a configuration of enabling separate control of each of the switches. Controller 207 outputs a switch control signal (slave power ON/OFF) to any of a plurality of entrance slave devices 100, for example, to cable connector 201-$n$ ($n$ is the number corresponding to entrance slave device 100 which does not respond) corresponding to entrance slave device 100 which does not respond to a response request for a predetermined period, and to switch 223-$n$ provided on the connection path with power supply 221. Thus, controller 207 can separately perform ON/OFF control for each of the entrance slave devices 100, and perform resetting.

In the other Exemplary Embodiment 1, with such a configuration, it is possible to separately reset the plurality of entrance slave devices 100 which are connected to intercom master device 200.

Other Exemplary Embodiment 2

In other Exemplary Embodiment 2, a case where intercom master device 200 does not include switch 223 or a case where intercom master device 200 includes switch 223, but it is not possible that intercom master device 200 causes the power on entrance slave device 100 side to turn OFF will be described.

In the other Exemplary Embodiment 2, in a case where intercom master device 200 does not include switch 223 or in a case where a state where it is not possible that supplied power of entrance slave device 100 side from intercom master device 200 side is caused to turn OFF occurs by, for example, a reason that the operated slave device is provided, in a configuration in which power supplied to the plurality of entrance slave devices 100 simultaneously turns ON/OFF, it is not possible that a supply of power to entrance slave device 100 or other devices to which power is being supplied, from power supply 221 through cable connector 201-$i$ is cut off. Thus, in the other Exemplary Embodiment 2, for example, in a case where an instruction to reset entrance slave device 100 is input through key input unit 202, a reset command of entrance slave device 100 is written in an interruption signal, and the interruption signal obtained by the writing is transmitted to entrance slave device 100, and thus entrance slave device 100 is reset. During synchronous communication using a frame, a reset command is written in a time slot for entrance slave device 100 in the frame, and is transmitted to entrance slave device 100. Thus, entrance slave device 100 may be reset.

As the interruption signal, an interruption signal similar to that illustrated in FIG. 2B may be used. In a case where a time slot in a frame is used, the interruption signal illustrated in FIG. 2A may be used. A command indicating that entrance slave device 100 is reset is included in the control data field of an interruption signal.

The reception data processor 113 of entrance slave device 100 which receives the interruption signal through the two-wire cable outputs a reset signal generated by decoding the interruption signal, to controller 107, as illustrated in FIG. 33. FIG. 33 is a block diagram illustrating the configuration of entrance slave device 100 in the other Exemplary Embodiment 2.

More detailed, reception data decoder 155 illustrated in FIG. 9A decodes reception data including the interruption signal. As illustrated in FIG. 33, separately from an output of decoded data, reception data decoder 155 outputs a reset signal to controller 107, and thus resets controller 107. Thus, in intercom system 1 according to the other Exemplary Embodiment 2, in a case where intercom master device 200 does not include switch 223 or includes switch 223, even though turning OFF of power of the slave device side is not possible, the resetting operation of entrance slave device 100 can be performed.

The reception data processor 113 may output the reset signal which is for being output to controller 107, as an one-shot pulse of a predetermined interval.

Advantages of Exemplary Embodiments

As described above, in the exemplary embodiments, in a case where the two-wire cable is reversely connected, in either of the transmission-side device or the reception-side device, data is inverted, and then is transmitted/received. Thus, regardless of the connection status of the two-wire cable, the reception-side device can demodulate data. Accordingly, since a construction worker can wire a two-wire cable without paying attention to the connection status (forward connection or reverse connection), it is possible to improve work efficiency in wiring of the two-wire cable.

In the exemplary embodiments, digital communication of time division duplex has been described as an example. However, the present disclosure is not limited thereto, and may be also applied to another type of digital communication. For example, as other application devices, in a case of a control device (communication device) and the like of a business phone (between an extension phone and a control device), a home security device (between a monitoring camera device and an interior monitor, between various sensor nodes and a control device, and the like), similar effects are also obtained.

The present disclosure is appropriately used in an intercom system constituted by an entrance slave device with a camera, and an intercom master device.

What is claimed is:

1. An intercom system comprising:
a master device; and
a slave device, wherein:
the master device is connected with the slave device through a two-wire cable, and a packet signal is transmitted and received between the master device and the slave device by time division duplex,
the slave device includes a camera, a microphone, and a speaker, transmits an uplink packet signal which includes image data obtained by the camera and sound data obtained by the microphone, to the master device, receives a downlink packet signal from the master device so as to reproduce data, and outputs sound data included in the downlink packet signal from the speaker,
the master device includes a display, a microphone, and a speaker, receives the uplink packet signal from the slave device so as to reproduce data, displays image data included in the uplink packet signal in the display, outputs sound data included in the uplink packet signal from the speaker, and transmits the downlink packet signal which includes sound data obtained by the microphone, to the slave device,
the slave device determines whether the two-wire cable is forward, normal polarity, connected or reversely, inverted polarity, connected,
in a case where the two-wire cable is reversely, inverted polarity, connected, the slave device reproduces data after reversing the received downlink packet signal, and transmits the uplink packet signal after reversing the uplink packet signal, and
even when the two-wire cable is reversely, inverted polarity, connected, the master device reproduces data without reversing the uplink packet signal, and transmits the downlink packet signal without reversing the downlink packet signal, the slave device stores a known first synchronization pattern for checking whether the two-wire cable is forward, normal polarity, connected and a second synchronization pattern which is obtained by reversing the first synchronization pattern, in a case where a synchronization pattern detected from the received downlink packet signal coincides with the first synchronization pattern, the slave device determines that the two-wire cable is forward, normal polarity, connected, and in a case where the detected synchronization pattern coincides with the second synchronization pattern, the slave device determines that the two-wire cable is reversely, inverted polarity, connected.

2. The intercom system of claim 1, wherein in a case where the master device is connected with a master device of a second intercom system through a second two-wire cable, the master device determines whether the second two-wire cable is forward, normal polarity, connected or reversely, inverted polarity, connected, and in a case where the second two-wire cable is reversely, inverted polarity, connected, the master device transmits a packet signal to the master device of the second intercom system after reversing the packet signal.

3. The intercom system of claim 2, wherein in a case where the second two-wire cable is forward, normal polarity, connected, the master device stores a known first synchronization pattern and a second synchronization pattern which is obtained by reversing the first synchronization pattern, in a case where a synchronization pattern detected from the packet signal which has been received from the master device of the second intercom system coincides with the first synchronization pattern, the master device determines that the second two-wire cable is forward, normal polarity, connected, and in a case where the detected synchronization pattern coincides with the second synchronization pattern, the master device determines that the second two-wire cable is reversely, inverted polarity, connected.

4. A communication method of an intercom system in which a master device including a display, a microphone, and a speaker is connected with a slave device including a camera, a microphone, and a speaker, through a two-wire cable, and a packet signal is transmitted and received between the master device and the slave device by time division duplex, the method comprising:

causing the slave device to determine whether the two-wire cable is forward, normal polarity, connected or reversely, inverted polarity, connected;

causing the slave device to transmit an uplink packet signal which includes image data obtained by the camera and sound data obtained by the microphone, to the master device without reversing the uplink packet signal, in a case where the two-wire cable is forward, normal polarity, connected, and causing the slave device to transmit the uplink packet signal to the master device after reversing the uplink packet signal, in a case where the two-wire cable is reversely, inverted polarity, connected;

causing the master device to receive the uplink packet signal from the slave device so as to reproduce data, to display image data included in the uplink packet signal in the display, to output sound data included in the uplink packet signal from the speaker, and to transmit the downlink packet signal which includes sound data obtained by the microphone, to the slave device; and causing the slave device to receive the downlink packet signal from the master device, to reproduce data without reversing the downlink packet signal, in a case where the two-wire cable is forward, normal polarity, connected, and reproduce data after reversing the downlink packet signal, in a case where the two-wire cable is reversely, inverted polarity, connected, and to output sound data included in the downlink packet signal from the speaker, wherein the slave device stores a known first synchronization pattern for checking whether the two-wire cable is forward, normal polarity, connected and a second synchronization pattern which is obtained by reversing the first synchronization pattern, in a case where a synchronization pattern detected from the received downlink packet signal coincides with the first synchronization pattern, the slave device determines that the two-wire cable is forward, normal polarity, connected, and in a case where the detected synchronization pattern coincides with the second synchronization pattern, the slave device determines that the two-wire cable is reversely, inverted polarity, connected.

* * * * *